United States Patent [19]

Wical

[11] Patent Number: 6,112,201

[45] Date of Patent: *Aug. 29, 2000

[54] VIRTUAL BOOKSHELF

[75] Inventor: Kelly Wical, Redwood Shores, Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/520,499

[22] Filed: Aug. 29, 1995

[51] Int. Cl.⁷ ........................................ G06F 17/30

[52] U.S. Cl. ................... 707/5; 707/3; 707/500; 706/46; 345/33; 281/22

[58] Field of Search ..................... 395/614, 603, 395/54, 760, 602, 616, 605, 140, 751; 345/192, 349, 333; 707/6, 513, 531, 507, 500, 5, 102, 4, 3; 706/45, 46; 704/1; 434/88; 281/22

[56] References Cited

U.S. PATENT DOCUMENTS

| | | | |
|---|---|---|---|
| 4,985,697 | 1/1991 | Boulton | 345/192 |
| 5,167,011 | 11/1992 | Priest | 395/54 |
| 5,182,708 | 1/1993 | Ejiri | 395/751 |
| 5,257,185 | 10/1993 | Farley et al. | 395/611 |
| 5,276,616 | 1/1994 | Kuga et al. | 395/760 |
| 5,355,497 | 10/1994 | Cohen-Levy | 395/616 |
| 5,369,763 | 11/1994 | Biles | 395/603 |
| 5,384,703 | 1/1995 | Withgott et al. | 707/531 |
| 5,434,961 | 7/1995 | Horiuchi et al. | 707/507 |
| 5,598,557 | 1/1997 | Doner et al. | 395/605 |
| 5,625,767 | 4/1997 | Bartell et al. | 395/140 |
| 5,630,117 | 5/1997 | Oren et al. | 395/602 |
| 5,630,125 | 5/1997 | Zellweger | 395/614 |
| 5,639,240 | 6/1997 | Werzberger | 434/88 |
| 5,694,523 | 12/1997 | Wical | 706/45 |
| 5,708,822 | 1/1998 | Wical | 704/1 |
| 5,715,416 | 2/1998 | Baker | 345/349 |
| 5,732,260 | 3/1998 | Nomiyama | 707/5 |
| 5,734,795 | 3/1998 | Rogers | 706/45 |
| 5,768,580 | 6/1998 | Wical | 707/102 |
| 5,778,397 | 7/1998 | Kupiec et al. | 707/500 |
| 5,870,737 | 2/1999 | Dockter et al. | 707/4 |
| 5,887,120 | 3/1999 | Wical | 706/46 |

(List continued on next page.)

OTHER PUBLICATIONS

Ockerbloom, John Mark, "The On–Line Books Page", pp. 1–6, 1993.

(List continued on next page.)

Primary Examiner—Thomas G. Black
Assistant Examiner—Charles L. Rones
Attorney, Agent, or Firm—Stattler, Johansen & Adeli LLP

[57] ABSTRACT

A virtual bookshelf system provides a user a way to browse and locate information associated with a plurality of documents. The virtual bookshelf system contains classification information to classify the documents in a hierarchical structure that includes a plurality of hierarchical levels based on pre-defined categories. The virtual bookshelf system displays a portion of the hierarchical structure including a representation of the categories. A user of the virtual bookshelf system may browse through the categories in the hierarchical levels to learn the general topics of the available documents. The user is permitted to select a particular category, and in response, the virtual bookshelf system displays document information for documents classified in the category selected. When selected, peripheral themes or issues are displayed such that the themes relate to the main issues covered by the documents classified under the selected category. The virtual bookshelf system also includes a virtual clerk for locating documents of interest. A user enters a locate term in the virtual clerk, and in response, the virtual bookshelf system locates at least one match category in the hierarchical structure that relates to the locate term. It also displays a portion of the hierarchical structure that includes the match category such that a path is defined from the highest hierarchical levels to the hierarchical level of the match category. The virtual bookshelf system further includes a natural way to disambiguate locate terms that relate to more than one category.

32 Claims, 39 Drawing Sheets

U.S. PATENT DOCUMENTS

| | | | |
|---|---|---|---|
| 5,905,492 | 5/1999 | Straub et al. | 345/333 |
| 5,918,236 | 6/1999 | Wical | 707/500 |
| 5,930,788 | 7/1999 | Wical | 707/5 |
| 5,940,821 | 8/1999 | Wical | 707/3 |
| 5,947,522 | 9/1999 | Boehm | 281/22 |
| 5,953,718 | 9/1999 | Wical | 707/5 |

OTHER PUBLICATIONS

Mallory, Jim "NEW For PC:New Writing Analysis Package Debuts", Newsbytes, May 28, 1991.

Cox, John "'Text–Analysis' Server to Simplify Queries", Communications Week, Apr. 19, 1993.

Lee et al. "Low Cost Hypermedia with the Microsof Windows Multimedia Viewer Publishing Toolkit", IEEE Colloq. (1995), No. 202: The Authoring & Appliction of Hypermedia–Based User,pp. 1–5.

Hendry et al. "How People Use Softcopy Manuals: A Case Study", Professional Communciation Conference, 1991 (IPCC 91), pp. 221–224.

Kikuchi et al. "User Interference for a Digital Library to Support Construction of a Virtual Personal Library", Multimedia Computing and Systems, 1996 Int'l. Conference, pp. 429–432.

MacMilliam "A Common Architecture to Encourage Reuse of Natural Language/Text Processing Tool", Knowledge––Based Software Engineering Conference, 1993, pp. 133–142.

Yen, "Principled Modeling and Automatic Classification of Functional Requirements for Improved Reusability of the Design of Knowledge–Based Systems", Artificial Intelligence Applications, 1994, Conference, pp. 499–500.

Fox "An Organisation Ontology for Enterprise Modelling: Prelminiary Concepts for Linking Structure and Behaviour", Enabling Technologies, 1995 Workshop IEEE, pp. 71–81, Apr. 20, 1995.

Deloule et al. "Ontologies & Knowledge Representation", IEEE, pp. 3857–3862, 1995.

Satoh et al. "A Collagorative Supporting Mehtod between Document Processing and Hypertext Construction", Document Analysis, 1993 Int'l Conference, pp. 533–536.

Kikuchi et al. "User Interface for a Digital Library to Support Construction of a Virtual Personal Library", Multimedia Computing and Systems, 1996 Int'l Conference, pp. 424–432.

"Virtual Media Flies in from Down Under with Hypershelf", Computergram International, Nov. 4, 1994.

"Hypershelf", Software Magazine, v15, n7, p. 150(1), Jul. 1995.

Mendelson, Edward "Help for Winhelp Mavens", Windows Sources, v3, n5, p. 48(1), May 1995.

Moorehead, Laura "Software Helps Organize Windows Docs.", LAN Times, v12, n5, p. 34(1), Mar. 13, 1995.

"Hypershelf", PC User, n249, p. 24(1), Dec. 1994.

Heichler, Elizabeth "Winhelp Helped by Virtual Media Apps: Hypershelf and HDK manage Hypershelf", Infoworld, v16, n44, p. 29(1), Oct. 1994.

"Now Available: Hypershelf 3.0!!", http://www.deski.com/vm/5a57cef.htm, pp. 1–2, May 1997.

Salton, G, "Automatic text decomposition and structuring", Pergamon Press: (1996) V. 32 (2) pp. 127–138, Dec. 1997.

Ertel, R., "Concept Dictionary of English with Computer Programs for Content Analyses", Computers and the Humanities vol. 25, No. 6, pp. 448–450, Dec. 1991.

The Proper Context: Oracle Continue Its Multimedia Push with a InformationWeek, p. 68, Apr. 1994.

"Visualization Scanning Software Analyses Text", Document Imaging Report, v. 5, n. 19, Sep. 1995.

Microsoft Bookshelf '95 CD–ROM, Part No. 64897, 1987–1995, exerpts from the Help information contained in the software No Date.

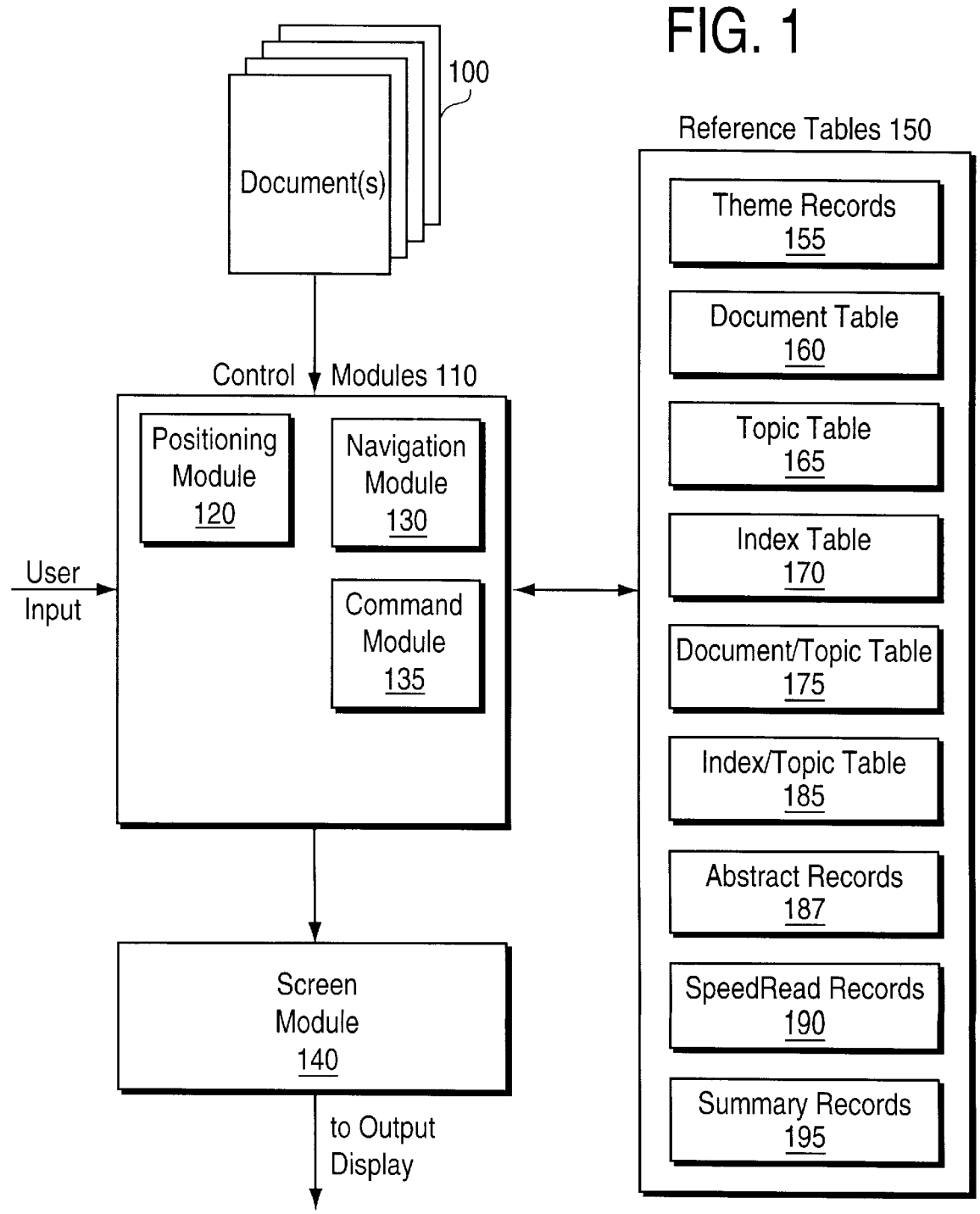

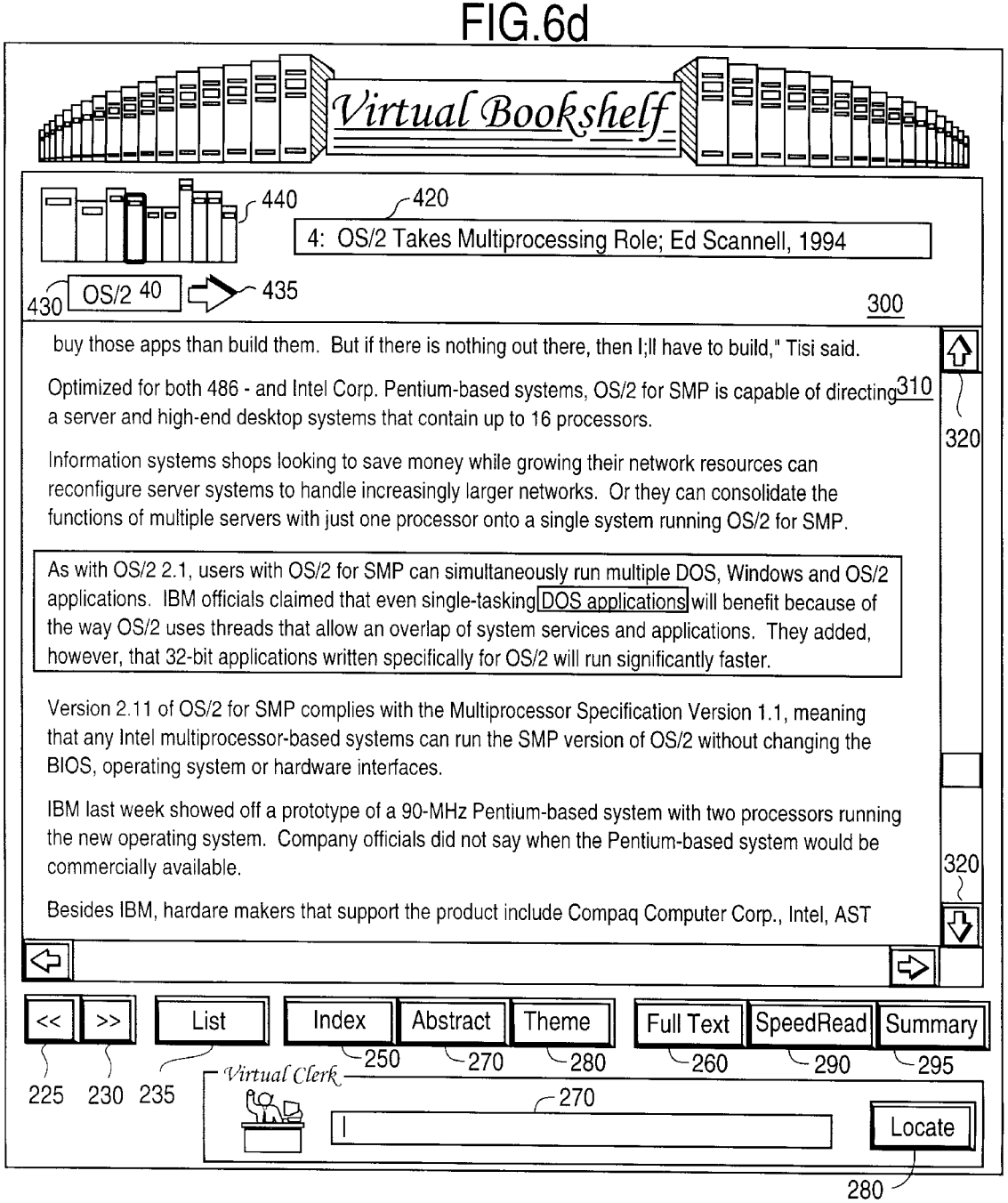

FIG. 9e

Virtual Bookshelf

4: OS/2 Takes Multiprocessing Role; Ed Scannell, 1994

OS/2 40 ➡   300

OS/2 Takes Multiprocessing Role    310
By Ed Scannell

With more than a year of beta testing in its rear-view mirror, IBM finally announced OS/2 for Symmetrical Multiprocessing last week, picking up support from a handful of Intel Corp.-based hardware suppliers along the way.    320

The new version is seen by some observers as central to any strategy IBM may use to persuade users to downsize from mainframes to true client/server solutions.

"OS/2 looks like it might be good for optimizing Intel-based hardware for scalable, mission-critical applications," said Kevin Dugan, Manager of systems development at the network management center of Cable & Wireless, Inc., a telephone company in Vienna, Va.

While there remains a scarcity of off-the-shelf application software for PC-based multiprocessor systems, the symmetrical multiprocessing (SMP) capabilities built into Microsoft Corp.'s Windows NT, and now OS/2, have stimulated some interest among users.

"SMP is really the only way I see client/server becoming competitive with mainframe functionality. I don't think in terms of large projects anymore unless I think about an SMP solution," said Art Tisi, Chief Information Office at The Metropolitan Museum of Art in New York.

Tough road ahead    320

Analysts agreed that there is a growing interest in SMP hardware and software, but they cautioned

| << | >> | List | Index | Abstract | Theme | Full Text | SpeedRead | Summary |

225 230 235          250     270      280       260       290       295

*Virtual Clerk*          270

The new version is seen by some observers as ...    Locate

280

VIRTUAL BOOKSHELF

FIELD OF THE INVENTION

The present invention relates to the field of user interfaces, and more particularly to a visual paradigm for browsing and locating information.

COPYRIGHT NOTICE

FIGS. 2a–2f, 3a–3b, 4a–4h, 5a–5d, 6a–6d, 7a–7e, 8a–8b, 9a–9f contain material which is subject to copyright protection. The copyright owner has no objection to the facsimile reproduction by any one of these Figures as they appear in the United States Patent and Trademark patent files or records, but otherwise reserves all copyright rights whatsoever.

BACKGROUND OF THE INVENTION

A general purpose search and retrieval system includes a database or repository of source information. For example, the repository may include documents, such as books, magazines, journals, etc. In general, the user accesses the repository to retrieve selected portions of information. Computer systems have increased the use of search and retrieval systems because a computer may access a database or repository from a remote location. The utility of such a search and retrieval system is to permit a user to access one or more sources of information in a large repository. For example, a search and retrieval system may permit a user to view documents available in a large repository equivalent to a library of books.

These search and retrieval systems require ways for the user to search the information contained within the source repository to access the desired information. For example, in a document based search and retrieval system, a user searches the repository of documents to retrieve one or more documents on a selected topic. In order to narrow the selection of documents, some search and retrieval systems partition the source repository into libraries or files. If the user selects a particular library or file, then the user is permitted to access the information contained within that library or file. Typically, the libraries or files are organized into general topics. However, each library or file may still contain thousands of documents. Therefore, to locate subtopics within a more general topic, the user must search through thousands of documents.

Search and retrieval systems include a search mechanism in order to locate information in the source repository. To search for documents within the source repository, a user enters a term that most resembles the source or topic desired by the user. The proper generation of the search term is absolutely crucial to locate the most relevant documents. Typically, in such a search system, the user enters the search term, and the system displays a list of documents that contains the specific search term. If the search term is too narrow, then the user runs the risk of missing the most relevant information in the source repository. The use of a broad search term covers a wider range of topics than the narrow search term, but typically identifies too many documents. Therefore, such search systems require that the user be able to construct a search term that covers the topic adequately, without encompassing too much material. Consequently, these search systems do not provide a good way for a user to locate documents in large source repositories.

In addition to being difficult to use, search and retrieval systems are non-intuitive. A user of the system does not typically think in terms of these specific search terms that are required to produce the best search results. When a search has been conducted, a user does not know whether the search has located all the documents covering the topic desired. In addition, search and retrieval systems do not provide a user with any indication as to the classification of a document, and the location of the document within the classification structure. The retrieval of only the documents containing the specific search term leads to tunnel vision in that the user is not permitted to see other issues, known as peripheral issues, that relate to the topics desired.

SUMMARY OF THE INVENTION

A virtual bookshelf system provides a user a way to browse and locate information associated with a plurality of documents. The virtual bookshelf system contains classification information to classify the documents in a hierarchical structure that includes a plurality of hierarchical levels based on pre-defined categories. The virtual bookshelf system displays a portion of the hierarchical structure including a representation of the categories. A user of the virtual bookshelf system may browse through the categories in the hierarchical levels to learn the general topics of the available documents. The user is permitted to select a particular category, and in response, the virtual bookshelf system displays document information for documents classified in the category selected. In one embodiment, categories are displayed in a history section to define a current path for the hierarchical structure from the highest hierarchical level to a currently selected hierarchical level. In addition, categories for the currently selected hierarchical level are displayed in a navigational section.

The virtual bookshelf system is cataloged to include the classification information. The classification information includes, in addition to the categories arranged in the hierarchical structure, cross references among the categories to further classify the documents. By cross referencing the categories, a detailed and accurate classification of the documents is achieved. The classification information further includes index heads and index context entries that are related to the index heads. The index heads are content carrying words from the documents but the words are not pre-defined categories. The index context entries are terms from the documents that are used in the context of the index heads. The hierarchical structure is expanded through mapping of the index heads into the predefined categories.

In one embodiment, the virtual bookshelf system includes functions for selected categories and index heads. A list function displays the list of documents classified for a selected category. A view function displays themes from the documents that are classified for the category selected. The virtual bookshelf system also includes action functions that operate on selected documents. An expand function displays the full text of the selected document. Also, an abstract function displays a brief synopsis of a selected document, and a speed read function displays full text of the selected document with major content bearing words highlighted. Furthermore, a summary function displays a summary of the document including main ideas of the document, and a theme function displays theme data identifying major themes for the document.

The virtual bookshelf system also includes a virtual clerk for locating documents of interest. The virtual clerk receives a locate term for locating information from the documents. In response, the virtual bookshelf system locates, if possible, one or more match categories in the hierarchical structure that relates to the locate term, and it displays a portion of the hierarchical structure that includes the match category such that a path is defined from the highest hierarchical levels to the hierarchical level of the match category. The locate term may be a natural language term, a category from the hierarchical structure, a concept, or an example of text from a document.

The virtual bookshelf system further includes a natural way to disambiguate locate terms that relate to more than one category. When the locate term is entered, the virtual bookshelf system determines whether the locate term identifies more than one category in the classification system. If the locate term relates to more than one category, then all match categories identified by the locate term are displayed. The virtual bookshelf system receives input from a user to identify a unique sense from the several match categories. In response, the proper sense for the match category is displayed.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

FIG. 1 is a block diagram illustrating one embodiment of a configuration for implementing the virtual bookshelf.

FIG. 6d illustrates an example display of text for a selected reference within a selected document.

FIG. 9e illustrates the query by example approach for the virtual bookshelf.

DETAILED DESCRIPTION

Virtual Bookshelf Overview

Figure 2A:
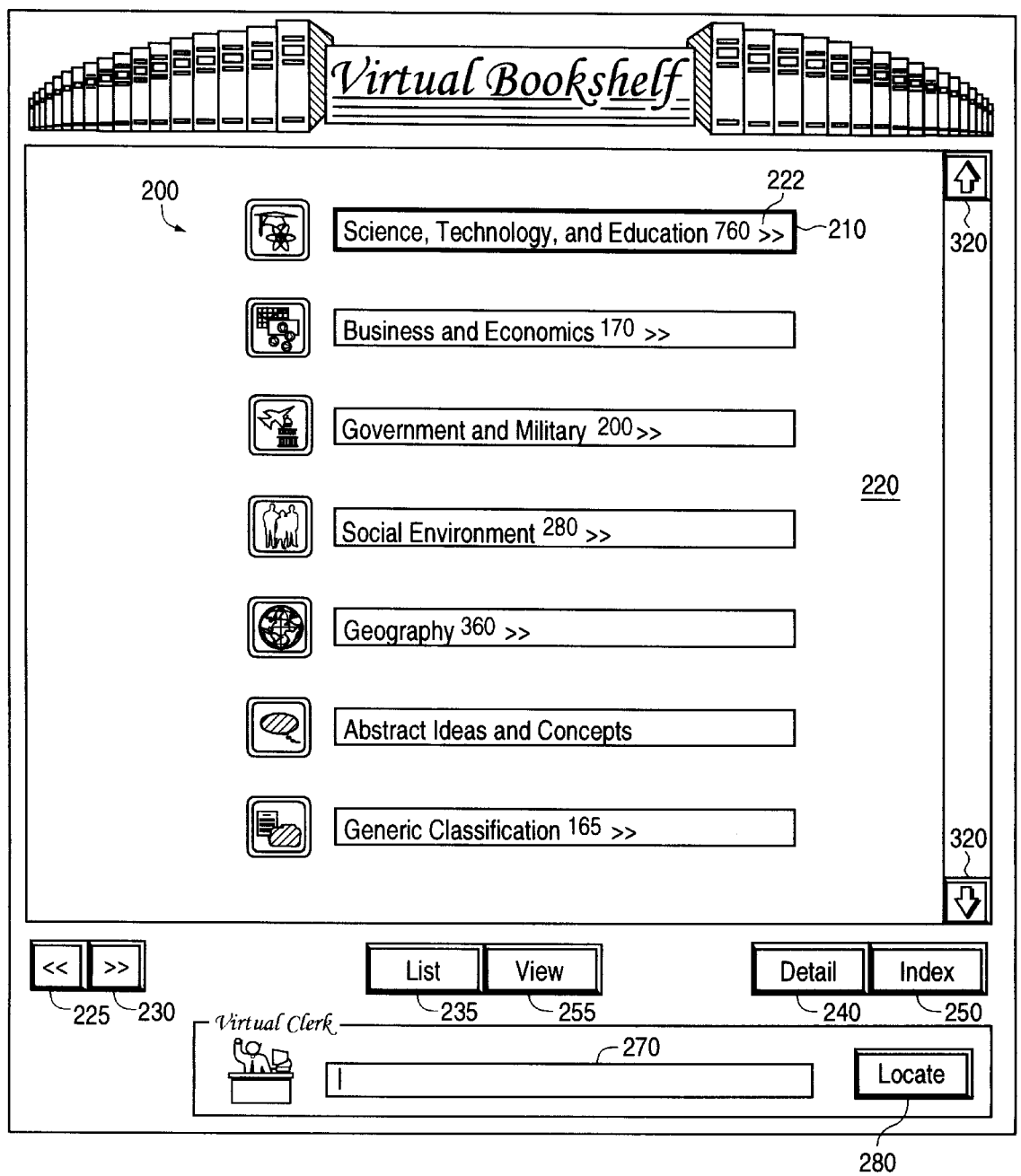
FIG. 2a illustrates an example home page or starting page for navigating the virtual bookshelf.

A virtual bookshelf provides a visual paradigm for locating and viewing information. The virtual bookshelf is cataloged to contain a plurality of source documents such that the source documents are classified in a hierarchical structure of concepts and topics contained in the documents. The hierarchical structure is based on a knowledge catalog, and the classification of the documents is based on one or more themes contained in the documents. A user locates, via the visual paradigm of the virtual bookshelf, information contained within the source documents. Once located, the virtual bookshelf system permits the user to extract information in a variety of ways.

The user may locate information from the source documents by browsing the hierarchical structure of topics. In this way, the user is permitted to visualize, in a hierarchical structure, the concepts and topics contained in the documents. In the preferred embodiment, for a selected topic in the hierarchy, the user is presented with peripheral issues, related to a selected topic, prior to receiving a list of documents for that topic. In addition to browsing the hierarchies, the user may query the virtual bookshelf system with a token to locate information. In response, the virtual bookshelf displays a portion of the hierarchical structure in the topic area relating to the token. In this way, the user is permitted to view concepts and topics that are peripheral to the token.

In a preferred embodiment, the virtual bookshelf system is analogous to a bookstore. For example, a person may visit a bookstore to find reference books on a selected topic. In order to locate books on the selected topic, the person may proceed to the area in the bookstore that contains the general category for which the selected topic is included. For example, if the selected topic is "semiconductor manufacturing", then the person would locate the general area in the bookstore that contains books on the category "technology." In addition, the person may look for more specific subcategories under the general category. For the semiconductor manufacturing example, the person may look for the sub category "electronics" under the general category "technology." After locating the books in the sub category "electronics", the person may proceed to search the back of book indexes of books for the selected topic "semiconductor manufacturing."

The bookstore paradigm for locating information requires a person to first locate the general category. For the "semiconductor manufacturing" example, a person does not directly search for books on manufacturing. Instead, the person proceeds to the area of the bookstore that contains books on technology and electronics. Furthermore, once the person is in the proximity of the technology and electronic books, other books on related topics are in plain view. For the above example, although the primary area of interest is "semiconductor manufacturing", a person may also be interested in books on engineering economy as it relates to "semiconductor manufacturing." Consequently, in the bookstore paradigm, a person is able to view a number of related topics, referred to as peripheral topics, when in the area of the general category.

The virtual bookshelf provides a similar paradigm as the bookstore. For example, a user of the virtual bookshelf system browses the hierarchical structure to view categories for the source documents similar to a person that browses the aisles of a bookstore to view general categories of books available. Furthermore, the user of the virtual bookshelf is presented with peripheral topics or themes relating to the general topic.

FIG. 1 is a block diagram illustrating one embodiment of a configuration for implementing the virtual bookshelf. The virtual bookshelf configuration contains documents, labeled documents 100 in FIG. 1. In general, the documents 100 provide the source of available information for use with the virtual bookshelf. The documents 100 may include a compilation of information from any source. For example, the documents 100 may be information stored on a computer system as readable text. Alternatively, the documents 100 may be accessed over a network and stored at a central location, such as a server. The virtual bookshelf configuration also contains reference tables 150. As is described more fully below, the reference tables 150 are generated based on the documents.

The virtual bookshelf configuration further includes control modules 110 for executing the functions described herein. As shown in FIG. 1, the control modules 110 include a positioning module 120, a navigation module 130, and a command module 135. The control modules 110 receive, as inputs, the documents 100, user input, and reference tables 150, and generate, as an output, display information. Specifically, the positioning module 120 receives query information from the user input to locate information in the virtual bookshelf. In response, the positioning module 120 utilizes the reference tables to generate display information that reflects the general location in the hierarchy for which the specific information requested is located. The navigation module 130 receives user input, and generates, from the reference tables 150, display information to permit a user to browse the hierarchies of the virtual bookshelf. Furthermore, the command module 135 generates display information to implement a plurality of action functions as is described more fully below.

The virtual bookshelf configuration also includes the screen module 140. The screen module 140 receives display information from the control modules 110, and generates specific graphical information for output to an output display. The specific operation of the screen module 140 is dependent upon the computer system and output display. The screen module 140 is intended to represent a broad category of output display drivers, which are well known in the art and will not be described further.

Cataloging the Virtual Bookshelf

The virtual bookshelf is cataloged through generation of the reference tables 150. As discussed above, the information in the reference tables 150 is based on the documents 100 and is utilized to generate the display information. The reference tables 150 may be generated from the documents 100 through use of a computer program operating on a computer system. Alternatively, the reference tables 150 may be generated and compiled from human labor, and subsequently input to the virtual bookshelf configuration as tables. As shown in FIG. 1, the reference tables 150 include theme records 155, document table 160, topic table 165, index table 170, document/topic table 175, index/topic table 185, abstract records 187, speed-read records 190, and summary records 195.

The document table 160 contains information about each of the documents 100 including document level theme and statistical information. The topic table 165 includes a hierarchy of topics for the entire set of documents 100. Specifically, the topics stored in the topic table 165 are based on themes extracted from the documents 100. The extracted themes or topics are then mapped to static ontologies in a knowledge catalog. In this way, the topic table 165 stores the document topics in a hierarchical structure for use by the control modules 110.

The document/topic table 175 contains a cross reference between the documents 100 and the topics stored in the topic table 165. The index table 170 contains index information including the text, type, and location of index phrases from the documents 100. The index/topic table 185 contains cross references between index heads, stored in the index table 170, and the topics stored in the topic table 165. The mapping of index heads to topics for generation of the topic table is described more fully below. The reference tables 150 further includes theme records 155. The theme records 155 contain thematic information that identifies the most important themes from each document. The abstract records 187 includes at least one abstract for each document in the documents 100. The speed read records 190 contain, for each document in documents 100, main ideas and concepts, expressed in an abbreviated form, for the corresponding document. When displayed, a user is permitted to speed read the corresponding document. Furthermore, the summary records 195 contain a summary for each document in the documents 100.

A knowledge catalog is used in the virtual bookshelf of the present invention. The knowledge catalog provides a unique infrastructure to accurately represent concepts contained in the documents that define knowledge. The knowledge catalog includes a set of static ontologies to define knowledge. The knowledge catalog may be characterized as including several static ontologies because the knowledge catalog provides multiple views, characterizations, and organizations of concepts.

In general, the knowledge catalog contains a broad coverage of concepts to provide a world view of knowledge. The static ontologies are configured as hierarchical structures such that knowledge concepts are organized from high level generalized concepts down to more specific concepts. The static ontologies are parallel and independent of each other. Appendix A includes a list of static ontologies arranged in a hierarchical structure for use with the virtual bookshelf of the present invention. Although Appendix A includes a set of static ontologies for the preferred embodiment, modifications to the classifications or concepts may be made without deviating from the spirit or scope of the invention.

Each ontology contains a plurality of levels that form the hierarchical structure. For example, a "business and industry" static ontology contains three levels of concept classifications under the highest level concept, and "economics" contains four levels of concept classifications. The actual configuration, structure and orientation of a particular ontology is dependent upon the subject matter or field of the ontology. Therefore, each ontology in the set of static ontologies contain a different point of view. The different points of view for the static ontologies result in different approaches or different ways of viewing the knowledge concepts in the different static ontologies. Consequently, the organization of the knowledge concepts in each ontology is not consistent. As is explained below, the different points of view for the ontologies permit viewing or browsing "like" forms of knowledge with "unlike" forms of knowledge in the virtual bookshelf.

The ontologies contained within the knowledge catalog are organized such that the concepts are independent of language and culture. Therefore, the set of static ontologies in the knowledge catalog provide a world view of knowledge for the virtual bookshelf. Some of the ontologies are not as much industries but rather concrete concepts. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

Some static ontologies represent knowledge concepts that have concrete definitions, but may be applicable to one or more specific industries or categories (e.g. the terms are generic). For example, the word "plant", when used to describe a manufacturing plant, is a concrete term that applies to many industries. Other static ontologies contain representations of words that are not concrete, but rather describe abstract concepts. For example, the concepts of "knowledge" and "methods" do not describe material items, but are "abstract" concepts.

The hierarchically structured classifications for the documents in the virtual bookshelf may be semantic derivatives and/or linguistic derivatives of the high level concept. For example, a classification hierarchy may associate a "house" with articles placed within a house, such as dining room tables, chairs, bedroom furniture, etc. For this example, a classification hierarchy that includes semantic derivative concepts based on the "house" concept is desirable. However, for a purely linguistic classification hierarchy, the house "concept" may include types of houses, such as a ranch style house, a contemporary house, etc. Utilizing the static ontologies, the virtual bookshelf links both concepts representing articles placed within a house and concepts representing types of houses to the higher level "house" concept. Consequently, the virtual bookshelf presents a true knowledge map of the documents.

The topic table 165 in the virtual bookshelf system contains cross references among a plurality of topics. In general, cross references are contained in the topic table 165 if a document is classified under more than one category in the knowledge catalog (Appendix A). By cross referencing the categories, a detailed and accurate classification of the documents is achieved. An example of cross-referencing categories in the topic table 165 is described below in conjunction with Table 1.

The index table 170 stores index phrases extracted from the documents including the text, type, and location of the index phrases. The index phrases include index heads and index context entries that relate to the index heads. If the index context entry is not a head word, then the index table 170 contains the parent or index head for the index context entry. The index heads are content carrying words from the documents but the words are not pre-defined knowledge catalog categories. For example, the term "OS/2", which defines a specific operating system, is a content carrying noun. However, "OS/2" is not a specific category in the knowledge catalog. If the documents in the virtual bookshelf include material on "OS/2", then "OS/2" is stored as an index head. The index context entries are index phrases that are used within the context of an index head. For the OS/2 example above, if a document contained information on the marketing of the OS/2 operating system, then "marketing" is stored as an index context entry for the index head "OS/2." Note that marketing may also be stored as an index head. Index heads are dynamically classified in the hierarchical structure, and that classification is stored with the index head. From the location of the index phrases, index references are displayed as described more fully below.

The index/topic table 185 stores information to map the index phrases from the index table 170 to the topics or categories in the topic table 165. Therefore, the index/topic table 185 provides a link between the index phrases and the categories in the knowledge catalog. For example, the index head "OS/2" is mapped to the category "operating systems" such that the OS/2 term resides in the next hierarchical level underneath the "operating systems" category. In this way, the hierarchical structure is expanded to include the topics from the topic table 165 as well as the index phrases from the index table 170.

As described fully below, a user is presented with a hierarchical structure of categories that reflect the content of the available documents 100. The categories in the hierarchical structure, displayed in response to user input, are topics (e.g. themes derived from the documents) and index heads. In general, the navigational module 130 utilizes the information in the reference tables 150 to generate the hierarchical structure for display in response to user input. All topics, including cross references to other topics, from the available documents 100 are stored in the topic table 165 including the hierarchical arrangement of the topics. In addition, all index heads from the available documents 100 are referenced to the topics in the index/topic table 185 to expand the hierarchical structure. The navigational module 130 utilizes the topic table 165 and the index/topic table 185 to display the hierarchical structure. As described below, the navigational module 130 displays a start or home page to permit a user to navigate the hierarchical structure. For subsequent displays, the navigational module 130 receives user input, and it displays a different portion of the hierarchical structure based on the selection of categories or the invocation of functions. The navigational module 130 also stores navigational path information that defines the user navigated path from the high level to a currently selected level of the hierarchical structure.

At any point in the hierarchical structure, a user may obtain the available set of documents for a selected category, entitled a bookshelf set of documents. The bookshelf set of documents contains all documents classified for the selected category. The bookshelf set of documents is based on the location of the category in the hierarchical structure. As a user navigates through the hierarchical structure, the lower levels of the hierarchical structure contain sub categories of categories in the next higher level. The virtual bookshelf utilizes this paradigm to generate a bookshelf set of documents such that documents in a bookshelf set contain topics and themes derived from the navigational path generated by the user.

A category may be presented in the hierarchical structure at many different locations. For example, a category for "marketing" may be a sub category for "operating systems" as well as a sub category for "computer hardware." For this example, a first bookshelf set of documents for "marketing" as a sub category for "operating systems" is different than a second bookshelf set of documents for "marketing" as a sub category for "computer hardware" (e.g. the first bookshelf set of documents is about marketing operating systems, whereas the second bookshelf set of documents is about marketing computer hardware).

The control modules 110 generate, from use of the reference tables 150, the bookshelf set of documents for a selected category. In general, to generate a bookshelf set, the command module 135 accesses the topic table 165 and the index/topic table 185 to extract all relevant topics and index heads for the selected category. Because the hierarchical structure is, in essence, a tree structure that contains several branches, the navigational module 130 retains hierarchical structure path information of the current path navigated (i.e. the navigational path used to locate the category selected). Based on the hierarchical structure path information, the command module 135 accesses the topic table 165 and the index/topic table 185 to extract the relevant topics in the hierarchical structure path. Based on these relevant topics, the command module 135 accesses the document/topic table 175 to extract a list of documents that contains material on the relevant topics in the hierarchical structure path.

Navigating the Virtual Bookshelf

Navigating the Virtual Bookshelf Using Topics:

FIG. 2a illustrates an example home page or starting page for navigating the virtual bookshelf. The following example displays (FIGS. 2a–2e) illustrate navigating with the categories generated from the topic table 165. The display includes a menu of the hierarchies labeled 220 on FIG. 2a. As shown in FIG. 2a, the virtual bookshelf system displays a number of high level categories that are indicative of the topics contained in the available documents 100. In a preferred embodiment, the highest level categories are derived from the knowledge catalog (Appendix A). Specifically, the highest level categories are "science, technology, and education", "business and economics", "government and military", "social environment", "geography", "abstract ideas and concepts", and "generic classification."

Each top category contains an icon, such as the icon for the "science, technology, and education" labeled 200 on FIG. 2a, that graphically represents the respective category. In a preferred embodiment, each category name is displayed in a box, such as box 210 for "science, technology, and education", for selection by a user. Within the box for a corresponding category, a number, such as the number "760" for the "science, technology and education" category, is displayed. The number indicates the number of documents that relate to the particular category available on the virtual bookshelf. Furthermore, a symbol ">>", labeled 222 on FIG. 2a, is provided in the box to indicate that there are lower level hierarchies within the corresponding category.

Below the menu of the hierarchies 220 is a button bar area that contains a number of buttons to execute functions and commands within the virtual bookshelf. Specifically, in one embodiment for the home page, the button bar area on the output display contains five action buttons labeled 225, 230, 235, 255, 240, and 250 on FIG. 2a. In one embodiment, the action functions are invoked by "clicking" the corresponding action button with an input device, such as a mouse. As is described further below, not all buttons are valid for all selected items on any particular display.

The contract button, labeled 225 on FIG. 2a, includes the "<<" symbol, and invokes the contract function. The contract function displays an upward or higher category in the hierarchical structure to provide more generalized information. The expand action button, labeled 230, includes the ">>" symbol, and invokes the expand function. The expand function displays lower hierarchical structures that provide more specific information. The navigation module 130 executes the contract and expand functions, in response to user input, by accessing the topic table 165 and the index/topic table 185 to retrieve the hierarchies.

The list action button, labeled 235, invokes a list function that displays a bibliographical list of documents represented by the selected category. To execute the list function, the command module 135 generates a bookshelf set of documents for the selected category. The command module 135 then accesses the document table 160 to extract the bibliographical list of documents for the documents identified in the bookshelf set of documents.

The view action button, label 255 on FIG. 2a, invokes a peripheral display function that, in essence, displays a peripheral view of a selected category by displaying relates issues or themes to the selected category. The command module 135 executes the view or peripheral display function by first generating a bookshelf set of documents for the selected category. The command module 135 then accesses the theme records 155 to obtain the themes corresponding to the documents in the bookshelf set of documents. These themes represent the most important themes contained in the bookshelf set of documents for the selected category. In one embodiment, the virtual bookshelf system limits the selection of themes to the 16 most important themes. For each theme used, the command module 135 generates a bookshelf set of documents. The theme bookshelf sets of documents are generated from the hierarchical structure defined by the user's navigational path to the selected category. Therefore, the theme bookshelf sets of documents present several subsets of the entire bookshelf set of documents for the selected category.

The detail action button, labeled 240 on FIG. 2a, invokes a detail function that displays all entries that pertain to the selected category as an index head in the index table 170. To execute the detail function, the command module 135 utilizes the index/topic table 185 to correlate topics of the selected category to the relevant index heads, and then it accesses the index table 170 to extract the relevant entries.

The index action button 250 invokes an index function that displays a "back of book" index for a selected category or document in a traditional "back of book" index format. For a selected category, the "back of book" index is a combined "back of book" index for a bookshelf set of documents that combines the indexes of all of the documents in the bookshelf set. To execute the index function for a bookshelf set of documents, the command module 135 receives the navigational path information used to generate the bookshelf set. Based on the navigational path information, the command module 135 utilizes the index/topic table 185 to correlate the categories in the navigational path to index heads, and it accesses the index table 170 to extract the "back of book" index information for the index heads identified. To execute the index function for a single document, the command module 135 utilizes the document/topic table 175 to obtain the topics contained in the selected document, and it accesses the index/topic table 185 to correlate the topics obtained to index heads in the index table 170. The "back of book" index information is extracted based on the index heads identified. The contract, expand, list, view, detail, and index functions are described and illustrated more fully below.

The virtual bookshelf display area 220 permits highlighting of a particular category for selection. In one embodiment, the border or box around the category area is highlighted or boldfaced to indicate selection of the particular category. For example, as shown in FIG. 2a, the "science, technology, and education" category 210 is selected, and it is indicated by the highlighted border for the category. The home page shown in FIG. 2a further includes a virtual clerk for locating information within the virtual bookshelf paradigm of the present invention. The virtual clerk contains a virtual clerk data entry field 270 and a locate button 280. The operation of the virtual clerk is described more fully below.

Figure 2B:
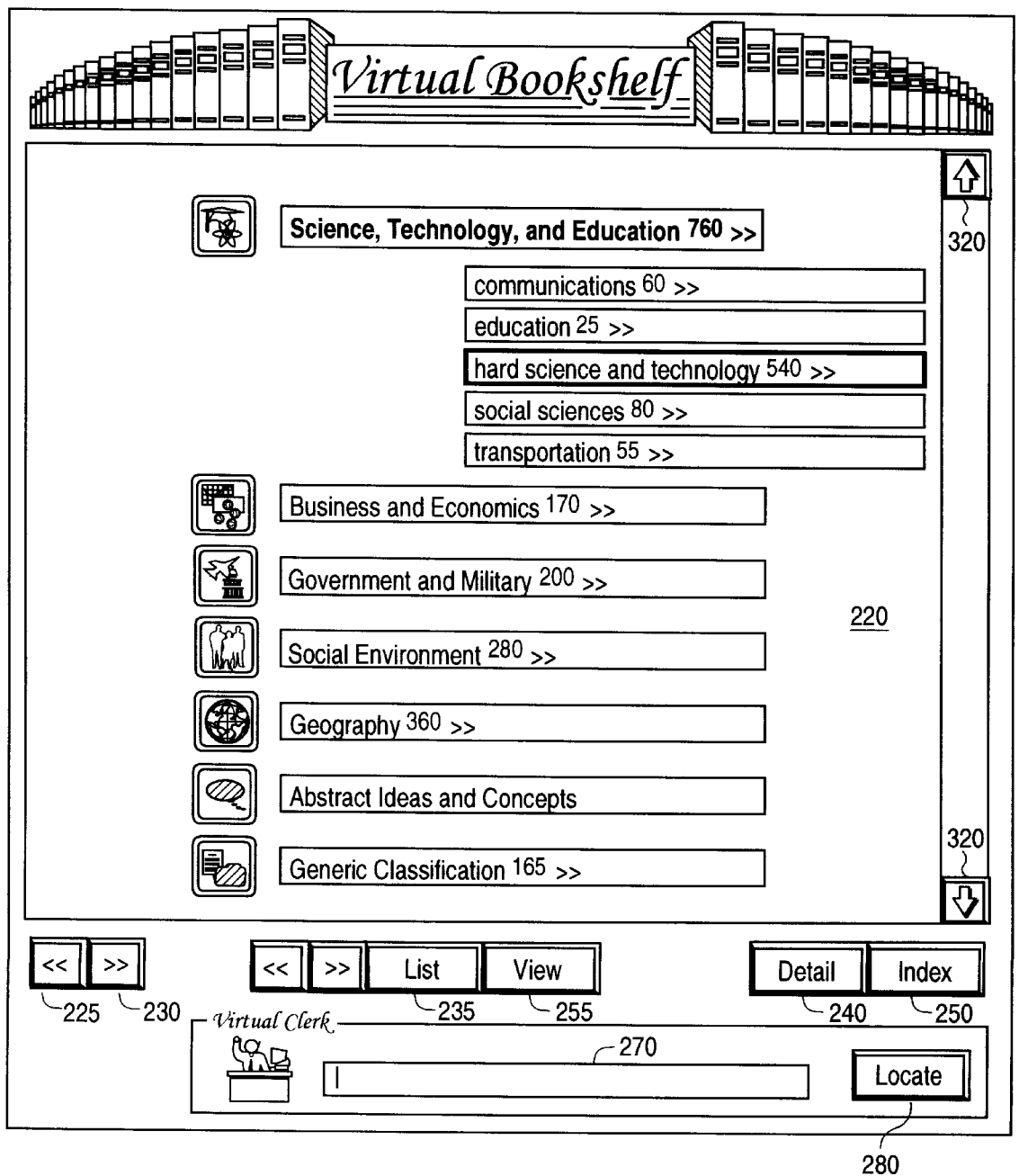
FIG. 2b illustrates a display after expansion of the "science, technology, and education" category into a number of categories arranged in a lower hierarchical level.

A user may browse the virtual bookshelf to locate information through navigation of the hierarchies. FIG. 2b illustrates expansion of the "science, technology, and education" category into a number of categories arranged in a lower hierarchical level. The example shown in FIG. 2b is generated in response to a user selecting the "science, technology, and education" category and invoking the expand function via the expand button 230. In general, when one of the high level knowledge catalog categories are selected for expansion, a list of categories in the next lower level of the hierarchy for the selected item are displayed. The categories in the next level of the hierarchy for the "science, technology, and education" category are "communications", "education", "hard science and technology", "social sciences", and "transportation." Again, the number of documents available in the virtual bookshelf system that pertain to that category is displayed adjacent to the category name.

Figure 2C:
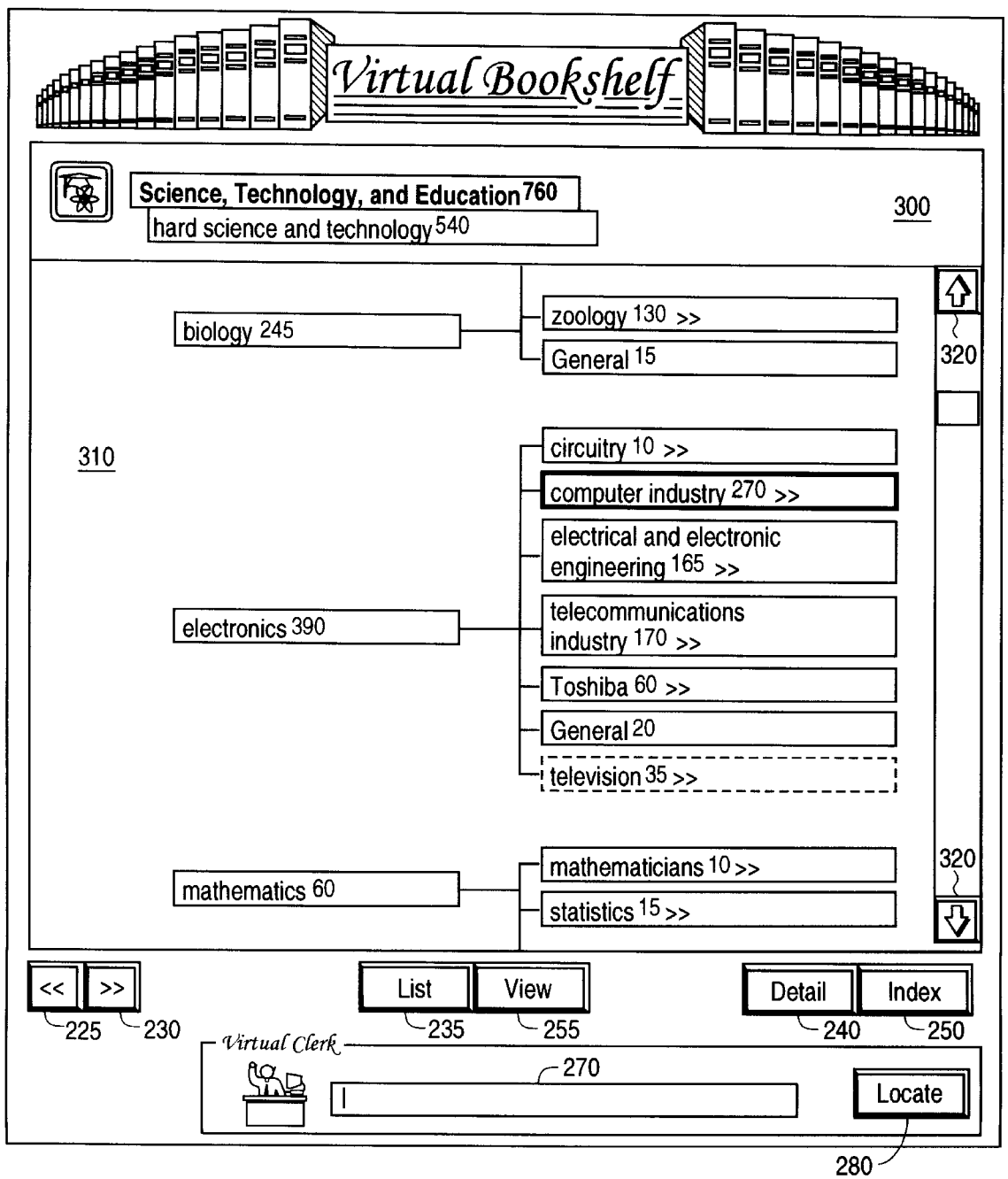
FIG. 2c illustrates a display after expansion of the "hard science and technology" category into a number of categories arranged in two lower hierarchical levels.

FIG. 2c illustrates further expansion of the virtual bookshelf hierarchy. For the example illustrated in FIG. 2c, the sub category "hard science and technology" was selected, and the expand action button 230 pressed. In response, the virtual bookshelf system displays the first page of the hierarchical structure for the parent node of "hard science and technology." The hierarchical structure is displayed in a navigation section 310 and a history section 300. The navigation 310 further includes a scroll bar 320 to permit a user to scroll up and scroll down the hierarchy for the "hard science and technology" parent category. When a category is selected for expansion, the category is added to navigation history, and it is displayed in the history section 300 located above the navigation section 310. For the example shown in FIG. 2c, the "science, technology, and education" and "hard science and technology" categories are shown as the parent categories for the selected hierarchy displayed in the navigation section 310.

A category may be labeled as "general" as shown in both the "biology" and "electronics" parent categories. These general categories represent documents that have been classified under its parent category in the hierarchy. For the example displayed in FIG. 2c, there are 390 documents represented by the category "electronics." Of those 390 documents, 270 of the documents are classified under "computer industry", 165 are classified under "electrical and electronic engineering", and 20 are classified under the parent category "electronics." A document may be classified under more than one area. Categories in broken line boxes, such as the "television" category under the "electronics" parent category, represent those categories derived from multiple classifications of documents. These categories are displayed as a result of cross referencing in the reference tables 150. At this level of browsing the hierarchy, a user may select an action function via an action button for any category in the history section 300 or navigation section 310.

Figure 2D:
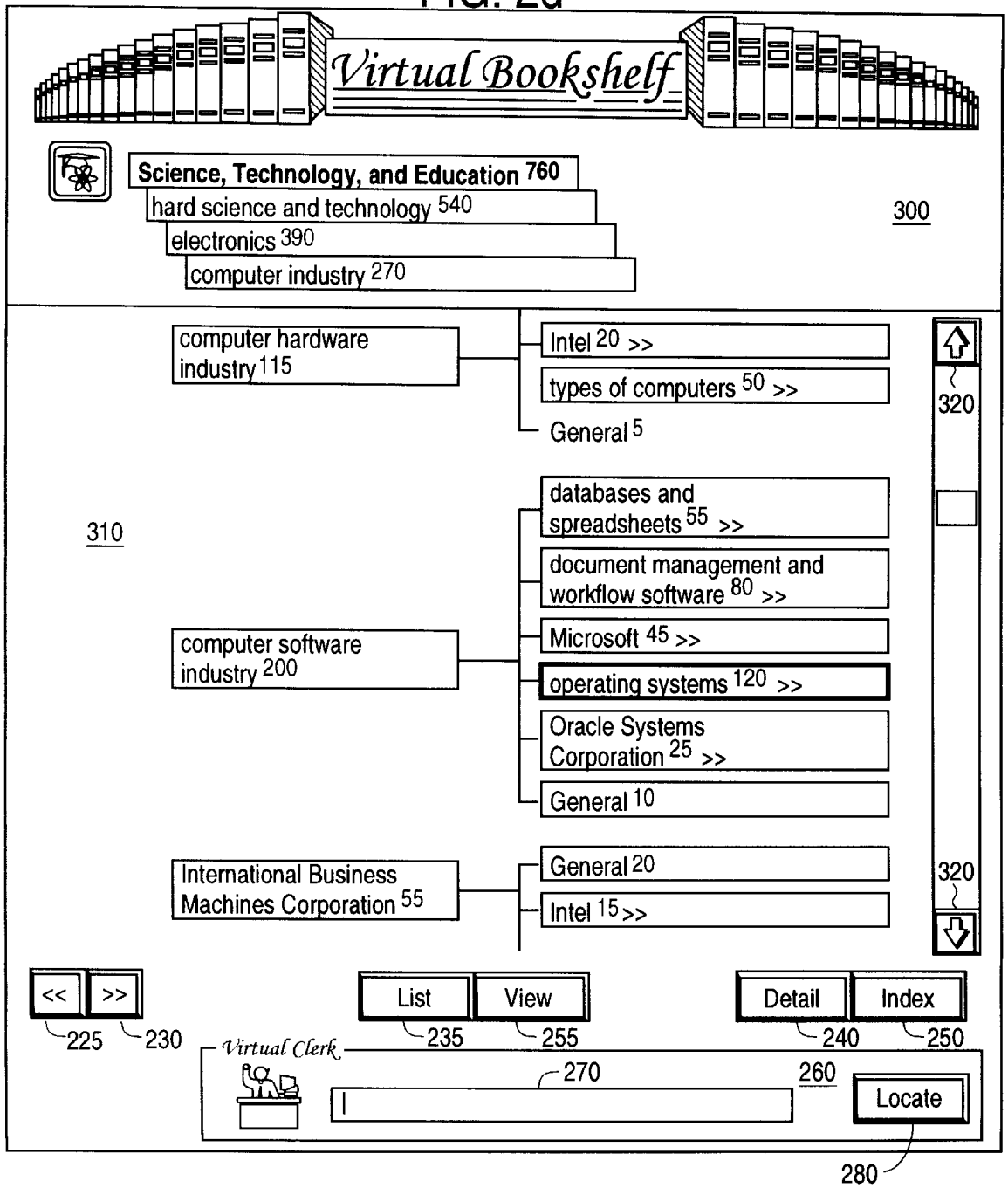
FIG. 2d illustrates a display after expansion of the "electronics" and "computer industry" categories into a number of categories arranged in two lower hierarchical levels.

FIG. 2d illustrates displaying further detail of a selected hierarchy. For the example shown in FIG. 2d, the "computer industry" category was selected, and the expand action button 230 was pressed resulting in the display of the first page of the expanded hierarchy for the "computer industry" category. Furthermore, the scroll bar 320 was used to page to the current display screen. In response to these user actions, the virtual bookshelf displays the selected category "computer industry" and its parent category "electronics" in the history section 300. The virtual bookshelf also displays the second page of the next two levels of the hierarchy under the "computer hardware industry" category in the navigation section 310.

As discussed above, the hierarchical structures are dynamically created from the inner play of the topic table 165 and the index/topic table 185 (FIG. 1). For the example display shown in FIG. 2d, the "computer hardware industry" and the "computer software industry" categories are part of the basic structures stored in the topic table 165. The "International Business Machines Corporation" category is an index head that is cross referenced to the topic "computer industry" in the index/topic table 185. In the next lower level under the "computer software industry" category, "databases and spreadsheets", "document management and work flow software", and "operating systems" are part of the basic structure stored in the topic table 165. The categories "Microsoft" and "Oracle Systems Corporation" are index heads from the index table 170, and are cross referenced to the topic "computer software industry" in the index/topic table 185.

Figure 2E:
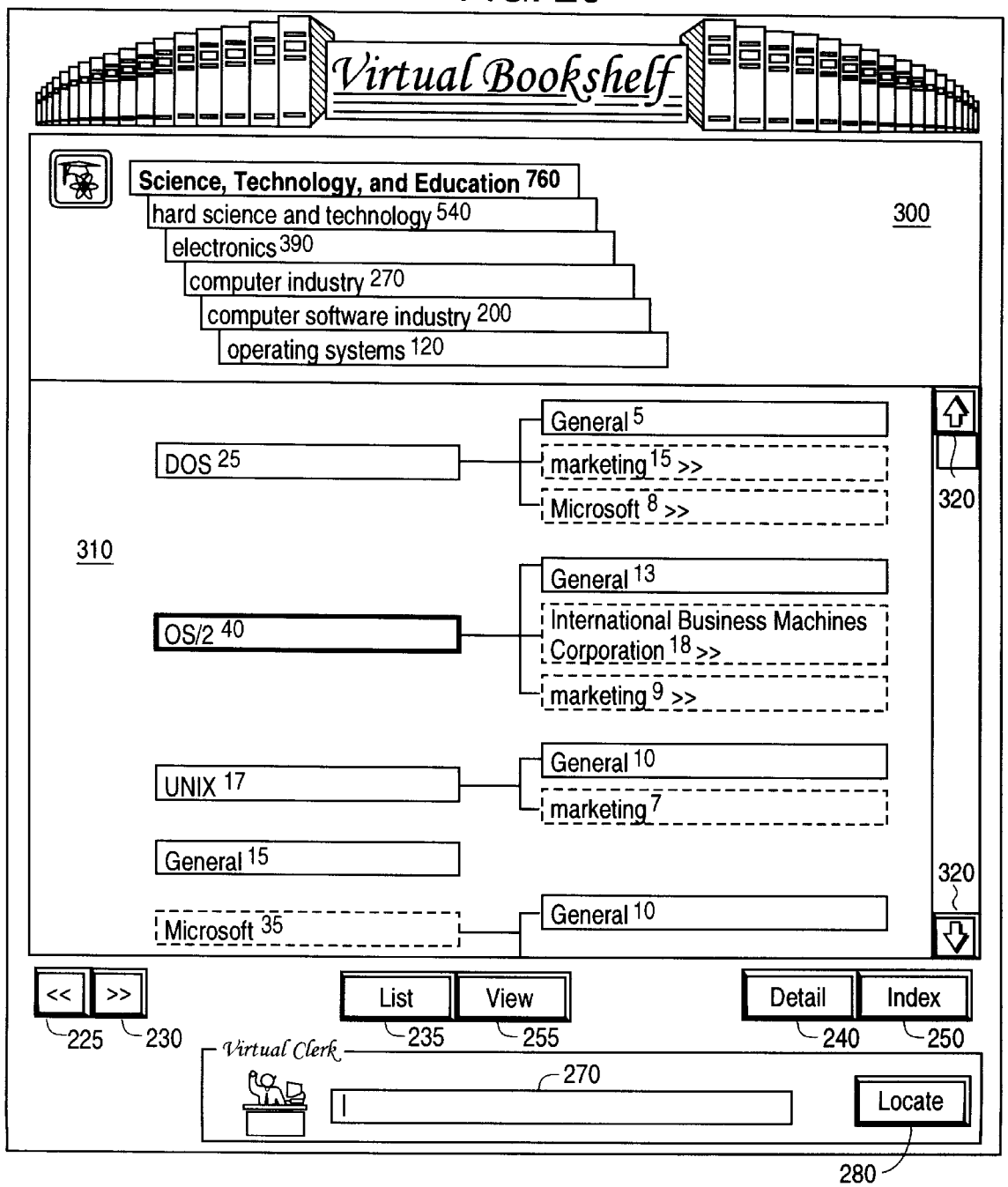
FIG. 2e illustrates a display after expansion of the "computer software industry" and "operating systems" categories into a number of categories arranged in two lower hierarchical levels.

FIG. 2e illustrates further expansion of the "operating systems" category selected from the display shown in FIG. 2d. The display illustrated in FIG. 2e is generated in response to the user selecting the "operating systems" category and pressing the expand button 230. As shown in FIG. 2e, the selected category "operating systems" and its parent category "computer software industry" are added to the history section 300. In addition, the next two levels of the hierarchy under the "operating systems" category are displayed. For this example, "operating systems" is the lowest level category of the static hierarchy defined in the topic table 165. The categories "DOS" and "OS/2" are derived from the index/topic table 185. The "marketing" categories are identified by the broken line box because they are topic cross references under "DOS", "OS/2", and "UNIX." The hierarchies that include "marketing" are derived from documents that are classified as covering both the parent category and marketing subject matter.

Figure 2F:
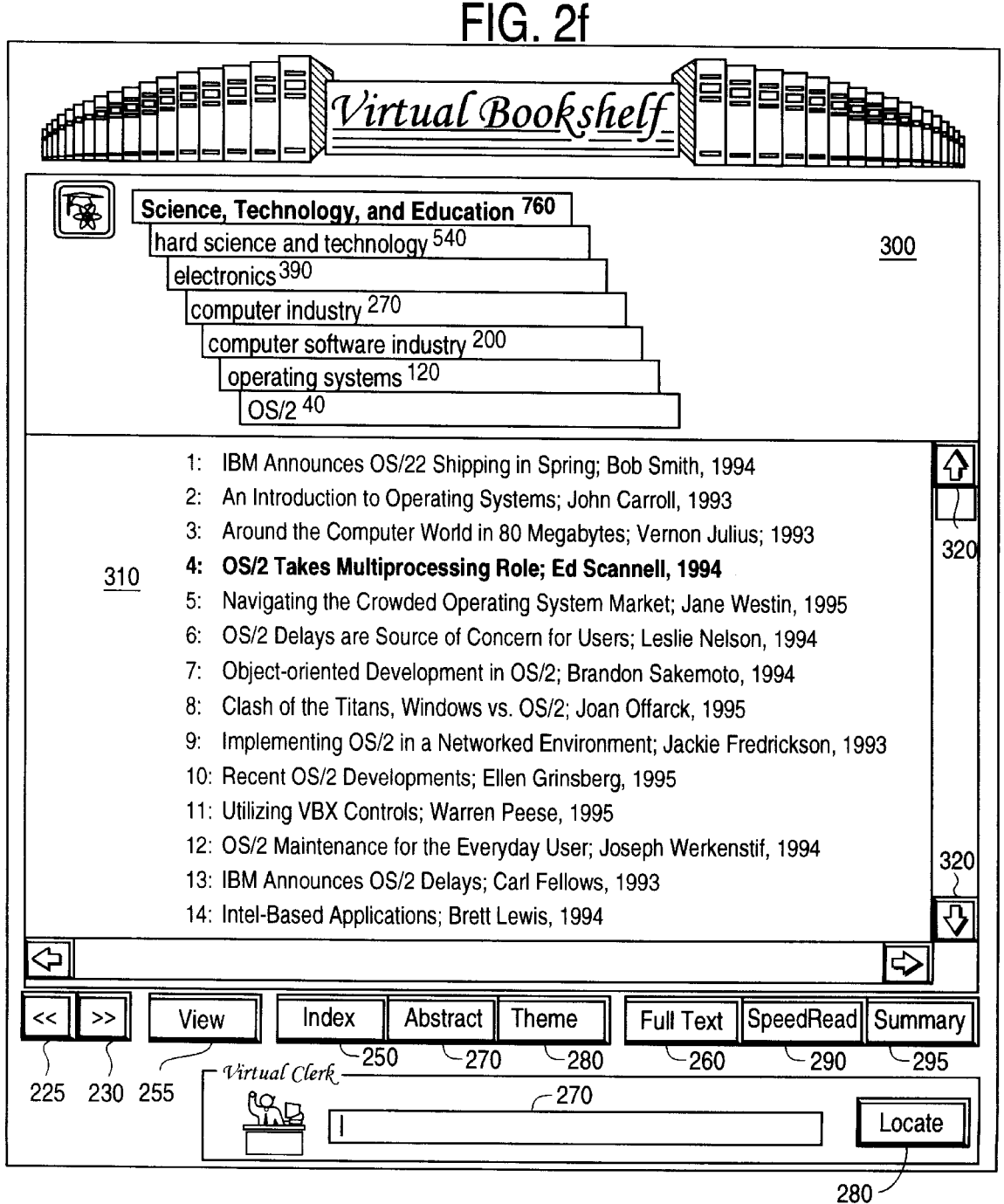
FIG. 2f illustrates a list function for the virtual bookshelf system.

FIG. 2f illustrates a list function for the virtual bookshelf system. For the example display illustrated in FIG. 2f, the "OS/2" category was selected, and the list active button 235 was pressed (FIG. 2e). In response, the selected category "OS/2" is added to the history section 300, and the first page of the bibliographical entries for the 30 documents classified under "OS/2" is displayed. At this point, any of the display categories in the history section 300 may be selected, and the contract button 225 pressed in order to move back up the hierarchy to the selected level. In addition, a document may be selected at this time and a document function invoked.

Virtual Bookshelf Peripheral Display:

The virtual bookshelf generates peripheral views. In general, peripheral views present a user with one or more themes that relate to the current bookshelf set of documents. In the preferred embodiment, the virtual bookshelf system displays the most relevant themes from the current bookshelf set of documents. As described below, each theme or category is presented as a bookshelf set of documents for selection by the user. The peripheral view presents information to the user in a visual manner that permits the user to obtain a broad view of the topics or themes contained in the current bookshelf set of documents. The presentation of themes for a selected bookshelf set is entitled a peripheral view because the user is permitted to view specific issues or themes contained in the bookshelf set, thereby broadening the view of the content contained with the selected bookshelf set of documents.

A major problem with prior art search and retrieval systems is tunnel vision in that the user does not get a sense of location, in terms of topic or document classification, and the user does not receive information on related issues or topics contained within a found set of documents. For example, typical prior art search and retrieval systems present a user with a list of documents in response to a search request. Under the prior art paradigm, the user only views the title of the documents. In contrast, the virtual bookshelf's peripheral views provide a broader view of information for a found set of documents (e.g. the bookshelf set) by visually presenting the themes contained in the bookshelf set. From the broader presentation of the themes, a user may select a more specific theme topic to narrow the bookshelf set to the desired theme or topic. Furthermore, when presented with numerous themes related to the selected category, the user may select an area of interest that, but for the presentation in the peripheral view, the user would not have considered otherwise.

Figure 3A:
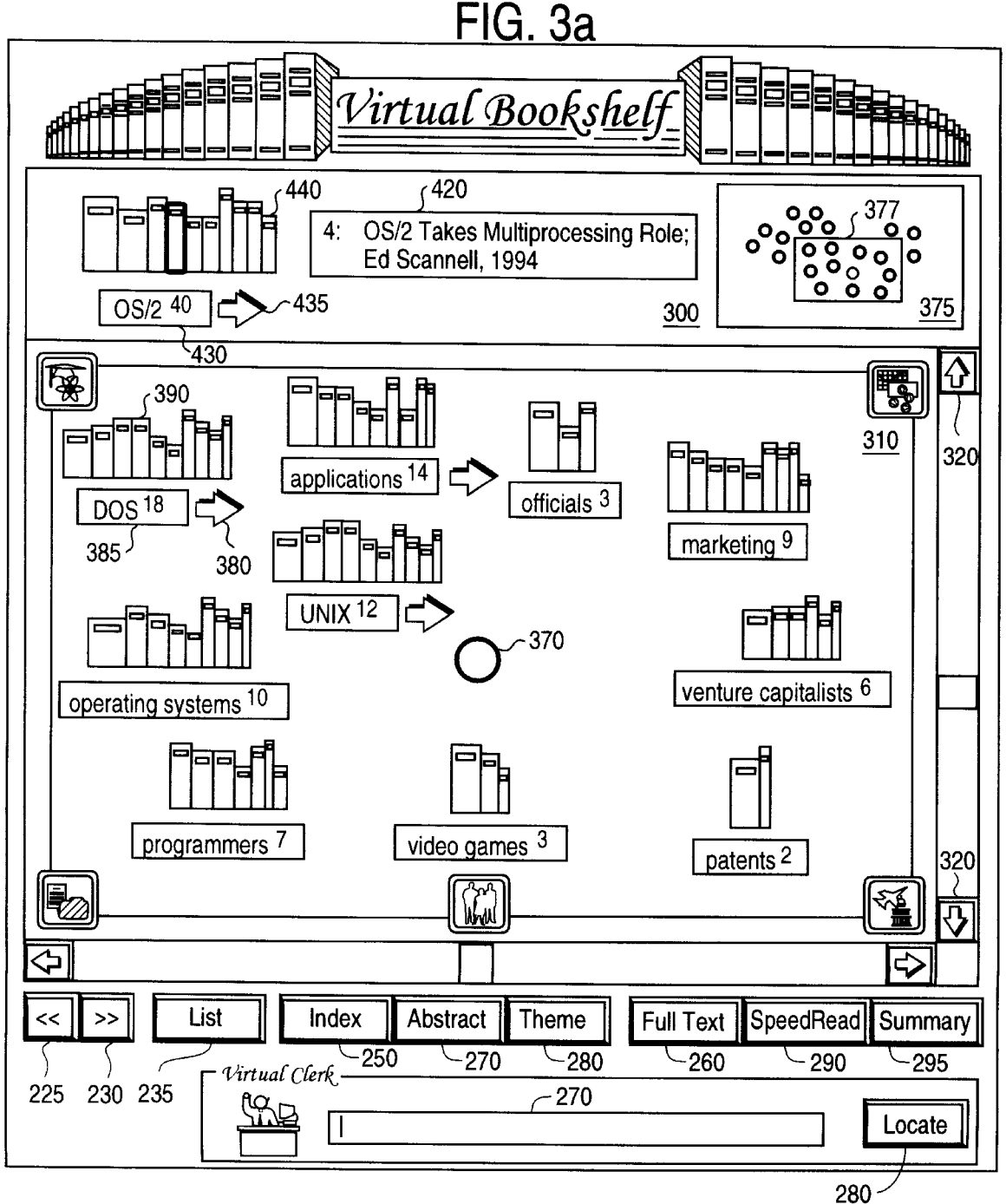
FIG. 3a illustrates an example display that includes a peripheral view for a selected category.
Figure 3B:
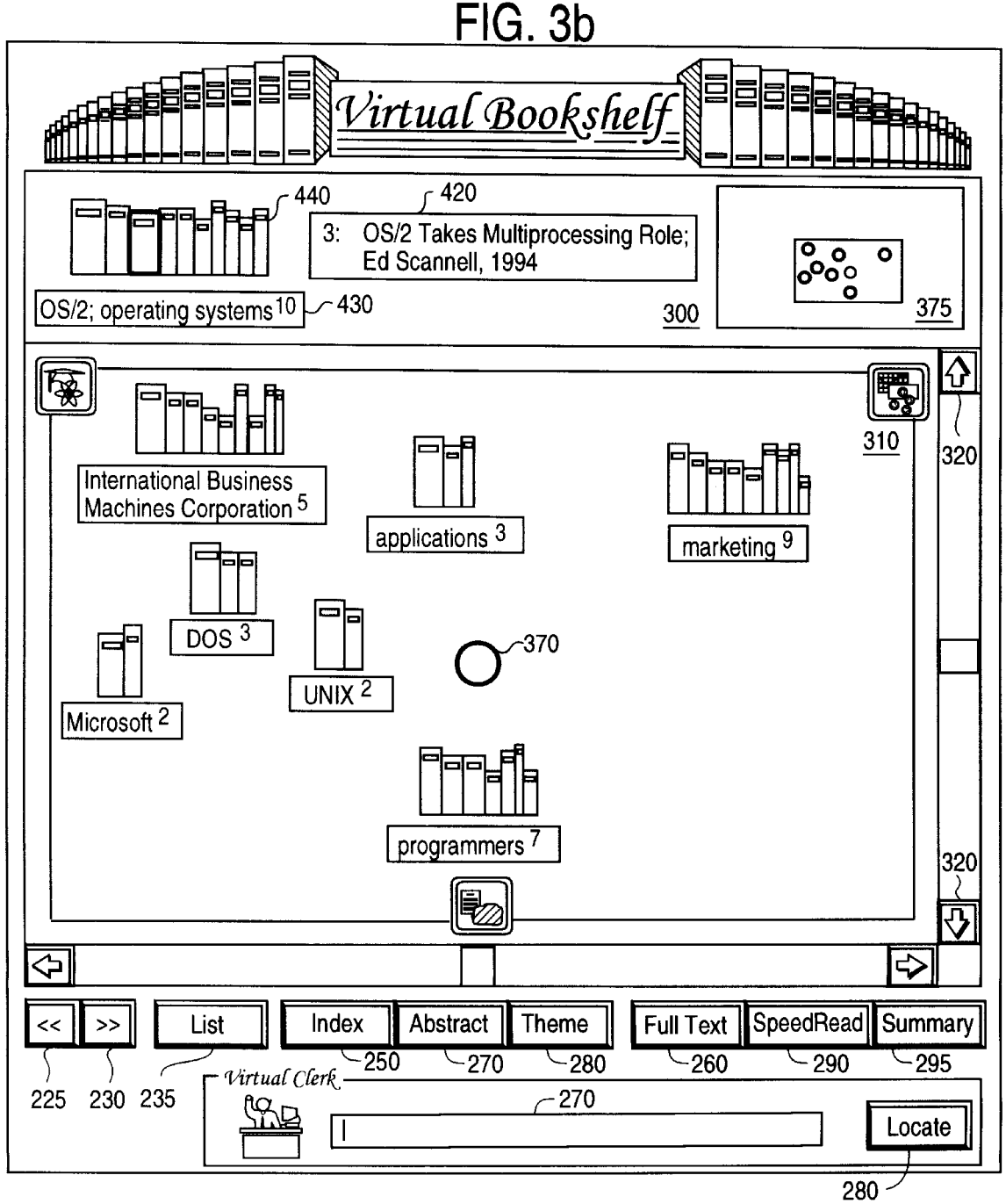
FIG. 3b illustrates a second example display that includes peripheral views.

FIGS. 3a and 3b illustrate one embodiment for peripheral views. The virtual bookshelf displays the example display illustrated in FIG. 3a in response to a user selecting the "OS/2" category and pressing the view button 255 (FIG. 2e). The display provides a peripheral view by presenting a plurality of related issues and themes to the selected bookshelf (e.g. the OS/2 bookshelf for this example display). In the history section 300, the virtual bookshelf system displays a status bar that contains a bookshelf 440, a bibliographical field 420, a locator map 375, a category area 430, and a control arrow 435 for the bookshelf 440. The bookshelf 440 provides a graphical representation of the forty documents classified under "OS/2," with each book on the shelf representing a document in the set. In one embodiment, the bookshelf 440 displays ten books at a time. Since more than ten books are located on the bookshelf 440 for the "OS/2" category, the control arrow 435 is active, indicating that more documents are available. The books in each bookshelf is ranked, left to right, according to thematic content and prominence. The width of a book indicates the "length" or total amount of thematic content, relative to the other books in the shelf, contained in the document. The height of the book indicates the thematic prominence of the selected topic ("OS/2" in this example), relative to the other books in the bookshelf.

The bibliographical field 420 displays information, such as author, title, publishing date, that has been stored for the documents. The locator map 375 provides a view of all the peripheral issues or themes, represented as color-coded dots, for the OS/2 bookshelf. The OS/2 bookshelf 440 is represented as a hollow dot located at the center of the locator map 375. The square, labeled 377 in the center of the locator map 375, indicates which themes are visible in the display area 310. If there are more peripheral themes than appear in the display area 310, the locator map 375 indicates the position and number of themes available for viewing. The locator map 375 also illustrates the distribution of the themes by the top-level categories into which the themes are grouped.

The display area 310 provides a view of the peripheral themes for the documents in the OS/2 bookshelf. The peripheral themes are spaced around the central OS/2 bookshelf, represented as a hollow dot 370, and the themes are grouped according to their top-level category in the knowledge catalog. For this display example, the high level category "science, technology, and education" is located in the upper left corner, "business and economics" is located in the upper right corner, "government and military" is located in the lower right corner, "social environment" is located in the lower center area, and the generic classification is located in the lower left corner. Initially, the hollow dot 370 is located in the center of the display area 310, but as the position of the window is changed to view peripheral themes that are not visible, then the hollow dot 370 may not be visible. The locator map 375, however, always indicates the position of the display area 310, relative to the central OS/2 bookshelf. The position of the display area 310 is changed using the scrollbar 320 or the locator map 375. In addition, the set of buttons changes, indicating that the user can select viewing options for the document set or for the individual documents in the set.

From the example display shown in FIG. 3a, the contract button 225 may be pressed in order to move back up into the hierarchy for the selected category. If one of the peripheral themes is selected, such as the DOS peripheral theme, the expand function provides a combined view of the selected topic and theme. If a document is selected, the expand button 230 changes the display to show the full text of the document. In addition, a document may be selected from a bookshelf and any of the action buttons may be pressed to give different views (e.g. index, abstract, full text, etc.) of the document. Furthermore, the list button may be pressed to change the display to a list of the documents, ranked according to the theme strength for "OS/2" in each document.

FIG. 3b illustrates the selection of a peripheral theme from the display area 310. For the display example shown in FIG. 3b, the "operating systems" theme was selected, and the expand button 230 was pressed. The selected category "operating system" is added to the "OS/2" bookshelf and the bookshelf dynamically rearranges itself to show a subset of "OS/2" documents that have a theme of "operating system." In this example, the number of documents is reduced from forty to ten. The display area also rearranges itself to indicate that there are fewer peripheral themes (and fewer documents per theme) for the set of "OS/2; operating system" documents. In this example, all of the peripheral themes are visible within the display area 310, as indicated by the scrollbars 320 and locator map 375. If the contract button 225 is pressed, the view is changed back to the original "OS/2" view shown in FIG. 3a. The expand button 230 is not active at this level. The list button 235 may be pressed to change the display to a view of the documents classified under "OS/2" and the peripheral themes for the documents. In addition, a document may be selected from the list, and any of the buttons may be pressed to obtain various views of the document.

Figure 4A:
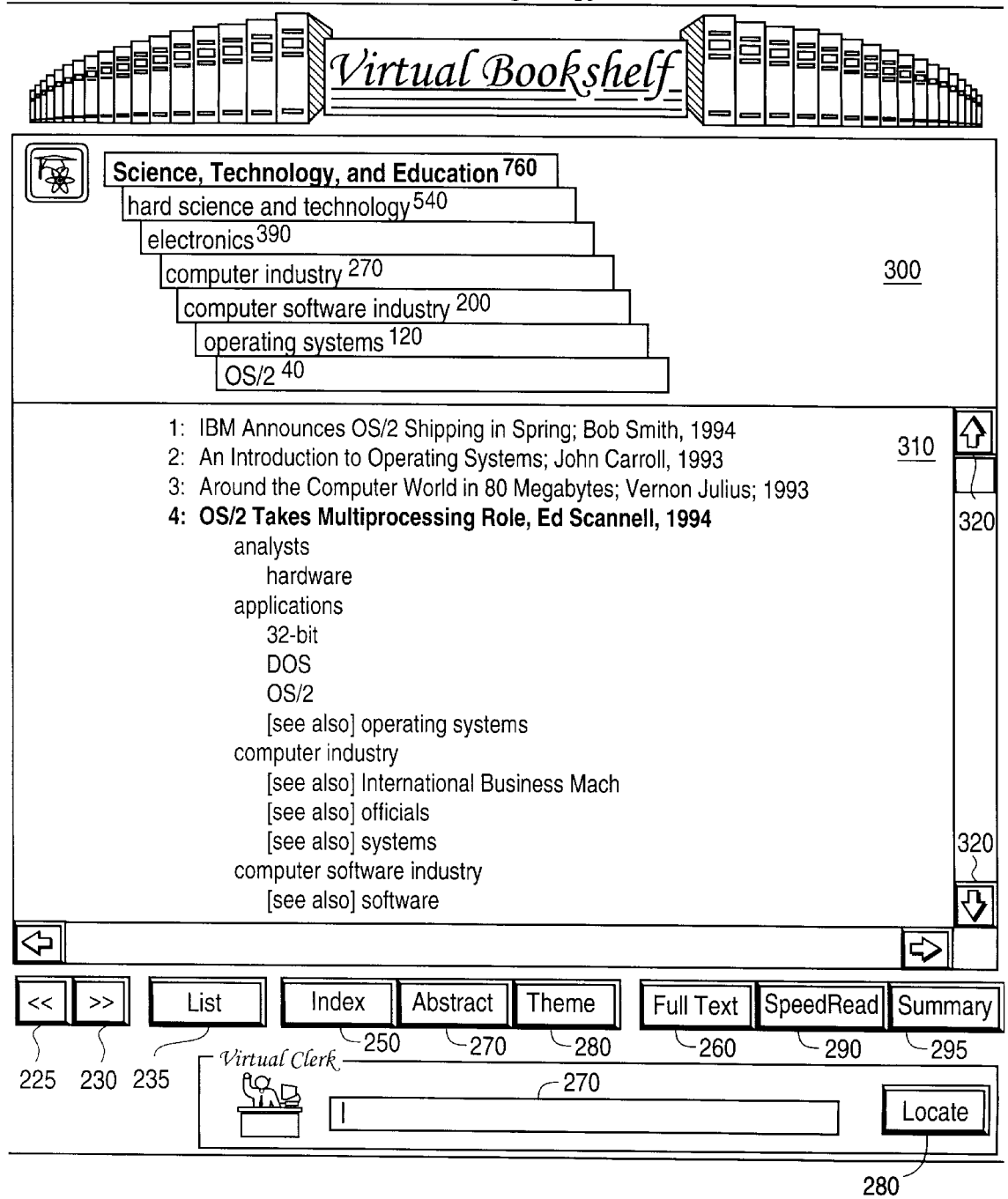
FIG. 4a illustrates an example display after execution of the index function for a selected document.

Virtual Bookshelf Action Functions:

As discussed above, the virtual bookshelf permits execution of several action functions after locating one or more documents. At any point in the hierarchical structure, a topic or category may be selected, and an index function may be invoked via the index button 250. FIG. 4a illustrates an example display after execution of the index function for a selected document. For this example, the category "OS/2" is selected, and list button 235 is pressed to obtain the display screen illustrated in FIG. 2f. In order to invoke the index function from a list of documents, a document is selected and the index button 250 is pressed. In response, the virtual bookshelf displays, directly underneath the selected document in the navigational section 310, a back-of-book index for the selected document. For the example illustrated in FIG. 4a, the document "OS/2 Takes Multiprocessing Role" is selected, and the back-of-book index is displayed.

In the virtual bookshelf system configuration (FIG. 1), the command module 135 receives the user indication that the index function and the "OS/2 Takes Multiprocessing Role" document were selected. To display the display screen with the back-of-book index, the command module 135 accesses the index table 170 to retrieve the back-of-book index for the selected document "OS/2 Takes Multiprocessing Role", and it dispatches the display information for rendering on the output display.

In one embodiment, the virtual bookshelf system includes point of view abstracts. In general, point of view abstracts provide a brief synopsis of the document from a user specified point of view. Although a document typically contains one general topic, the document covers several sub-topics falling within the general topic. Because a document may contain many subtopics, two different users may be interested in two different sub-topics. To accommodate the particular needs of a user, the virtual bookshelf provides different points of view in the abstracts depending upon the focus of the user.

For the point of view abstract embodiment, the abstract records 187 contain one or more abstracts for a document, wherein each abstract has a unique point of view for the same document. To fully catalog the virtual bookshelf, an abstract for each possible point of view for a document is stored in the abstract records 187. For example, a document about operating systems may contain information that covers both the OS/2 operating system and the manufacturer of the OS/2 operating system, International Business Machines Corporation (IBM). For this example, the abstract records 187 stores two abstracts for a single document. A first abstract focuses on the OS/2 operating system, and a second abstract focuses on IBM's involvement with the OS/2 operating system.

The point of view abstracts are displayed upon invocation of an abstract function. In general, the abstract function, invoked from the abstract button 270, displays a brief synopsis of the document within the list of documents with a particular slant or point of view. A user of the virtual bookshelf system may set the focus for the point of view abstracts in any number of ways. In one embodiment, the point of view for the abstract is derived from the path the user navigated to obtain the bookshelf set. For example, if a user invokes the list function for a selected category and then invokes the abstract function for a document classified in that category, then the abstract displayed is from the point of view of the selected category.

As an alternative to selecting the point of view from the navigated path, the user may pre-set one or more categories to receive abstracts that have the point of view for those categories. In one embodiment, the user sets an abstract configuration table (not shown) to reflect the user's interest in one or more top level categories. For example, a user may be a computer programmer and desire to view abstracts of documents relating to "science, technology, and education" with a technical slant, or a user may be a marketing manager and desire to view abstracts of documents relating to "science, technology, and education" with a marketing slant. Note that a user must select a point of view in a topic or category for which a selected document is classified, either directly or cross referenced. However, a user may select a point of view for different topics, and the virtual bookshelf displays the point of view abstract that relates to the topic or category classified for the selected document. The information may be entered into the abstract configuration table by a user through any well known means.

Figure 4B:
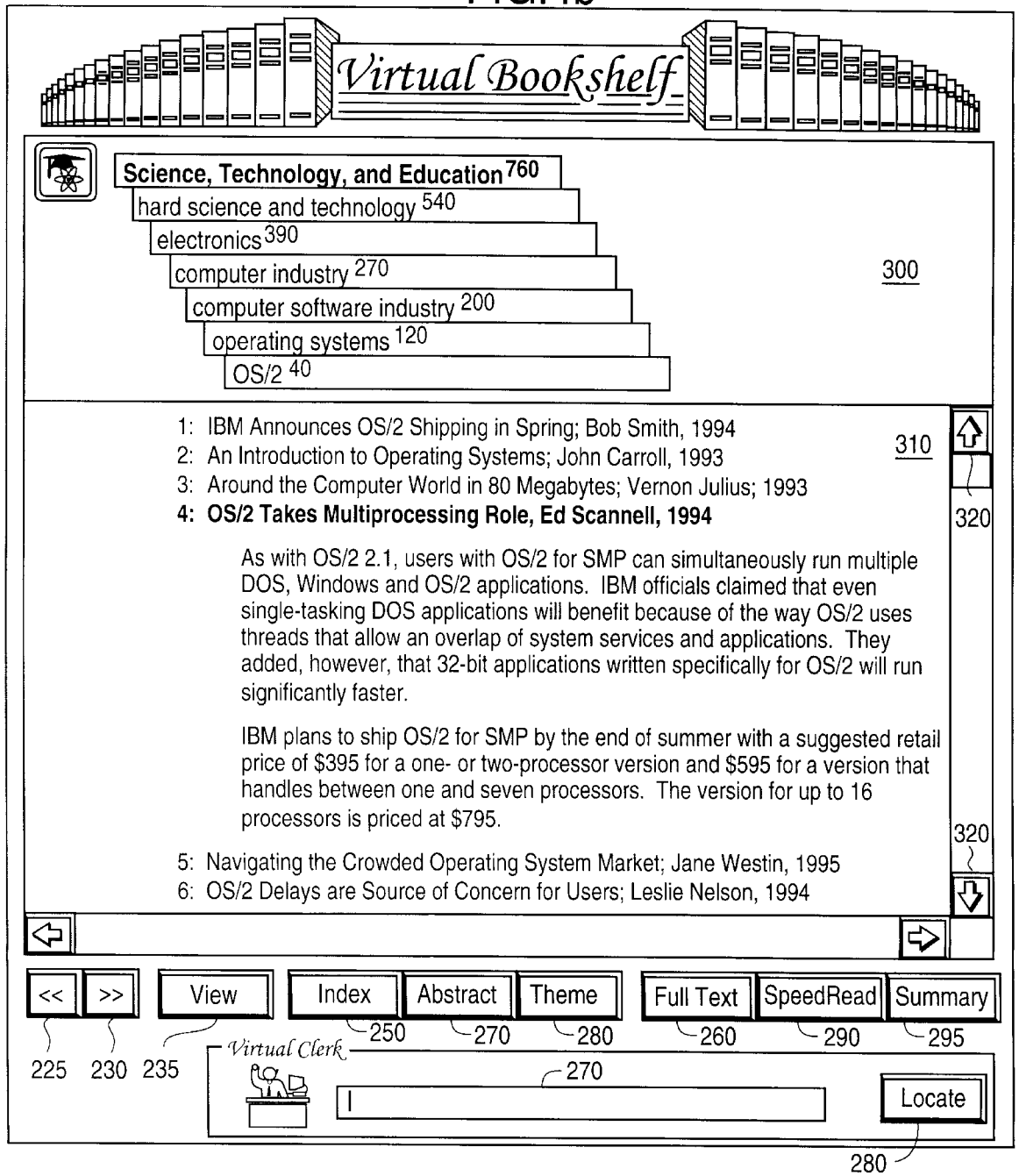
FIG. 4b illustrates a first example display that includes a first point of view abstract.
Figure 4C:
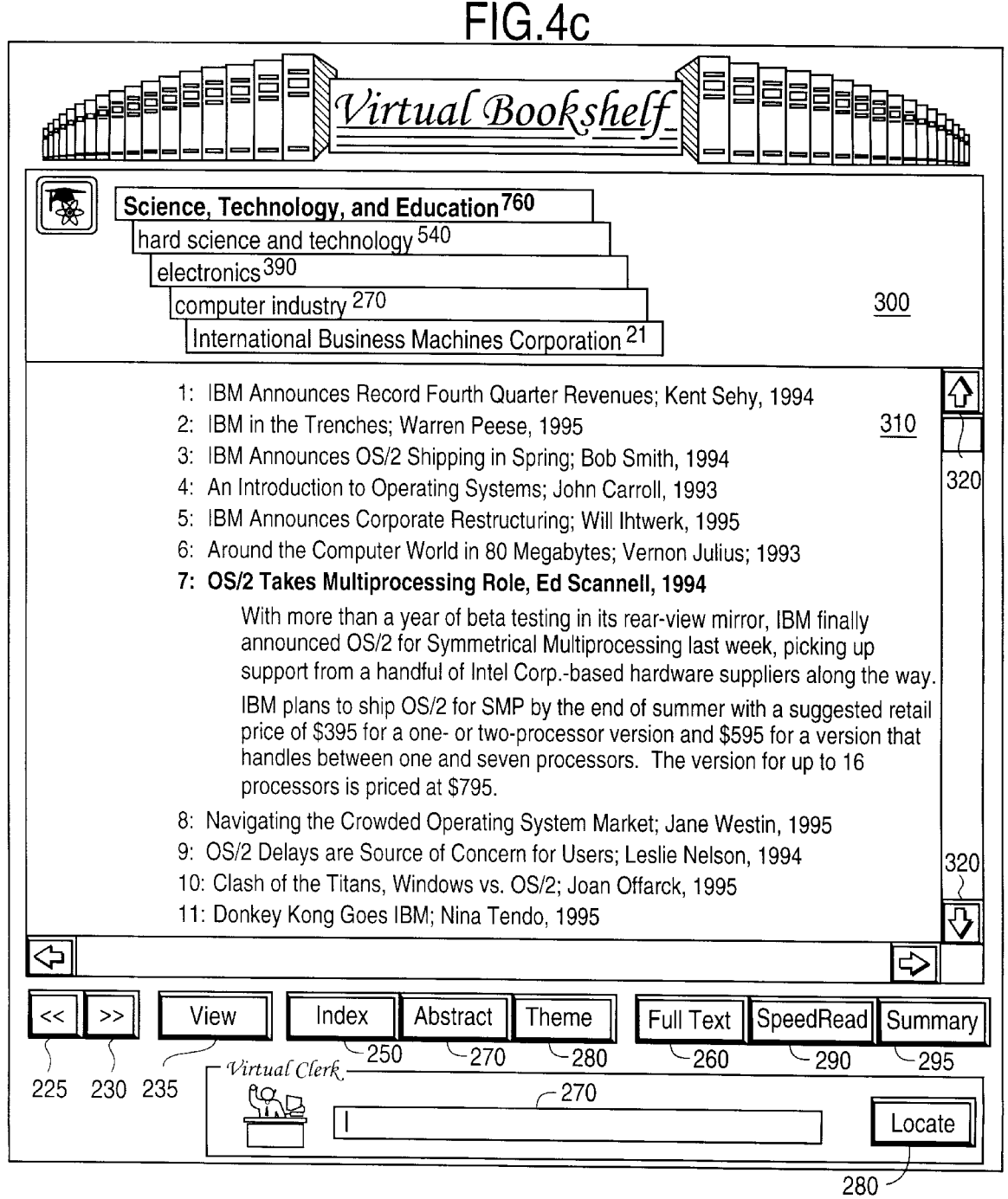
FIG. 4c illustrates a second example display that includes a point of view abstract.

FIG. 4b illustrates an example display that includes a point of view abstract for the OS/2 category. Specifically, for this example, the document "OS/2 Takes Multiprocessing Role" in the OS/2 category is selected, and the abstract button 270 is pressed. In response, the virtual bookshelf system displays a brief synopsis of the document directly beneath the listing of the document "OS/2 Takes Multiprocessing Role" as shown in FIG. 4b. For this example, the virtual bookshelf displays an abstract with the point of view of OS/2 because the user selected the OS/2 category to obtain the bookshelf set of documents. FIG. 4c illustrates an example display that includes a point of view abstract for the International Business Machines Corporation category. For this example, the document "OS/2 Takes Multiprocessing Role" in the International Business Machines Corporation category is selected, and the abstract button 270 is pressed. In response, the virtual bookshelf displays a point of view abstract that focuses on IBM's operations concerning OS/2. For the examples illustrated in FIGS. 4b and 4c, two different abstracts were displayed for the "OS/2 Takes Multiprocessing Role" document.

The point of view abstracts utilize the intuitive visual paradigm of the virtual bookshelf. The visual paradigm provides a user with categories, organized in a hierarchical structure, such that the user moves through levels of the hierarchical structure to select categories of interest. Therefore, the user generates a path in the hierarchical structure, from the top level down, indicative of the topic of interest. For the example illustrated in FIG. 4c, if the user was strictly interested in the OS/2 operating system, then the user would have navigated through the "operating systems" and "OS/2" categories instead of the "International Business Machines Corporation" category. Consequently, if the navigational path approach is used, the virtual bookshelf automatically displays an abstract of a document with a point of view desired by the user.

In the virtual bookshelf system (FIG. 1), the command module 135 receives a user indication that the abstract function and the "OS/2 Takes Multiprocessing Role" document were selected. In addition, the command module 135 receives information regarding the category for the current bookshelf set. Furthermore, if the abstract configuration table is set, then the command module 135 utilizes the relevant topic or category to identify a specific abstract. The command module 135 then accesses the abstract records 187 to retrieve an abstract for the selected document and for the selected point of view. The command module 135 dispatches the corresponding abstract text to the screen module 140 for rendering on the output display.

Figure 4D:
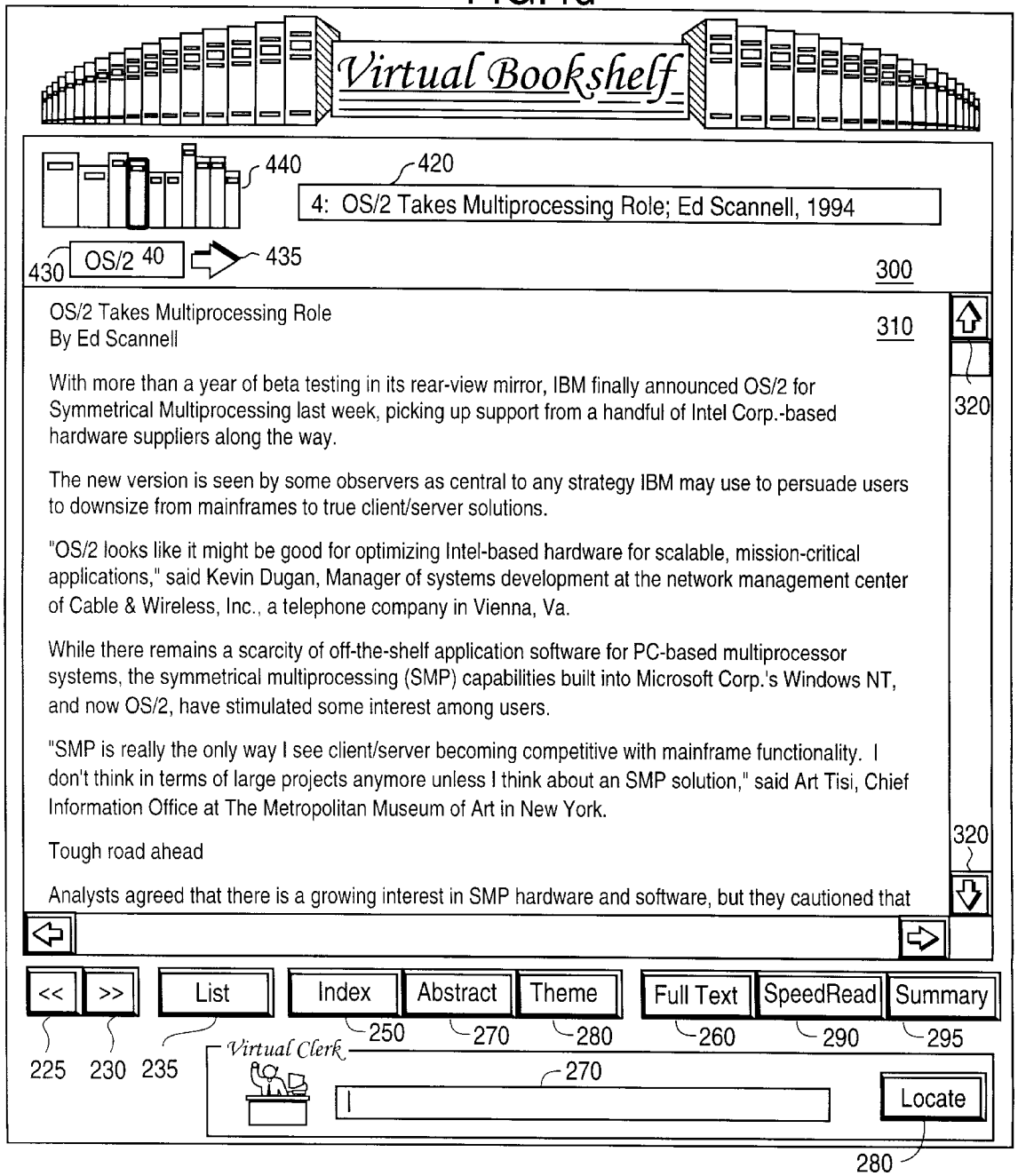
FIG. 4d illustrates an example display for the full text function for a selected document.

The virtual bookshelf also provides full text display for a selected document. To invoke the full text function of the virtual bookshelf, the full text button 260 is pressed, and a document is selected to display the text for that document. FIG. 4d illustrates an example display after execution of the full text function for a selected document. For the example display shown in FIG. 4d, if the document "OS/2 Takes Multiprocessing Role" is selected, and the full text button 260 is pressed, the full text for the selected document "OS/2 Takes Multiprocessing Role" is displayed in the display area 310.

In one embodiment, after a document is selected and an action function is invoked, the name of the selected document and bibliographic information are displayed in a box located in the display area 300. For the example display shown in FIG. 4d, the document title and bibliographic information "OS/2 Takes Multiprocessing Role; Ed Scannel, 1994" is displayed in a rectangular box labeled 420. The parent category for the selected document is also displayed in the display area 300 in a rectangular box labeled 430. The category "OS/2" is the parent category for the "OS/2 Takes Multiprocessing Role" document. Furthermore, a graphical depiction of the available documents for the currently selected category is displayed in the display area 300 with the currently selected document highlighted. In one embodiment, a book end is rendered for each document available for the currently selected category. The graphical depiction of the available documents for the selected category "OS/2" is labeled 440 on the example display of FIG. 4e. The width of the book end for a corresponding document indicates the relevance of the document for the currently selected 10 category relative to the other available documents. For the example display of FIG. 4e, the width of the book ends in the graphical book end rendering 440 indicate how relevant the document is to OS/2. In addition, the book end for the currently selected document is highlighted.

To execute the full text function in the virtual bookshelf system (FIG. 1), the command module 135 receives the user indication that the full text function and the "OS/2 Takes Multiprocessing Role" document were selected. In response, the command module 135 accesses the "OS/2 Takes Multiprocessing Role" document from the documents 100, and it transfers the document text to the screen module 140. In turn, the screen module 140 displays the document text in the display section 310. From the full text, a user may select additional functions.

Figure 4E:
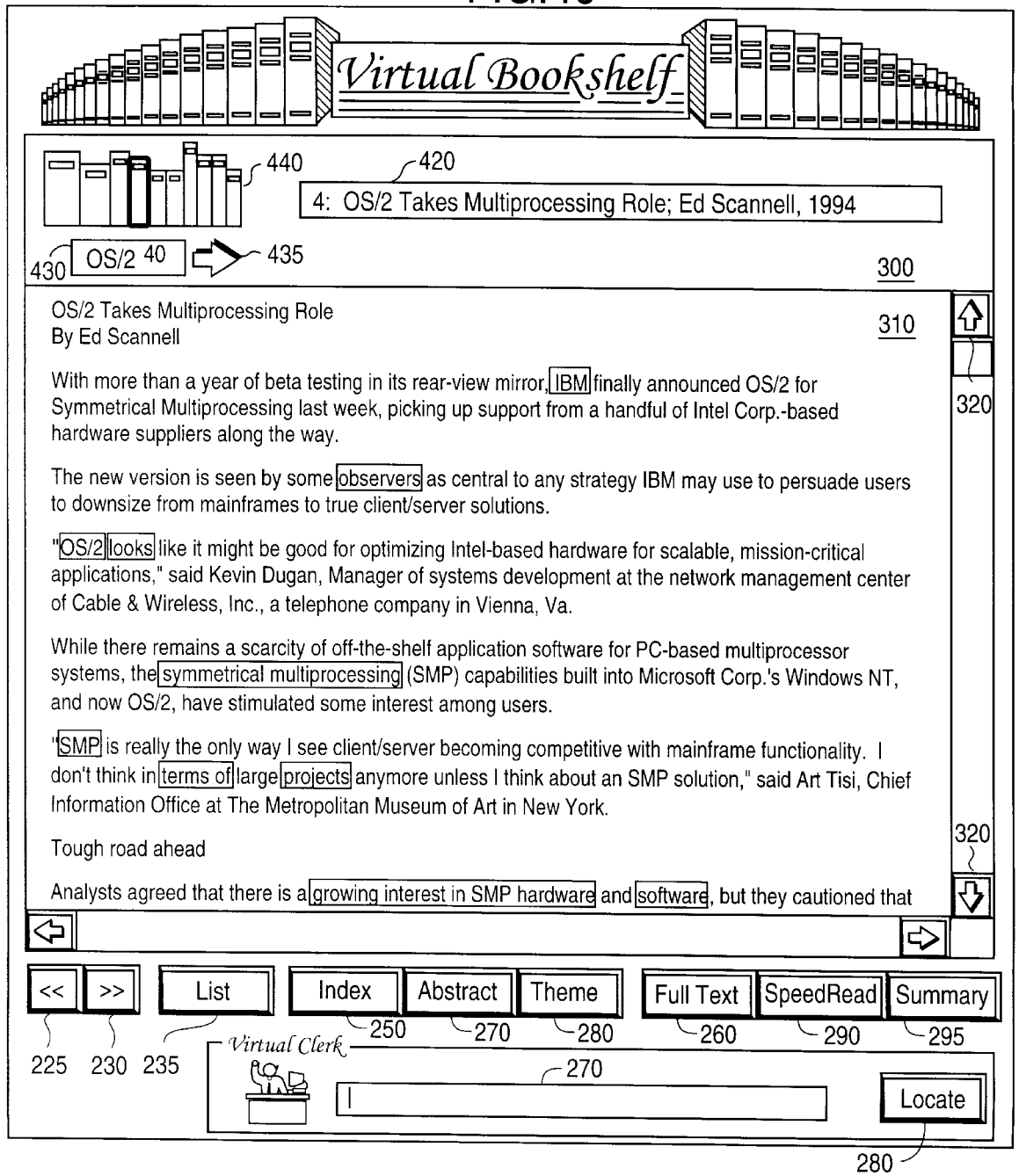
FIG. 4e illustrates an example display for the speed read function.

A speed read function, invoked from the speed read button 290, displays the full text of the selected document with the major content bearing words highlighted. An example display for the speed read function is shown in FIG. 4e. The virtual bookshelf displays the example display of FIG. 4e in response to a user that selected the document "OS/2 Takes Multiprocessing Role" and pressed the speed read button 290. If the user reads only the highlighted content carrying words, the user may extract the main ideas of the selected document without reading the entire document. The display for the speed read function also contains display information in the display area 300 identical to the display information in display area 300 discussed above in conjunction with FIG. 4d.

To execute the speed read function in the virtual bookshelf system (FIG. 1), the command module 135 receives the user indication that the speed read function and the "OS/2 Takes Multiprocessing Role" document were selected. In response, the command module 135 accesses the "OS/2 Takes Multiprocessing Role" document from the documents 100 and information from the speed read records 190 for the "OS/2 Takes Multiprocessing Role" document. In one embodiment, the information contained in the speed read records 190 identifies the content bearing words for the corresponding document. The full text of the document is displayed with the content bearing words highlighted through use of the speed read record for the "OS/2 Takes Multiprocessing Role" document.

Figure 4F:
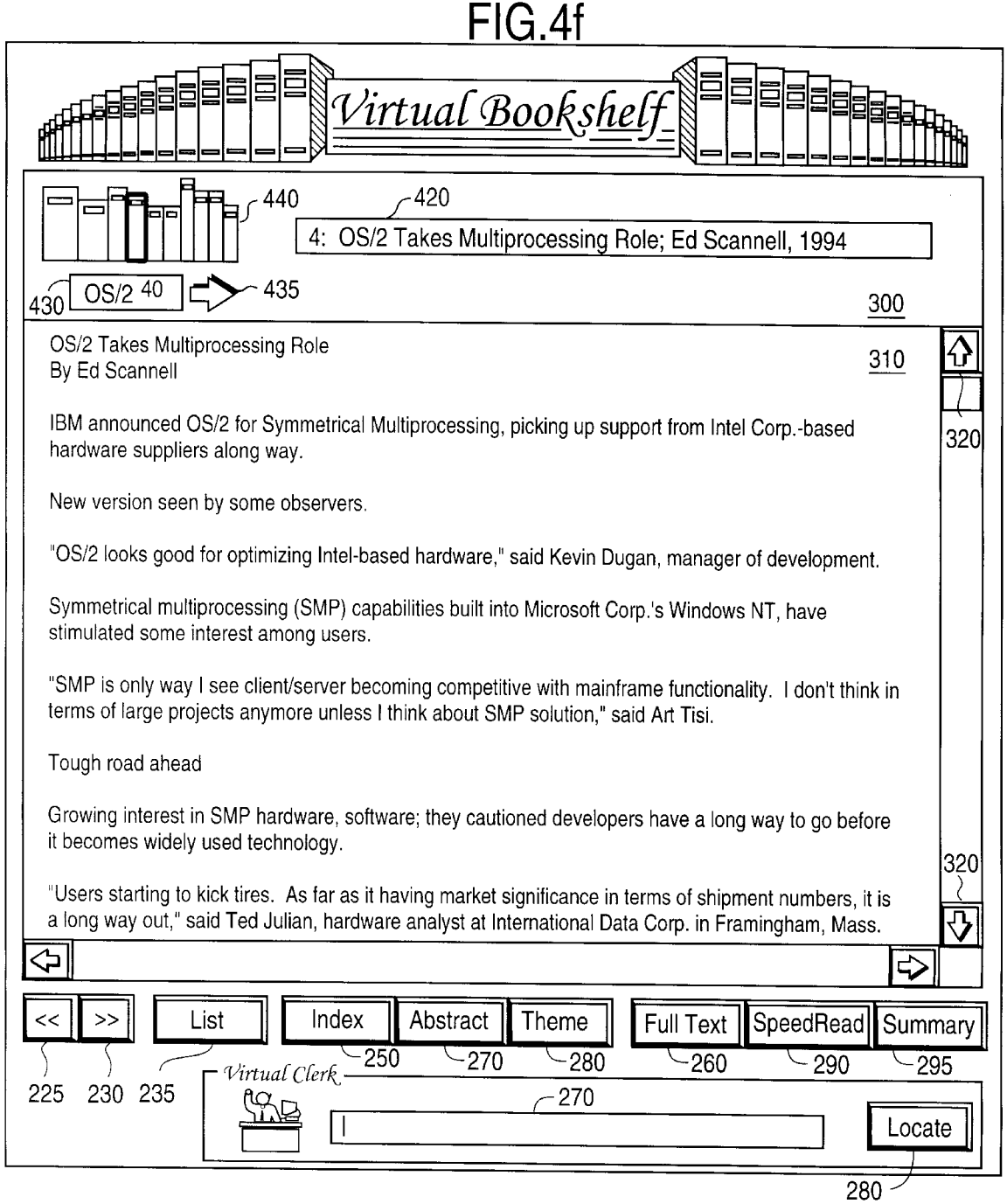
FIG. 4f illustrates an example display for the summary function.

The virtual bookshelf further includes a summary function that displays a reduced form of the document (e.g. displaying only the main ideas). A user invokes the summary function by selecting a document and by pressing the summary active button 295. FIG. 4f illustrates an example display for the summary function for the selected document "OS/2 Takes Multiprocessing Role." In one embodiment of the summary function, the virtual bookshelf system displays sentences and phrases, separated by a space, wherein each sentence or phrase conveys a main idea for the selected document. The display for the summary function also contains display information in the display area 300 identical to the display information in display area 300 discussed above in conjunction with FIG. 4d.

To execute the summary function in the virtual bookshelf system (FIG. 1), the command module 135 receives the user indication that the summary function for the "OS/2 Takes Multiprocessing Role" document was selected. In response, the command module 135 accesses the summary record for the document "OS/2 Takes Multiprocessing Role" from the summary records 195, and the screen module 140 updates the display with the summary information.

Figure 4G:
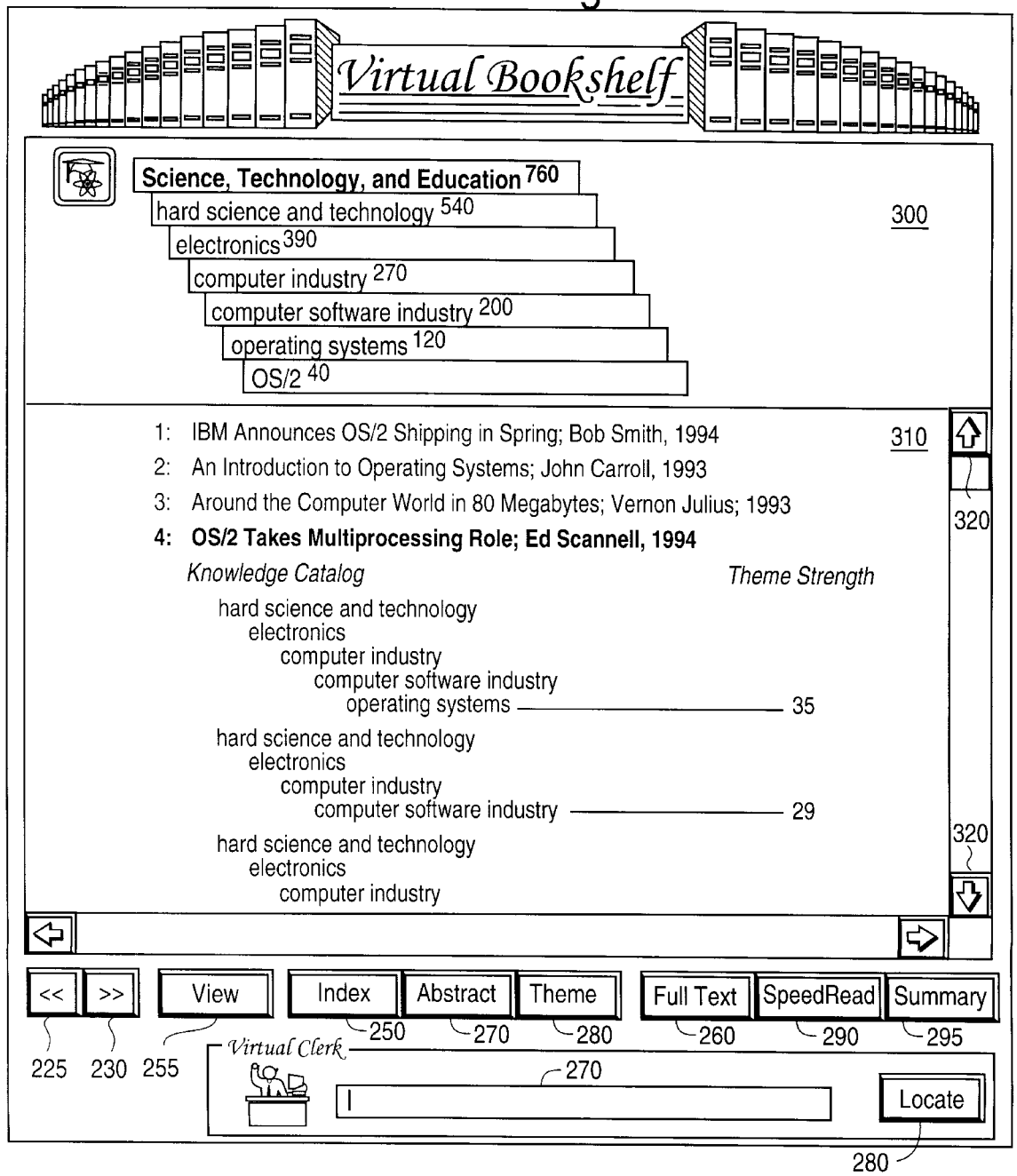
FIG. 4g illustrates an example display for the theme function.
Figure 4H:
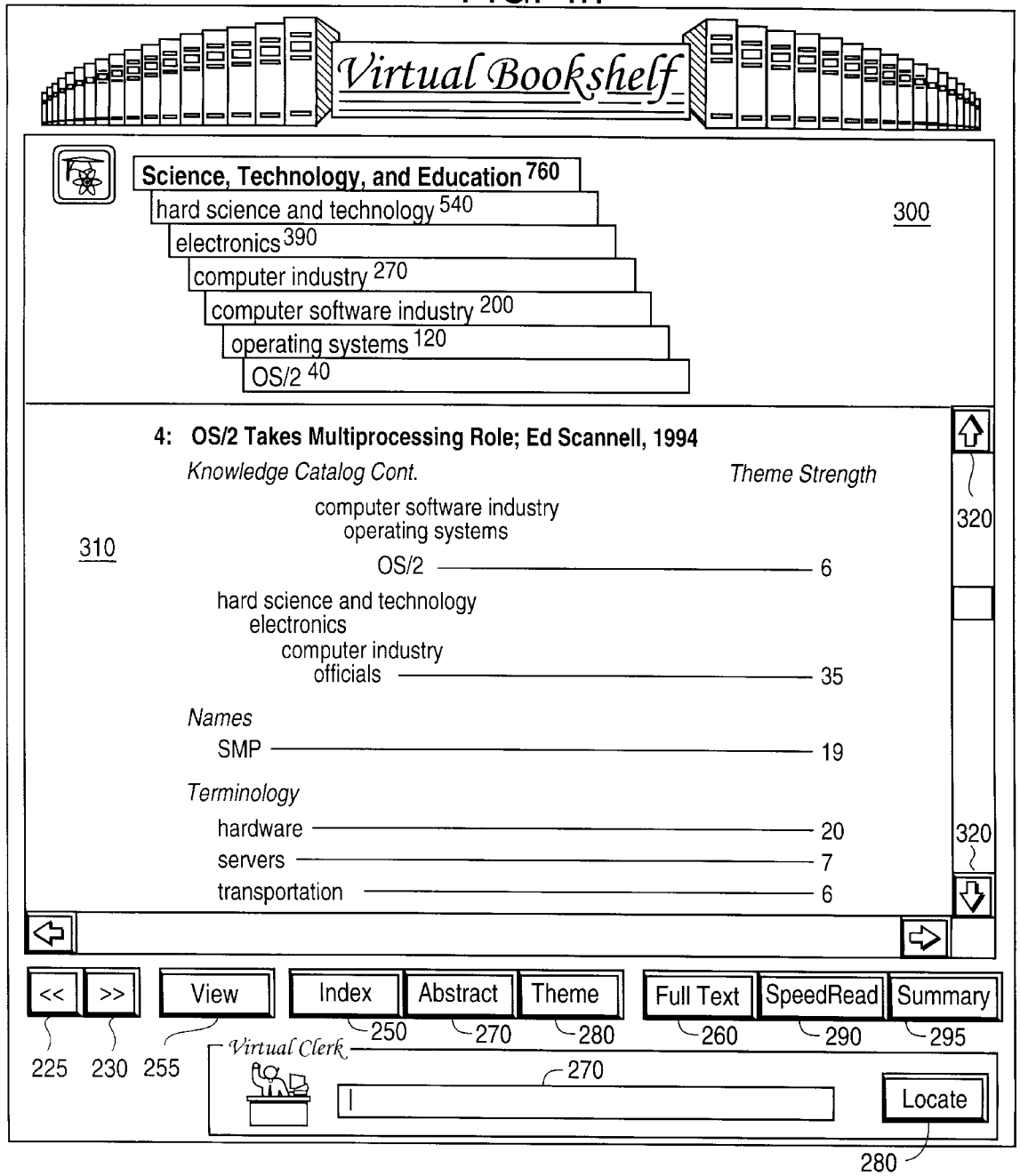
FIG. 4h illustrates a continuation display for the theme function example display illustrated in FIG. 4g.

A theme function for the virtual bookshelf displays various types of document level theme data. In general, the theme information conveys to the user the most important themes contained in a selected document. FIGS. 4g and 4h illustrate example displays for the theme function. The theme function is invoked by selecting a document and pressing the theme action button 280. The themes identified are topics or categories from the knowledge catalog and topic table 165. As shown in FIGS. 4g and 4h, for the "OS/2 Takes Multiprocessing Role" document, a theme strength for each theme is displayed. The theme strengths are relative to other theme strengths. As shown in FIG. 4g, the "OS/2 Takes Multiprocessing Role" document is more about "operating systems" than "computer software industry" in a ratio of approximately 35 to 29.

For the example illustrated in FIGS. 4g and 4h, the virtual bookshelf displays, in additional to the theme strength, the hierarchy of categories for the theme. The hierarchy is derived from the knowledge catalog, and it is shown down to the category of the theme. For example, for the theme "operating systems", the parent categories "computer software industry", "computer industry", "electronics", and "hard science and technology" are shown. To execute the theme function in the virtual bookshelf system (FIG. 1), the command module 135 receives the user indication that the theme function for the "OS/2 Takes Multiprocessing Role" document was selected. In response, the command module 135 accesses the theme record for the document "OS/2 Takes Multiprocessing Role" from the theme records 155, and the screen module 140 updates the display with the theme information.

Figure 5A:
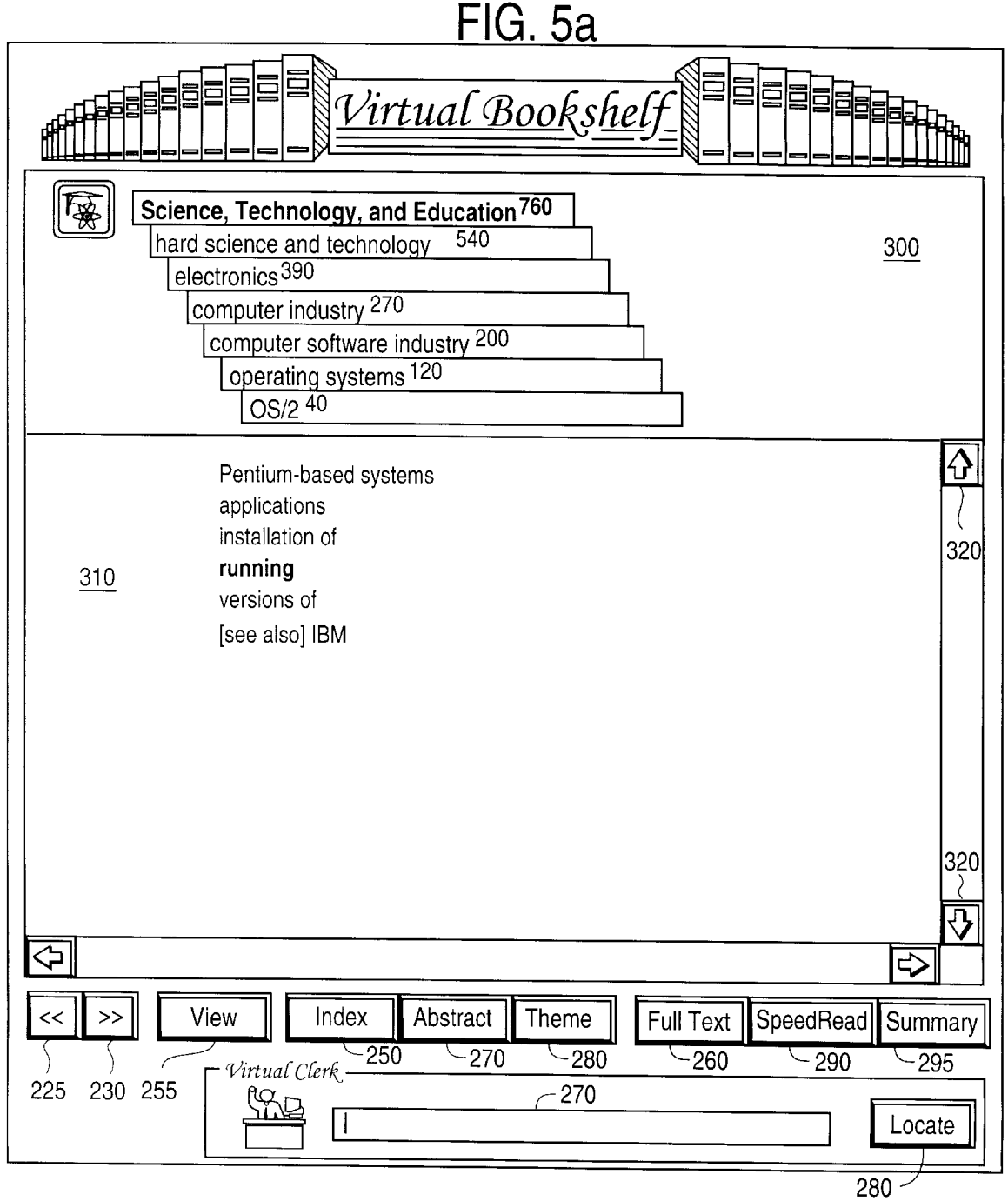
FIG. 5a illustrates an example display of index context entries for a selected category.
Figure 5B:
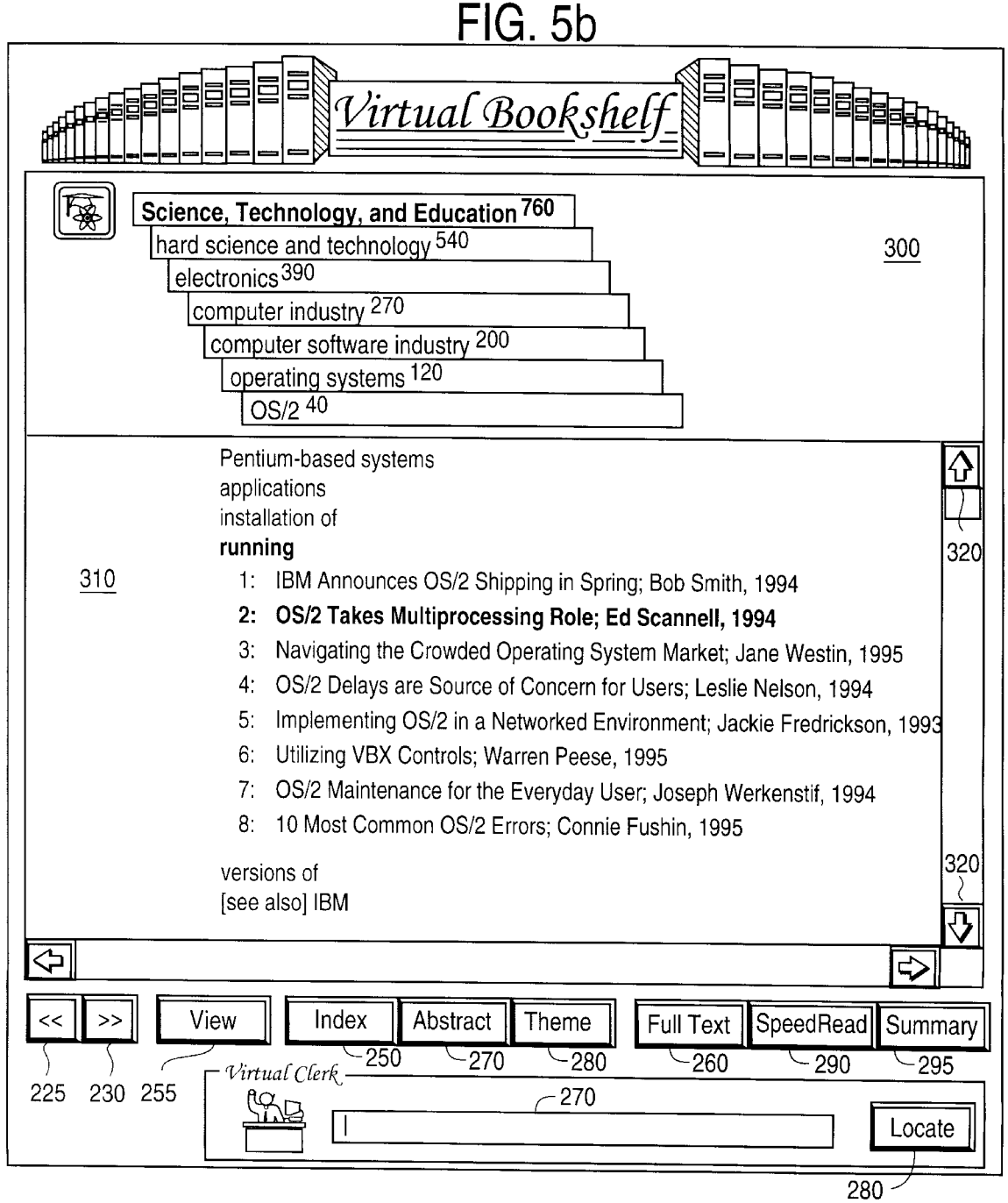
FIG. 5b illustrates an example display including a list of documents for a selected index entry.

Navigating the Virtual Bookshelf Using Detailed Views:

In addition to navigating with the categories generated from the topic table 165, a user may navigate the virtual bookshelf through use of index information. In order to navigate with detailed views, a user selects a category or topic and presses the detail action button 240. The display in FIG. 2e illustrates a starting point for an example to navigate with detailed views. Specifically, FIG. 2e illustrates a first page of the expansion of the category "operating systems." For this example, the topic "OS/2" is selected, and the detail button 240 is pressed. The result for this example is illustrated in FIG. 5a. As shown in FIG. 5a, the selected category "OS/2" is added to the history section 300, and an alphabetically arranged list of index context entries for which OS/2 is an index head is displayed in the navigational section 310. In order to obtain a list of documents that have an index entry for "OS/2, running", the user selects the "running" index and presses the view 255 button from the display shown in FIG. 5a. In response, the virtual bookshelf displays a list of all the documents that have an index entry of "OS/2, running" as shown in FIG. 5b.

Figure 5C:
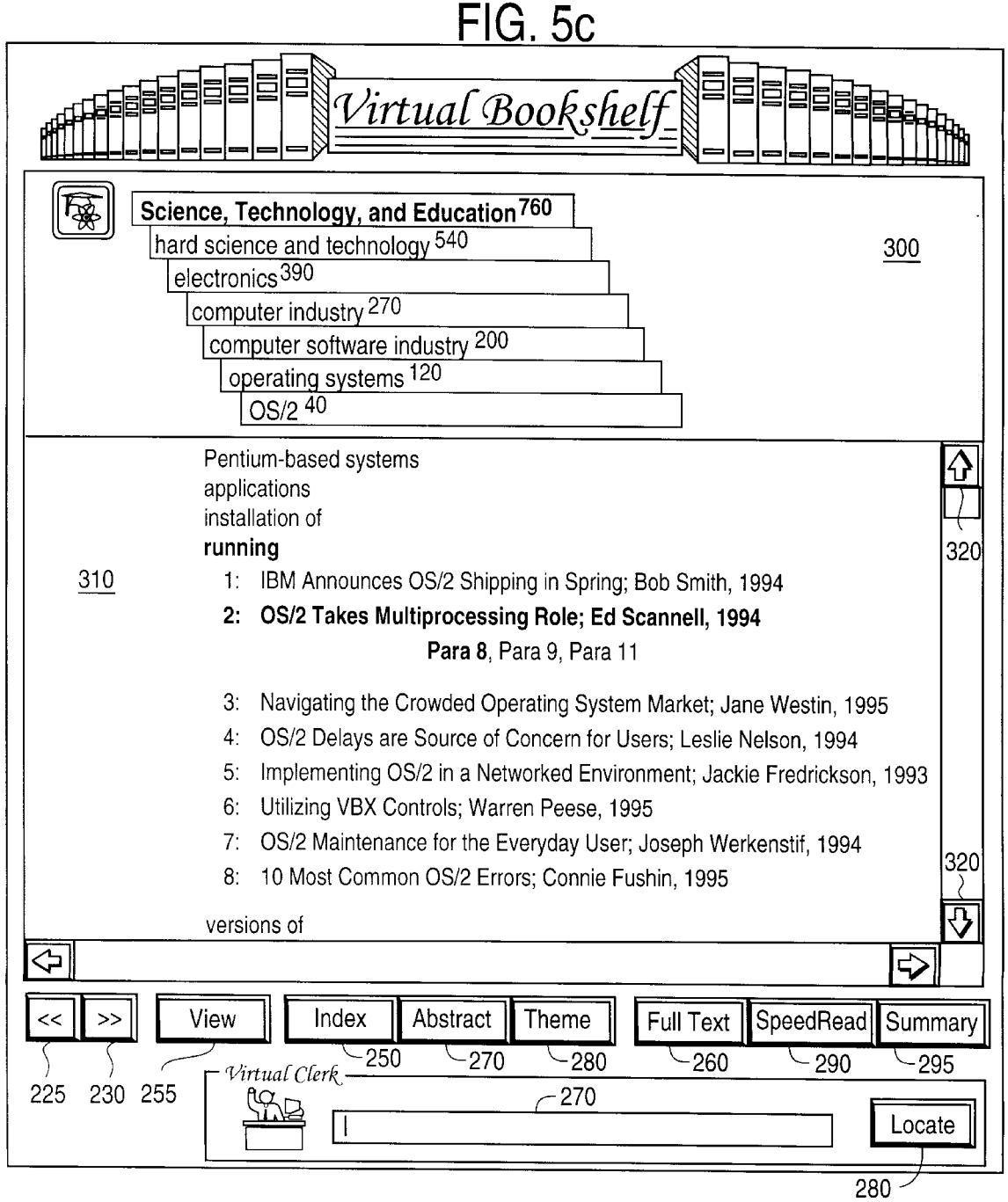
FIG. 5c illustrates an example display including a list of index references below a selected document.

The user may opt to select another of the context entries to extract a list of documents. If this is done, the list for "running" is contracted, and the list of documents for the newly selected entry is expanded. In order to obtain further indexing information, the user selects one of the documents to display the specific index references for that document. For example, if a user selects the second document, "OS/2 Takes Multiprocessing Role", and invokes the expand function via the expand button 225, then the virtual bookshelf displays a list of the specific index references immediately below the document as shown in FIG. 5c. In this manner, the user may select another document to extract a list of references within that document.

Figure 5D:
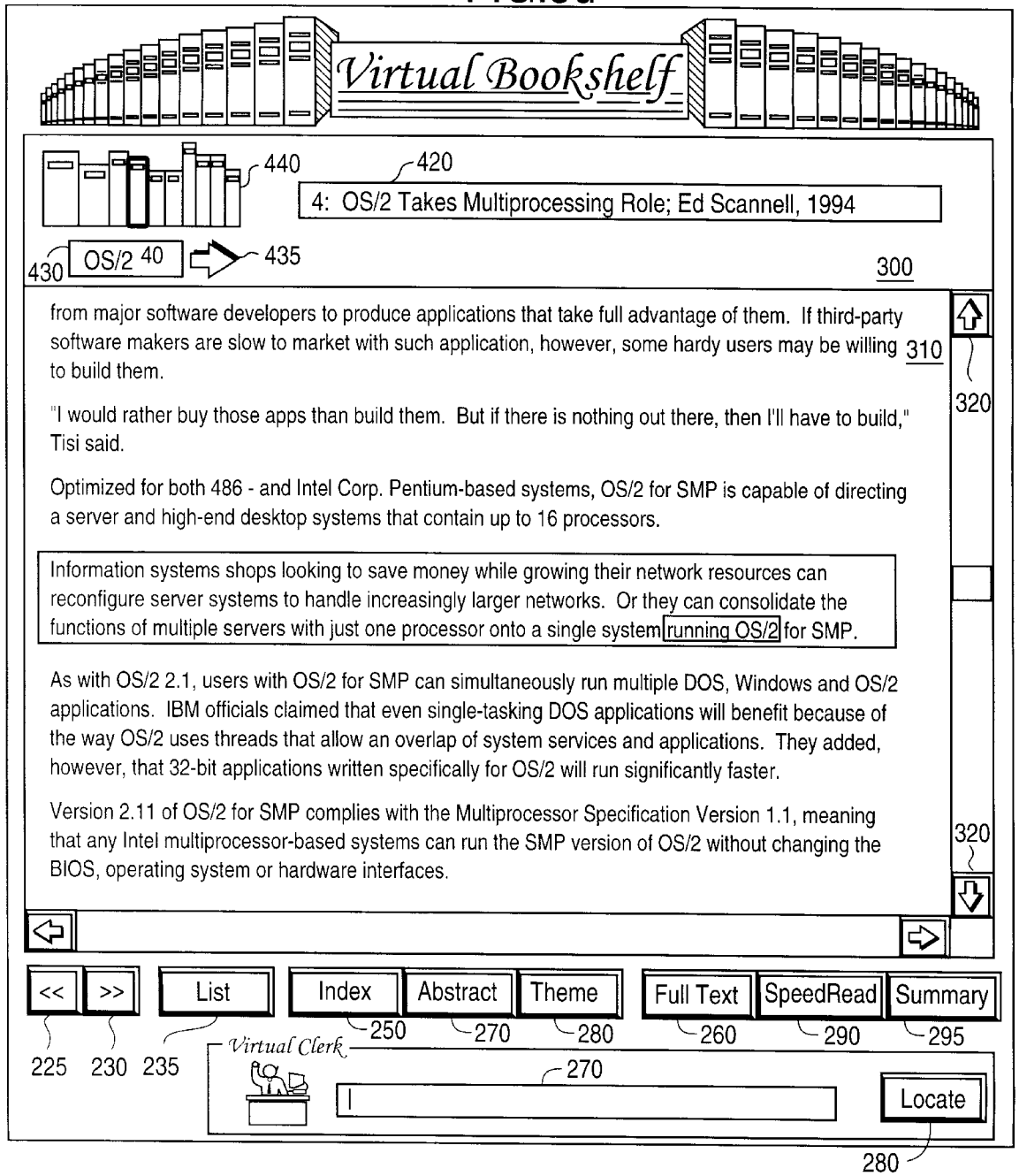
FIG. 5d illustrates an example display of text for a selected reference within a selected document.

The virtual bookshelf permits a user to view the document text for a corresponding reference. To execute this function, a user selects one of the references to hyper link to that specific location within the corresponding document. For example, for the display shown in FIG. 5c, if a user selects the "Para8" and presses the expand button 225, then text from the part of the document that contains the specific reference is displayed in the navigational section 310 as shown in FIG. 5d. The relevant text from the selected paragraph is displayed such that the selected paragraph is positioned in the center of the display in a box, and the indexed entry is highlighted. The command module 135 (FIG. 1) executes the hyper link function by utilizing the locate information in the index table 170 to display the relevant portions of the selected document. In addition, the title of the selected document including bibliographical information is displayed in a box labeled 420 on FIG. 5d. Also, the selected document is highlighted on the book end icon 440, and the parent category for the index entry, OS/2, is displayed in the box 430. At this point, the full text of the document is displayed, and the user may scroll up or down with the scroll bar 320 to view more text. Additionally, the user may execute the contract function to return to a previous screen, or the user may execute the index, abstract, speed read, summary, or theme functions.

Figure 6A:
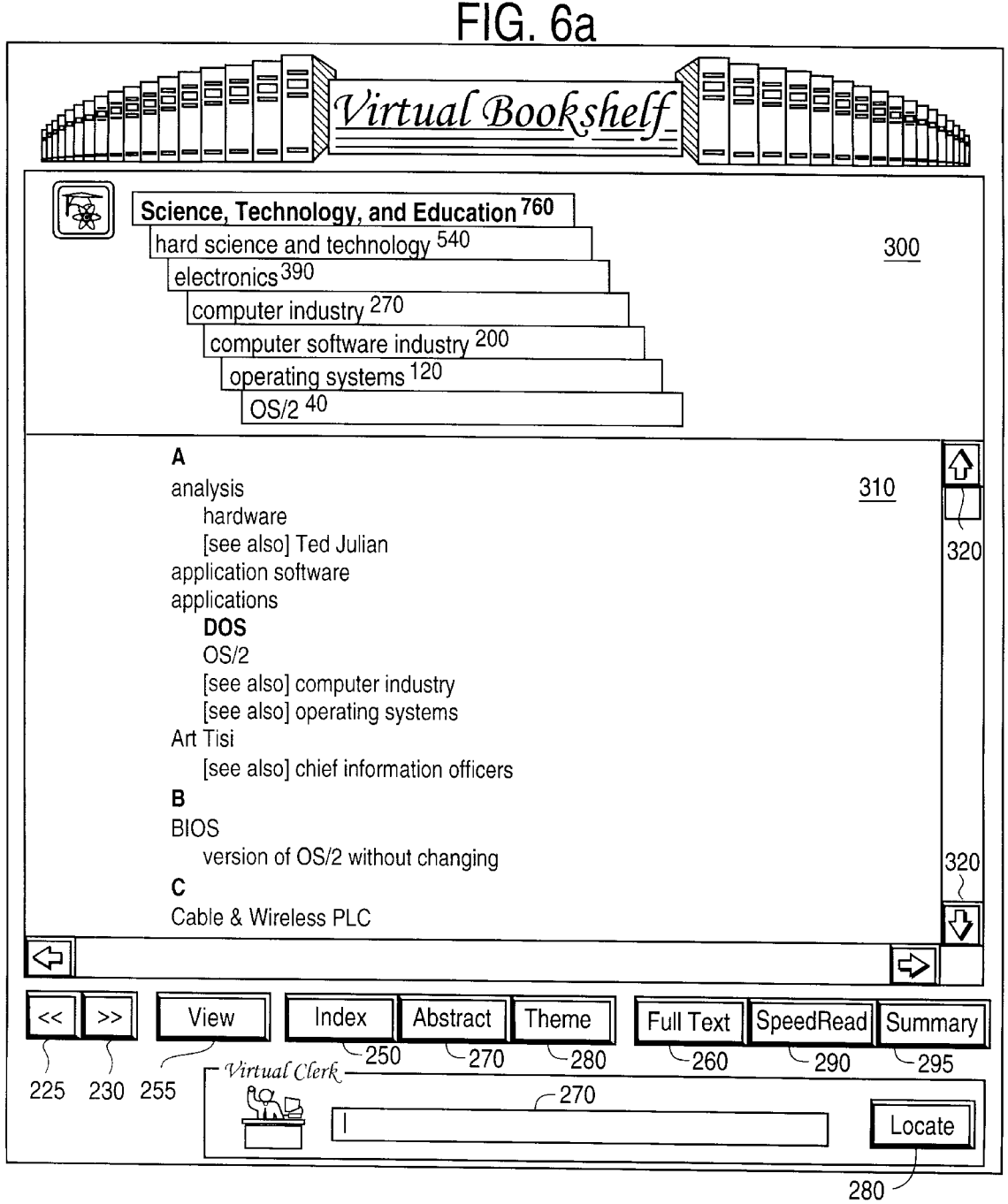
FIG. 6a illustrates an example display with a combined back-of-book index for all documents classified under a selected category.

Navigating the Virtual Bookshelf Using Index Views:

The virtual bookshelf permits a user to navigate through hierarchies using index views. At any point in the hierarchical structure, a topic may be selected, and an index function may be invoked via the index button 250. For example, FIG. 2e illustrates a starting display for an example using index views to navigate. For this example, the category "OS/2" is selected, and the index button 250 is pressed. In response, the virtual bookshelf displays a combined back-of-book index for all documents classified under OS/2 in the navigational section 310 as shown in FIG. 6a. In addition, the selected category "OS/2" is added to the history section 300.

Figure 6B:
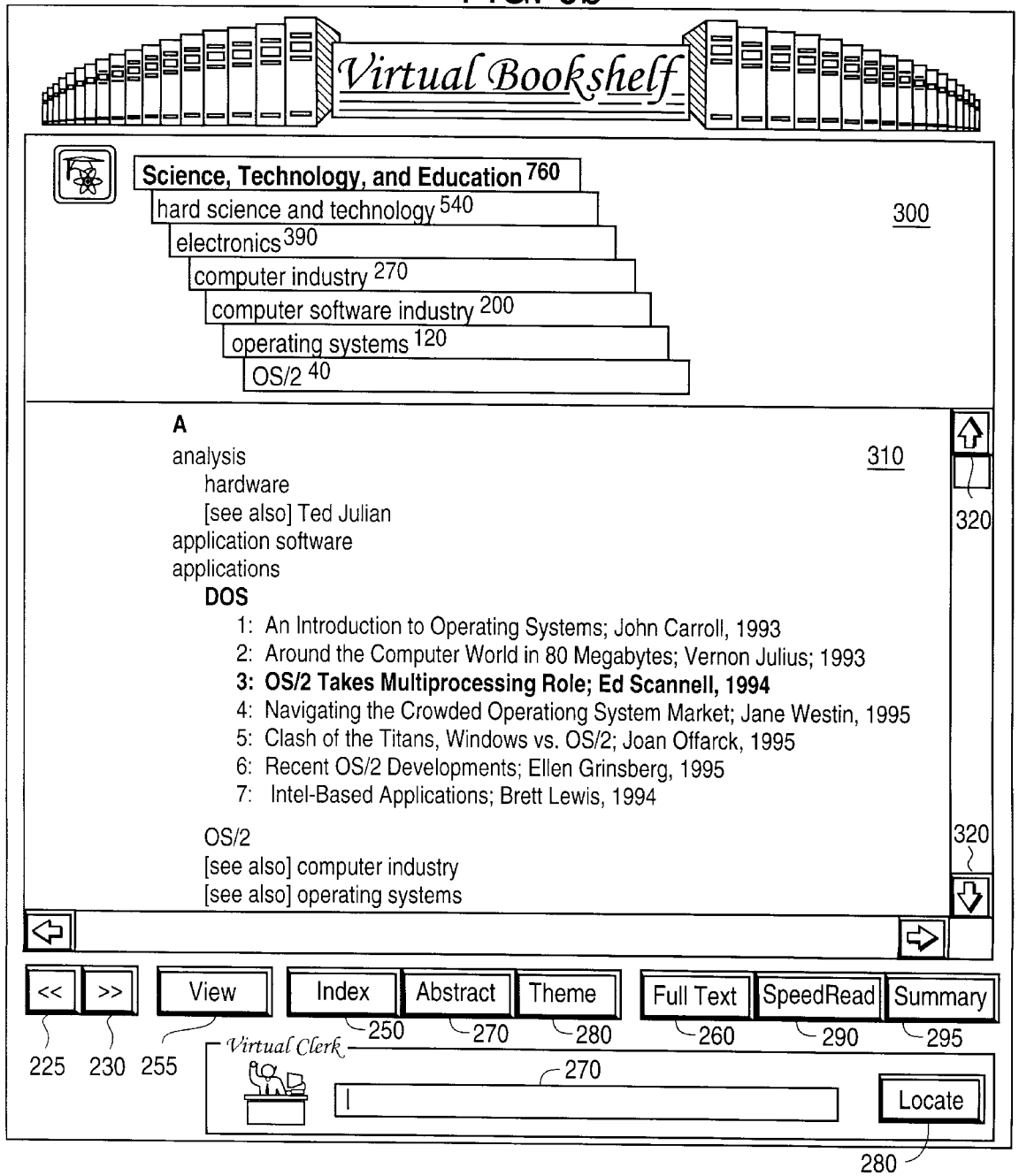
FIG. 6b illustrates an example display generated in response to selection of the view function from a combined back-of-book index.

From the back-of-book index, a user may select a subject to view a list of documents. FIG. 6b illustrates an example display generated in response to selection of the view function from the combined back-of-book index shown in the display of FIG. 6a. For this example, a user selects the context entry "DOS" under the head index "applications", and the user invokes the view function. The visual bookshelf displays a list of all the documents that have an index entry of "Applications, DOS." The list of documents are displayed immediately following the selected entry as shown in FIG. 6b. At this point, a user may opt to select another of the context entries to extract a list of documents. In addition, a user may select one of the documents to display the specific index references for that document.

Figure 6C:
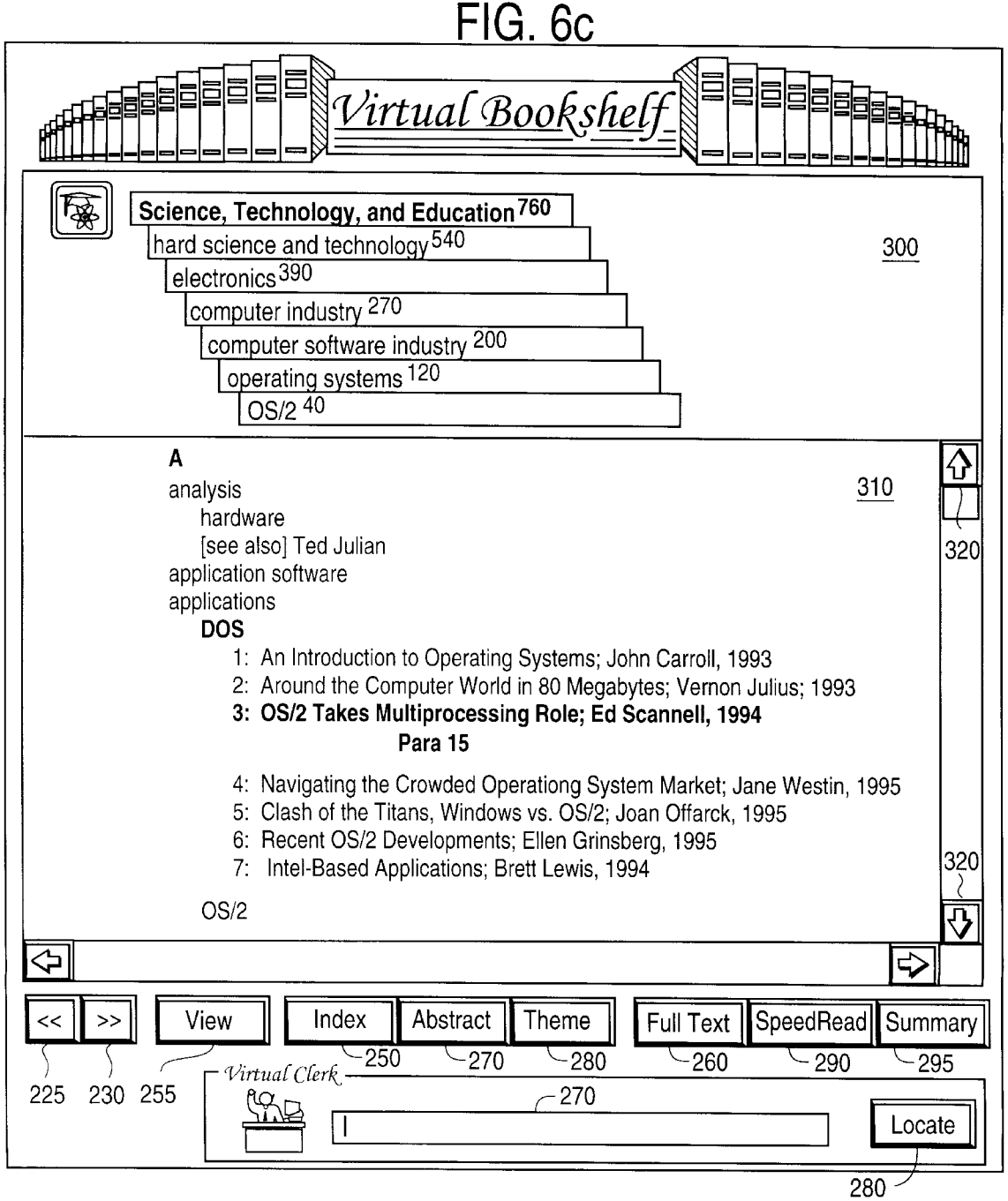
FIG. 6c illustrates an example display that displays index references beneath a selected document.

FIG. 6c illustrates an example display that displays index references beneath a selected document. For this example, a user selects the document "OS/2 Takes Multiprocessing Role", and the user presses the expand button 225. In response, the virtual bookshelf system displays the index reference "Para 15" to reflect that the "Applications, DOS" information is located in the fifteenth paragraph of the "OS/2 Takes Multiprocessing Role" document. At this point a user may opt to select another of the documents to extract a list of references.

In the preferred embodiment, the virtual bookshelf permits selection of one of the index references to hyper link to the specific location in the text. FIG. 6d illustrates an example display of text for a selected reference paragraph within a selected document. A user locates the referenced text in the document by selecting a paragraph reference, such as "Para 15", and pressing the expand button 225. In response, the virtual bookshelf displays the selected document in the history section 300, and displays the part of the document that contains the selected reference in the navigation section 310. As shown in FIG. 6d, the selected paragraph is positioned in the center display, and the selected paragraph is outline. In addition, the indexed entry is highlighted. Also, the selected document is highlighted on the book end icon 440, and the parent category for the index entry, OS/2, is displayed in the box 430. With the full text of the document displayed, the user may scroll up or down to view more of the text. In addition, a user may press any of the action buttons to invoke the contract, index, abstract, speed read, summary or theme functions.

Navigating the Virtual Bookshelf Using Cross References:

The virtual bookshelf further includes the ability for a user to navigate using cross references within the topic table 165. As discussed above, cross references are contained in the topic table 165 if a document is classified under more than one category in the knowledge catalog (Appendix A). Table 1 contains an example hierarchy focusing on a document about the OS/2 operating system.

TABLE 1

| hard science and technology | communications |
| electronics | advertising industry |
| computer industry | marketing |
| computer software industry | |
| operating systems | |
| OS/2 | |

As shown in Table 1, OS/2 is classified under operating systems, which is classified under computer software industry, etc. For this example, the document also contains information regarding marketing issues related to OS/2. Table 1 also contains a classification for marketing. The marketing category is classified under the parent category "advertising industry", and it is further classified under the parent category "communications."

Figure 7A:
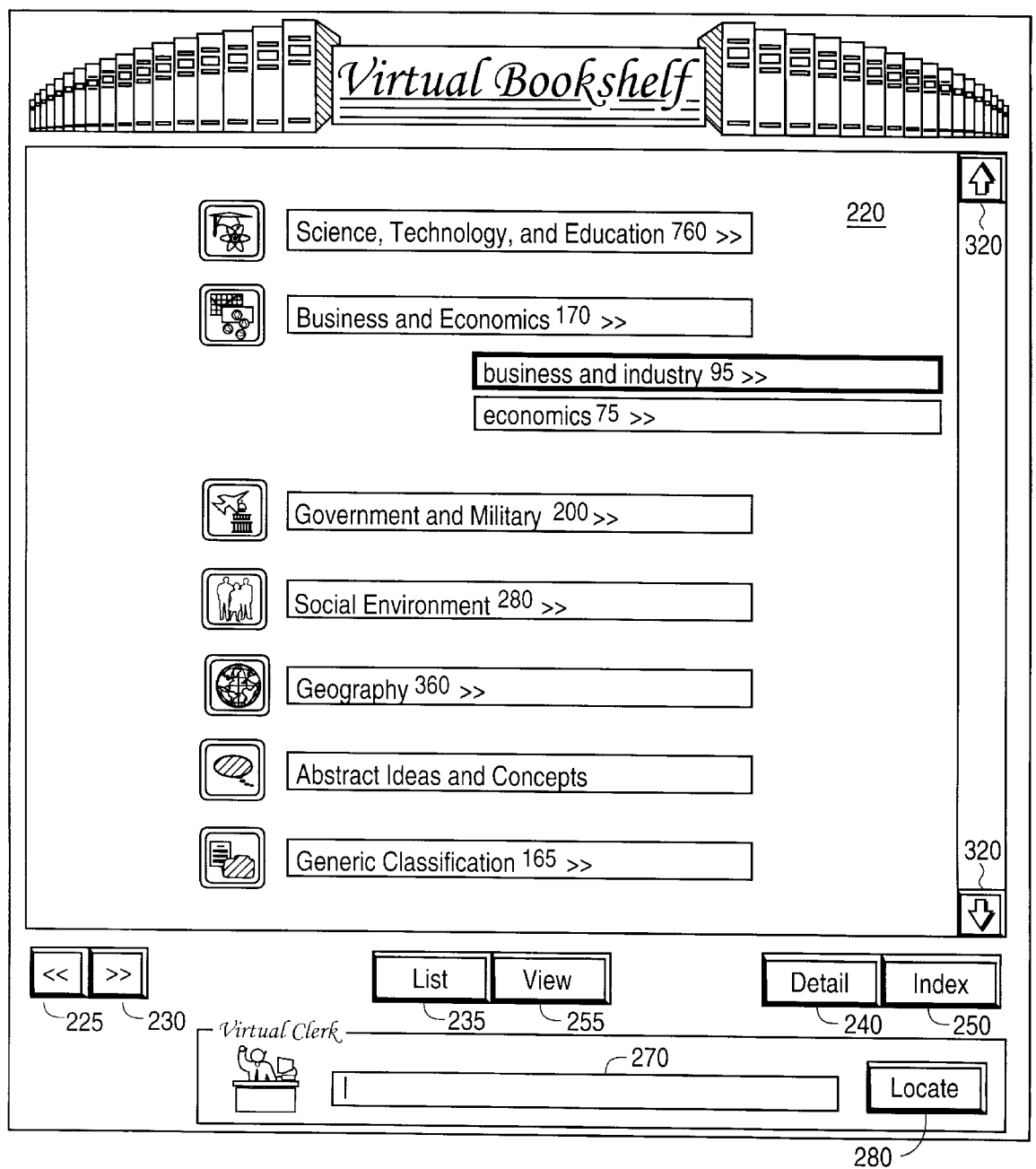
FIG. 7a illustrates an example display that includes the high level categories from the knowledge catalog including the "business and economics" category expanded to show the next lower level.
Figure 7B:
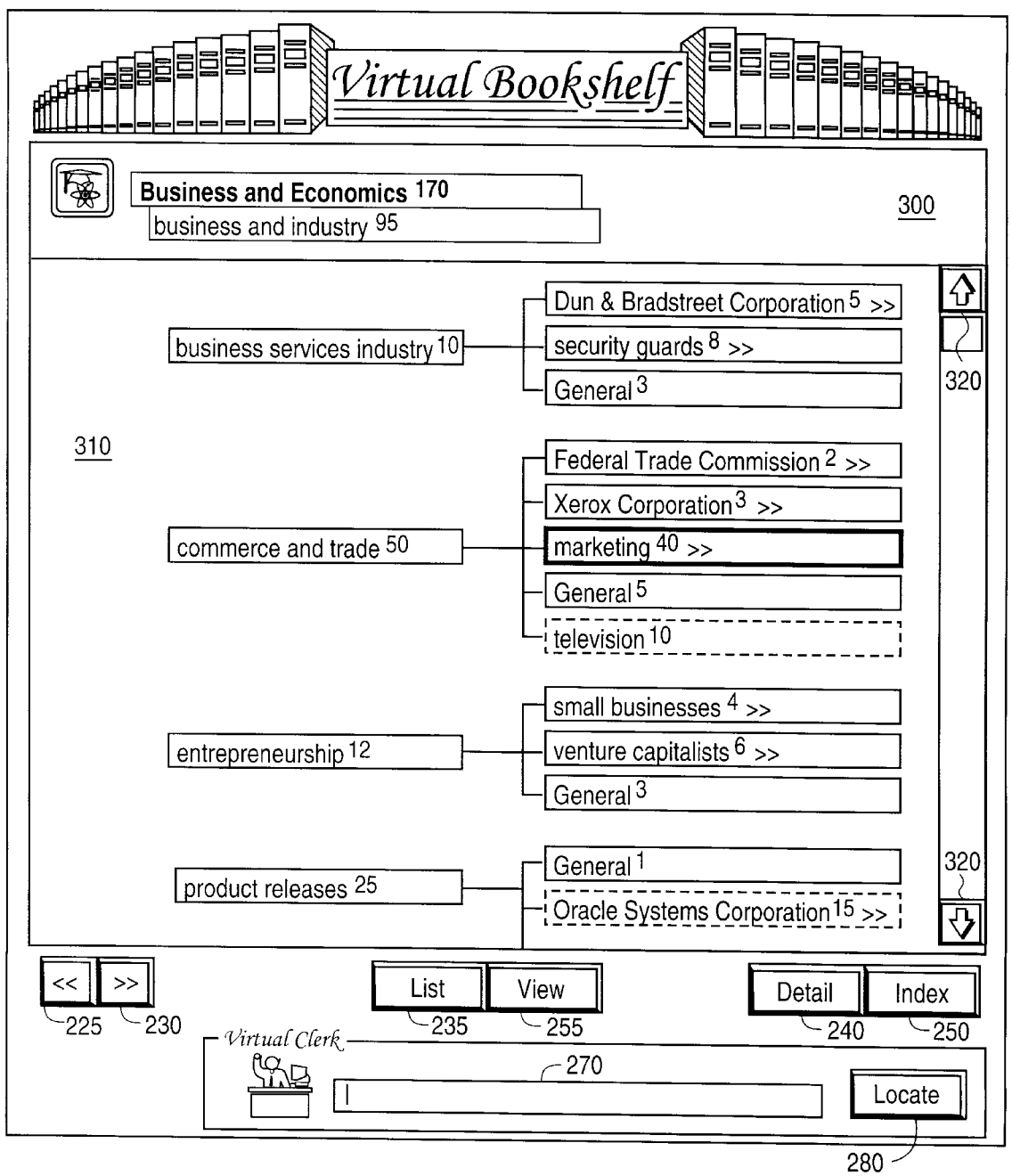
FIG. 7b illustrates an example display that includes the "business and industry" category expanded to include the next two lower levels.

The following example illustrates how a user navigates through the virtual bookshelf by utilizing the cross references in the topic table 165. FIG. 7a illustrates the high level categories for the knowledge catalog including the "business and economics" category expanded to show the next lower level. If a user selects the "business and industry" category and invokes the expand function, the virtual bookshelf displays, in the navigational section 310, the expanded hierarchy under the "business and industry" category. In addition, the "business and industry" category is placed under the "business and economics" category in the history section 300. FIG. 7b illustrates the virtual bookshelf display for the above action.

Figure 7C:
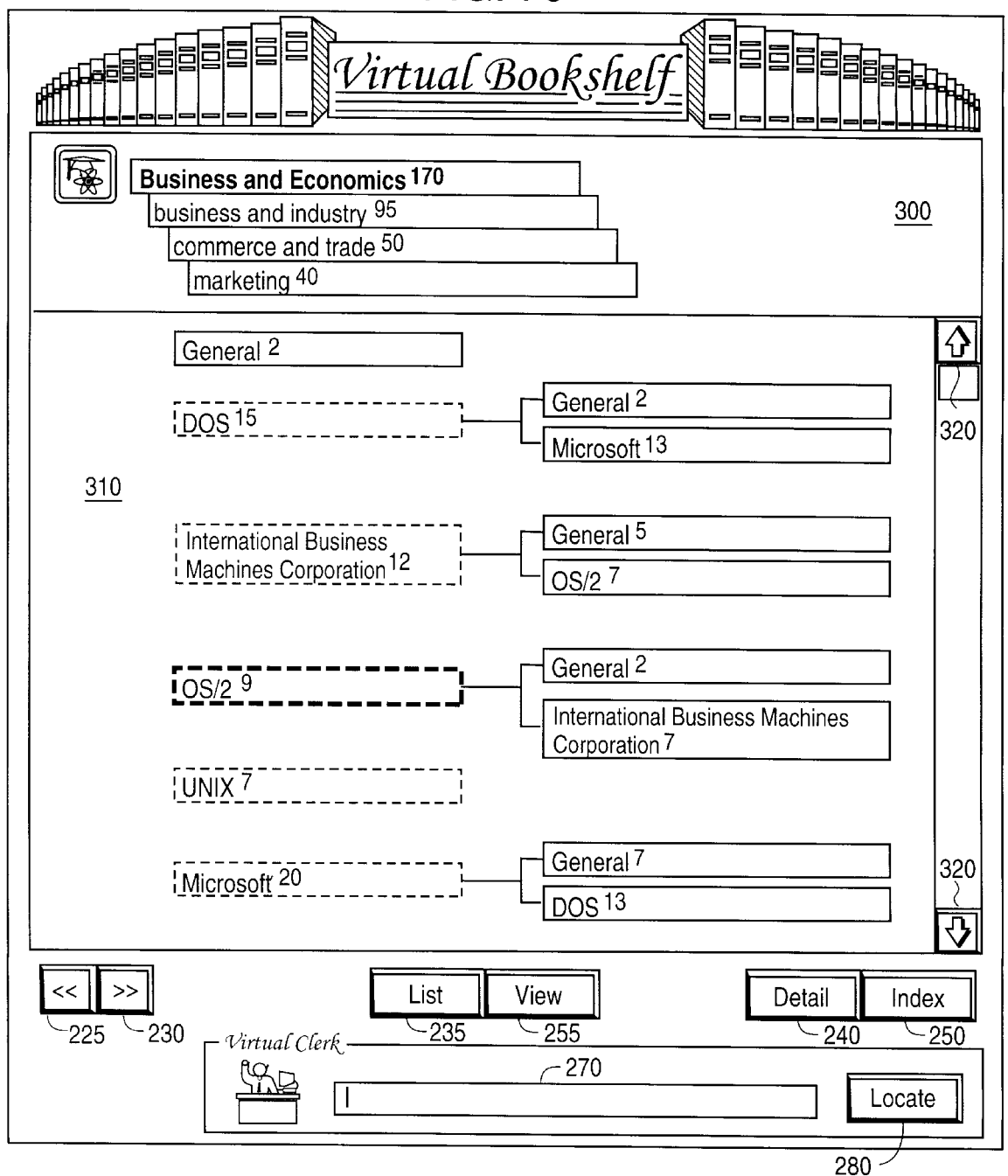
FIG. 7c illustrates a virtual bookshelf display for expanding the "marketing" category to include the next two lower levels.

To view more detailed hierarchies covering the topic "marketing", a user selects the "marketing" category and presses the expand button 225. FIG. 7c illustrates the virtual bookshelf display for expanding the "marketing" category. As shown in FIG. 7c, several categories under "marketing", including "OS/2", are displayed in the navigation section 310. Also, the parent categories "commerce and trade" and "marketing" are added to the history section 300. The category "General²" under the parent category "marketing" indicates that two of the forty documents are directly classified under "marketing." The categories "DOS", "OS/2", "UNIX", "Microsoft", and "International Business Machines Corporation", are cross referenced to "marketing", as indicated by the broken line boxes around these categories.

Figure 7D:
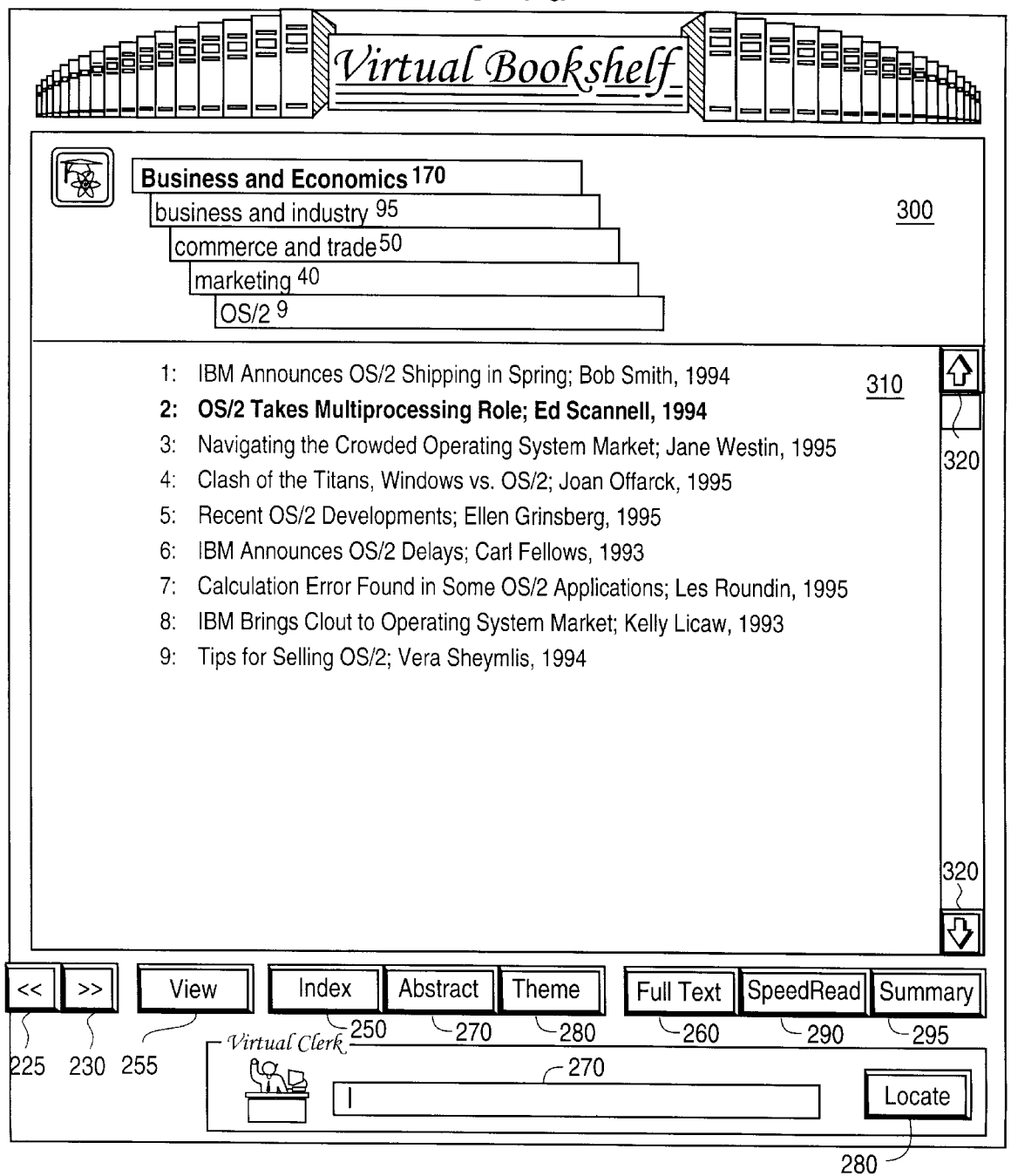
FIG. 7d illustrates an example display in response to invoking the list function and selecting the "OS/2" category from the display illustrated in FIG. 7c.

To view documents under "OS/2", the "OS/2" category is selected, and the list button 235 is pressed. FIG. 7d illustrates the screen display in response to the previous selection. As shown in FIG. 7d, the selected category "OS/2" is added to the history section 300, and the bibliographical entries for the 15 documents classified under "OS/2" and "marketing" categories are displayed in the navigational section 310. From the list of documents, a user may select a document, and the user may select one of the action buttons (e.g. contract, expand, list or view, index, abstract, speed read, summary, and theme).

Figure 7E:
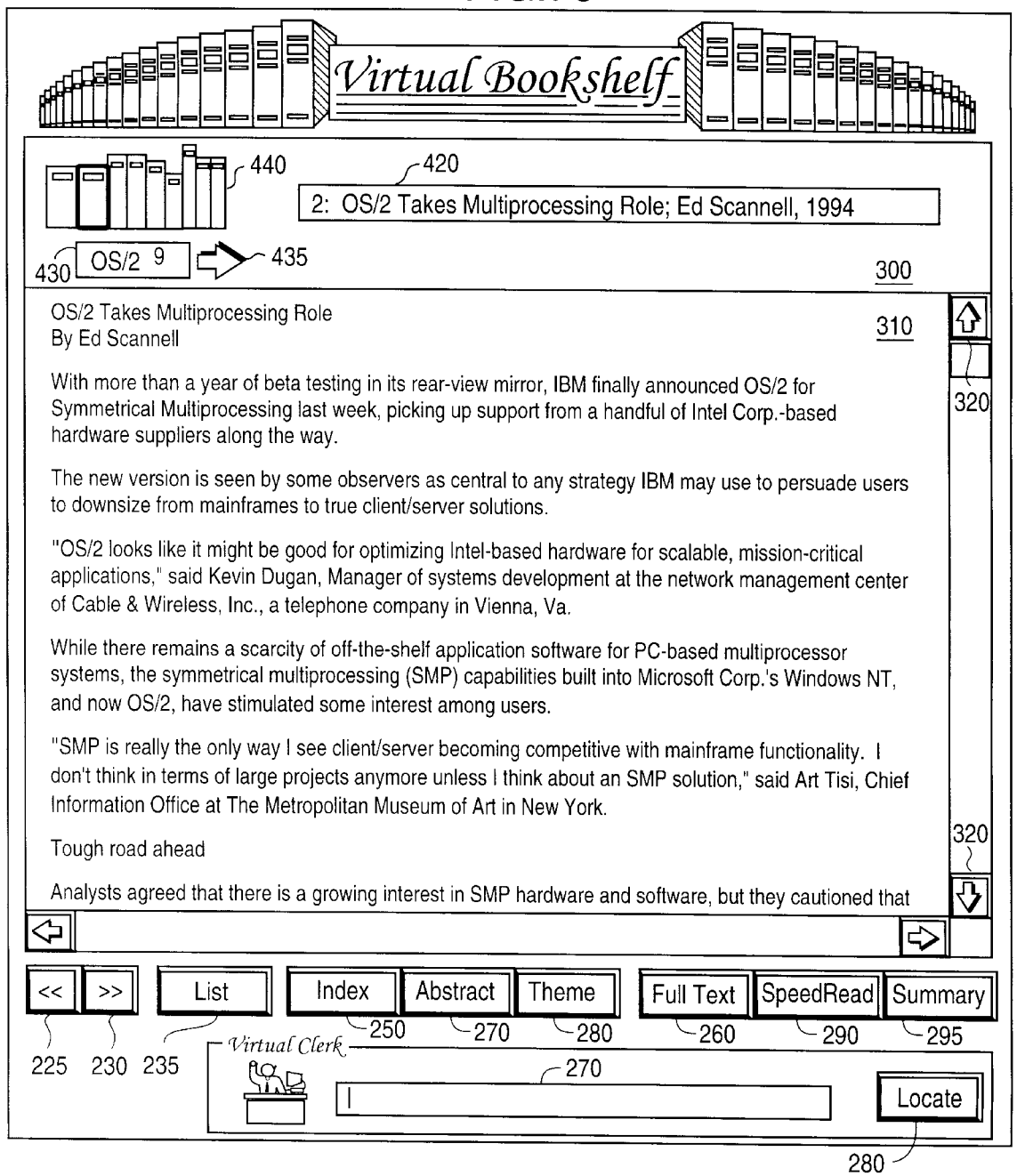
FIG. 7e illustrates an example display with a selected document cross-referenced under the "OS/2" and "marketing" categories.

To view the full text of a document, a document, such as the document "OS/2 Takes Multiprocessing Role", is selected, and the expand function is invoked. These operations result in the display illustrated in FIG. 7e. As shown in FIG. 7e, the full text of the selected document, "OS/2 Takes Multiprocessing Role", is displayed. In addition, the user may scroll up or down to view more of the text. Also, the selected document is highlighted on the book end icon 440, and the parent category for the index entry, OS/2, is dispayed in the box 430. Furthermore, the user may press any of the action buttons (e.g., contract, index, abstract, speed read, summary, and theme) to execute the corresponding function.

Figure 8A:
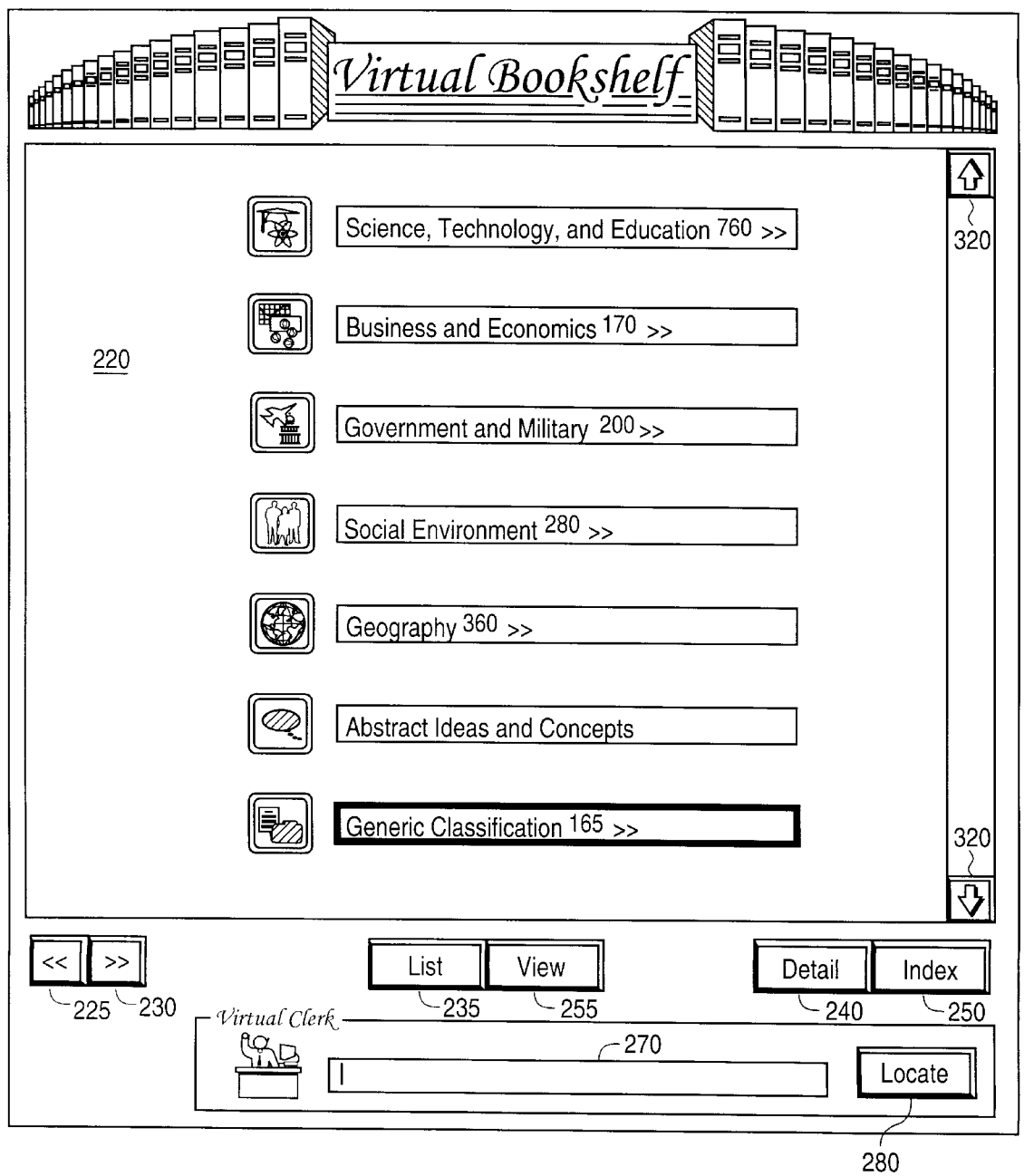
FIG. 8a illustrates an example home page display including a display of the high level categories from the knowledge catalog.
Figure 8B:
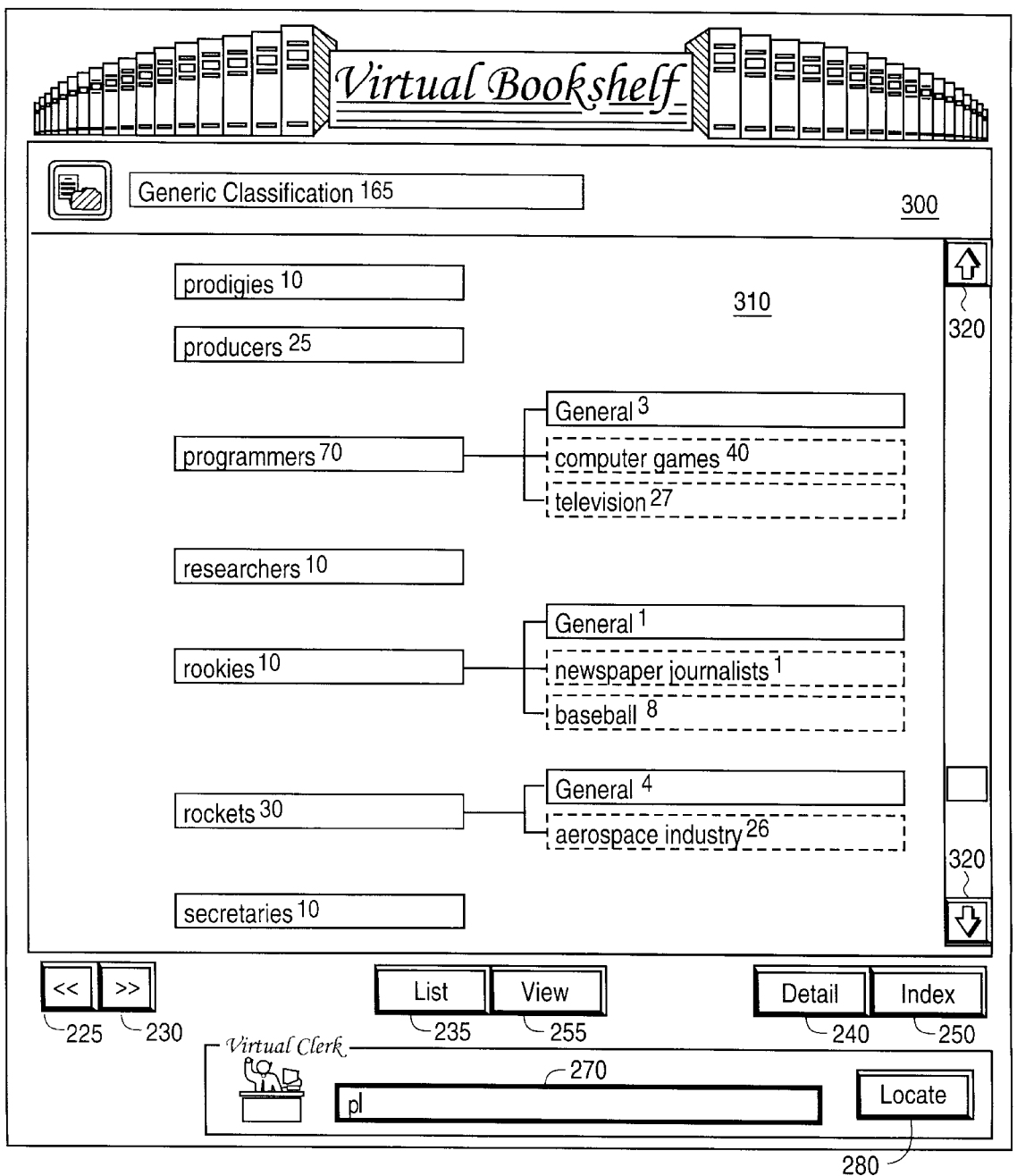
FIG. 8b illustrates an example display in response to selecting the generic classification and to entering a "P" in the virtual clerk data entry field.

Navigating the Virtual Bookshelf Using the Generic Classification:

The generic classifications of the virtual bookshelf may also be used to navigate the hierarchy and to locate specific information in documents. FIG. 8a illustrates an example home page display including a display of the high level categories from the knowledge catalog. To navigate using the generic classification, a user may utilize the virtual clerk. For example, a user may select the generic classification category on the home page, and the user may enter a "P" in the virtual clerk data entry field 270. FIG. 8b illustrates an example display in response to selecting the generic classification and to entering the "P" in the virtual clerk data entry field 270. As shown in FIG. 8b, a portion of the hierarchy, which includes a portion of the list of terms that have been generically classified along with the categories in the hierarchy to which the terms have been dynamically cross referenced, is displayed. At this point, all navigational options are available to the user.

Locating Information With the Virtual Bookshelf

The virtual bookshelf of the present invention accepts queries to navigate the hierarchy. The entering of a query or token, through use of the virtual clerk, provides an alternative to the top down navigation approaches discussed above. A query may be entered through the virtual clerk from any screen that the virtual clerk is displayed. As described more fully below, a query may constitute a word or phrase, or section of a text representing the area of information sought by the user. To navigate with the virtual clerk, a user enters the word or phrase or text in the virtual clerk data entry field 270, and the user presses the locate button 280. In response, the virtual bookshelf system locates, if available, the hierarchy for the category or index entry that corresponds to the query, and it displays a portion of that hierarchy.

For certain queries, the word entered matches a unique entry in the topic table 165. For such a topic location, the corresponding category becomes the entry point into the display of the hierarchy. The virtual bookshelf system displays, in the history section 300, the hierarchical path that leads to the requested category. This hierarchical path includes the name of the requested category at the bottom of the list of categories. In addition, the navigation section 310 displays the part of the hierarchy directly beneath the selected category. At this point, the navigational approach discussed above may be used, or another more specific query entered for an additional location.

In other cases, a word entered into the virtual clerk does not appear as a topic in the topic table 165 but appears as an index head in the index table 170. As discussed above, index heads are dynamically classified, and that classification is stored with the index head. If a word entered into the virtual clerk appears as an index head, then the various classifications associated with the index head are displayed for selection. The selected classification is the entry point into the display of the hierarchy. For such a concept search, the virtual bookshelf system displays, in the history section 300, the hierarchical path that leads to the selected category including the index head at the bottom of the path. Also, the navigational section 310 contains the part of the hierarchy directly beneath the selected category. Similar to the topic search, a user may use the navigational approach at this point, or the user may select another term for processing by the virtual bookshelf system.

A user may also query the virtual clerk through use of a natural language query. For the natural language query approach, a user enters into the virtual clerk data entry field 270 a natural language phrase, clause, sentence, etc. For this type of entry, the text is analyzed, topics included in the query are isolated, and the classifications of the topics are presented for selection by the user. The selected classification becomes the entry point into the display of the hierarchy. Query by example provides an additional location mechanism. In query by example, a user enters a phrase, clause, sentence, etc. by copying and passing part of a displayed text into the virtual clerk data entry field 270. Similar to the natural language query, the virtual clerk analyzes the text selected, isolates the topic or topics included in the query, a nd presents the classification of topics for the user to select. The selected classification then becomes the entry point into the display of the hierarchy.

The positioning module 120 (FIG. 1) generates display information in response to a user input query. For a query that corresponds to a unique topic in the topic table 165, the positioning module 120 utilizes the hierarchical structure information in the topic table 165 to display the relevant portion of the hierarchical structure. For a query that corresponds to an index head in the index table 170, the positioning module 120 utilizes the hierarchical structure information in the index/topic table 185 and the index table 170 to display the relevant portion of the hierarchical structure. In a preferred embodiment, the query by example and the natural language query are analyzed to generate the locate information via a computer program. A computer program for accomplishing this task is entitled ConText™, from Oracle® Corporation, Redwood Shores, California, the assignee of the present invention. The ConText™ program analyzes the query by example and the natural language query to determine the topics and/or index heads associated with the query, and the positioning module 120 displays the corresponding portion of the hierarchical structure. However, any program that identifies the theme or themes of the query by example and the natural language query may be used to map the query into the hierarchical structure. Furthermore, for query by example, the virtual bookshelf system may also store positioning information for text in the documents 100 to map the text to the hierarchical structure.

Figure 9A:
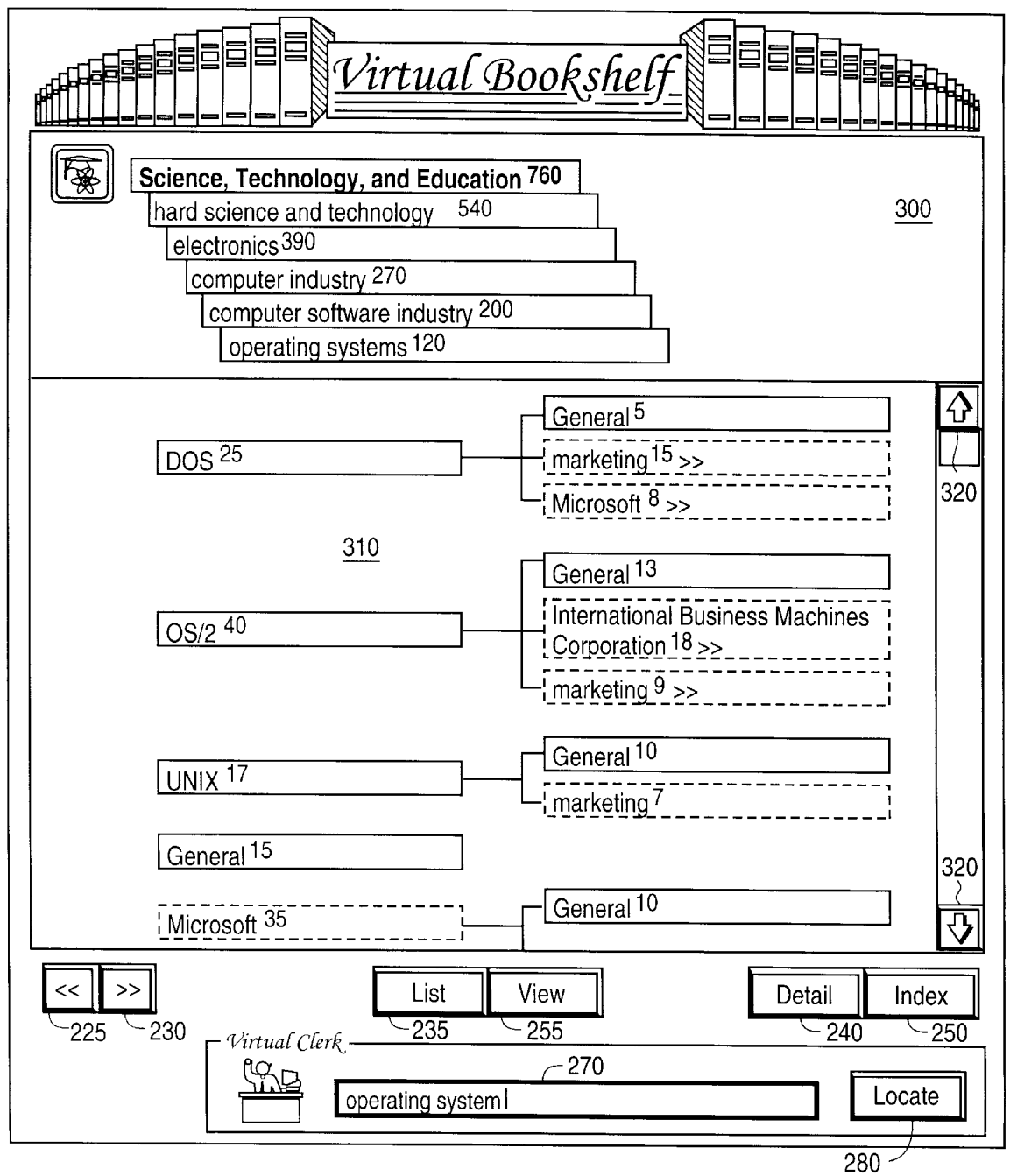
FIG. 9a illustrates an example display for knowledge catalog or topic searching with the virtual clerk.

FIG. 9a illustrates an example display for knowledge catalog or topic searching with the virtual clerk. For this example, the user enters the term "operating system" in the virtual clerk data entry field 270. In response, the virtual bookshelf displays, in the history section 300, the hierarchical path that leads to the selected category "operating systems." In addition, the category "operating systems" appears at the bottom of the list in the history section 300. The navigation section 310 displays the part of the hierarchy directly beneath the category "operating systems." Note that the "operating system" phrase entered has been pluralized by the virtual bookshelf system to match the format stored in the knowledge catalog, "operating systems." At this point, the user may use the navigational approach, or enter another term for processing.

Figure 9B:
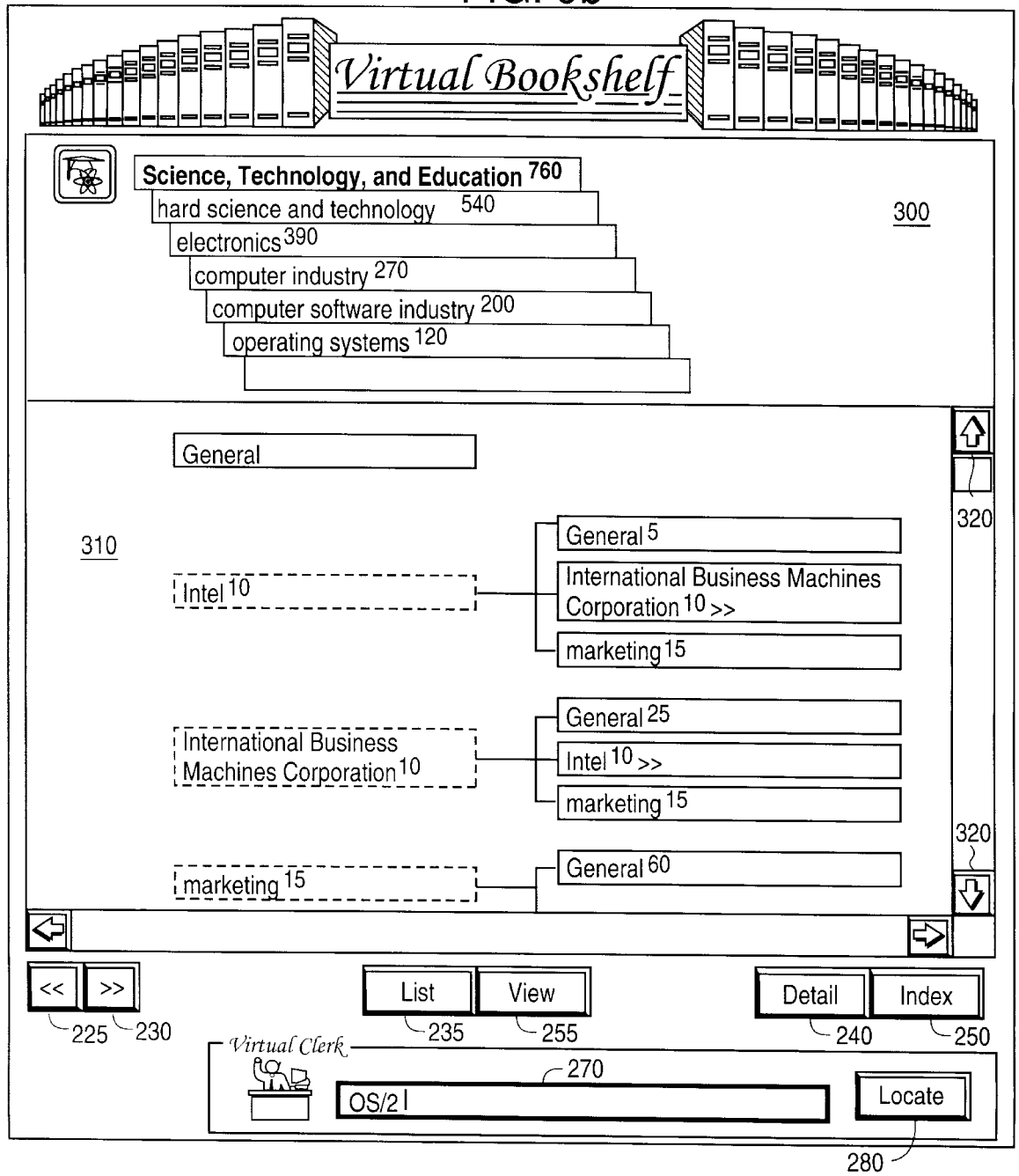
FIG. 9b illustrates an example display for concept searching with the virtual clerk.

FIG. 9b illustrates an example display for concept location with the virtual clerk. For this example, a user enters the concept "OS/2" on the virtual clerk data entry field 270. In response, the virtual bookshelf displays, in the history section 300, the hierarchical path that leads to the selected category "OS/2", including the parent category "operating systems." In addition, the navigational section 310 displays the part of the hierarchy directly beneath the selected category "OS/2." At this point, either the navigation approach or entry of another search term may be used. Note that the category "OS/2" involves concept location because the concept OS/2 does not appear in the static ontologys of the knowledge catalog.

The virtual bookshelf system does not merely display, in response to a location query, a list of documents that correspond to the token. Instead, as discussed above, the virtual bookshelf displays a portion of the hierarchy to show the user the location of the corresponding category in the hierarchy. In this way, the user views all categories in the peripheral area of the hierarchy that corresponds to the query term. This location approach to search and retrieval is similar to looking for information in a bookstore. In the bookstore approach, a user does not directly look in a book for a specific topic, but first locates the area in the bookstore containing a general category for the topic. Using the virtual bookshelf approach, the user may view additional peripheral topics that would not have otherwise been revealed to the user. Therefore, the user may select additional topics from the categories presented. Consequently, by placing the user in the general area and by allowing the user to understand how the user was directed to the area, a user may select other related documents even more pertinent to the users initial query of interest.

Figure 9C:
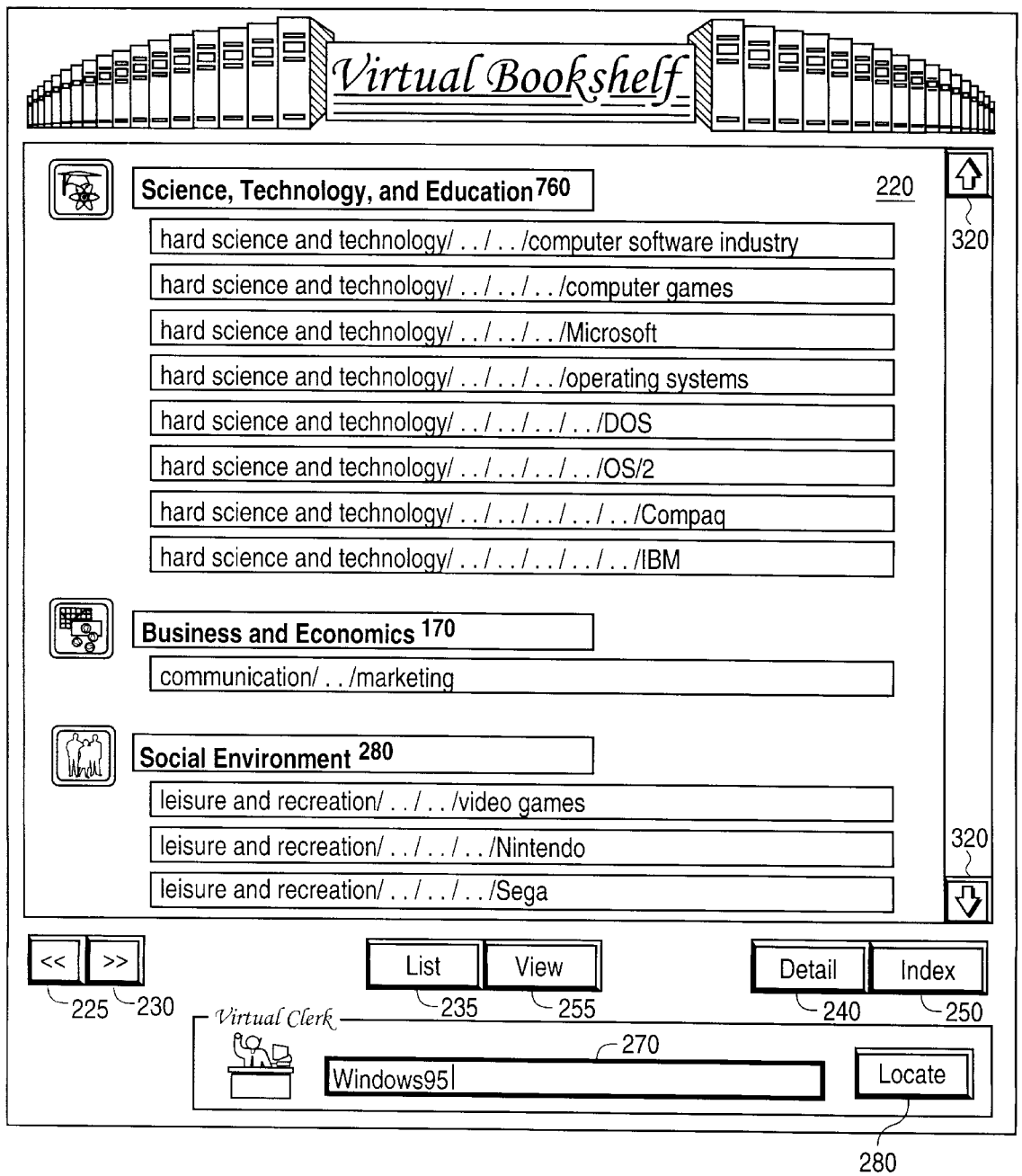
FIG. 9c illustrates an example display for querying the virtual bookshelf with a term that is ambiguous.

A user may enter a token, and the token may be ambiguous. In the knowledge catalog and the stored hierarchy in the reference tables 150, a term is characterized as ambiguous if the term has more than one sense or meaning. Therefore, a user may enter a token that has more than one sense, thereby rendering the token ambiguous to the system. FIG. 9c illustrates an example display for querying the virtual bookshelf with a term that is ambiguous (e.g. the term is contained in more than one category in the hierarchy). As shown in FIG. 9c, the term "Windows95" is entered in the virtual clerk data entry field 270. Since the term has not been classified in the knowledge catalog, there is no single entry point into the hierarchy. Therefore, as shown in FIG. 9c, the virtual bookshelf does not display a history section 300. The navigation section 310 includes a list of abbreviated classifications of the documents that cover the selected term.

For the Windows 95 example, three major classifications emerge, "hard science and technology", "communications", and "leisure and recreation." At this point, the user determines whether the user is interested in information concerning Windows 95 that relates to hard science and technology, communication, or leisure and recreation. For example, if a user is interested in the compatibility of Windows 95 with certain video games, then the user would select "leisure and recreation" as the correct category. Similarly, the user may select the "hard science and technology" category or "communication" category. The virtual bookshelf, through use of displaying all senses for a particular term, results in a method for disambiguation. The user alleviates the ambiguity in the input token by selecting the appropriate category corresponding to the sense intended by the user.

Figure 9D:
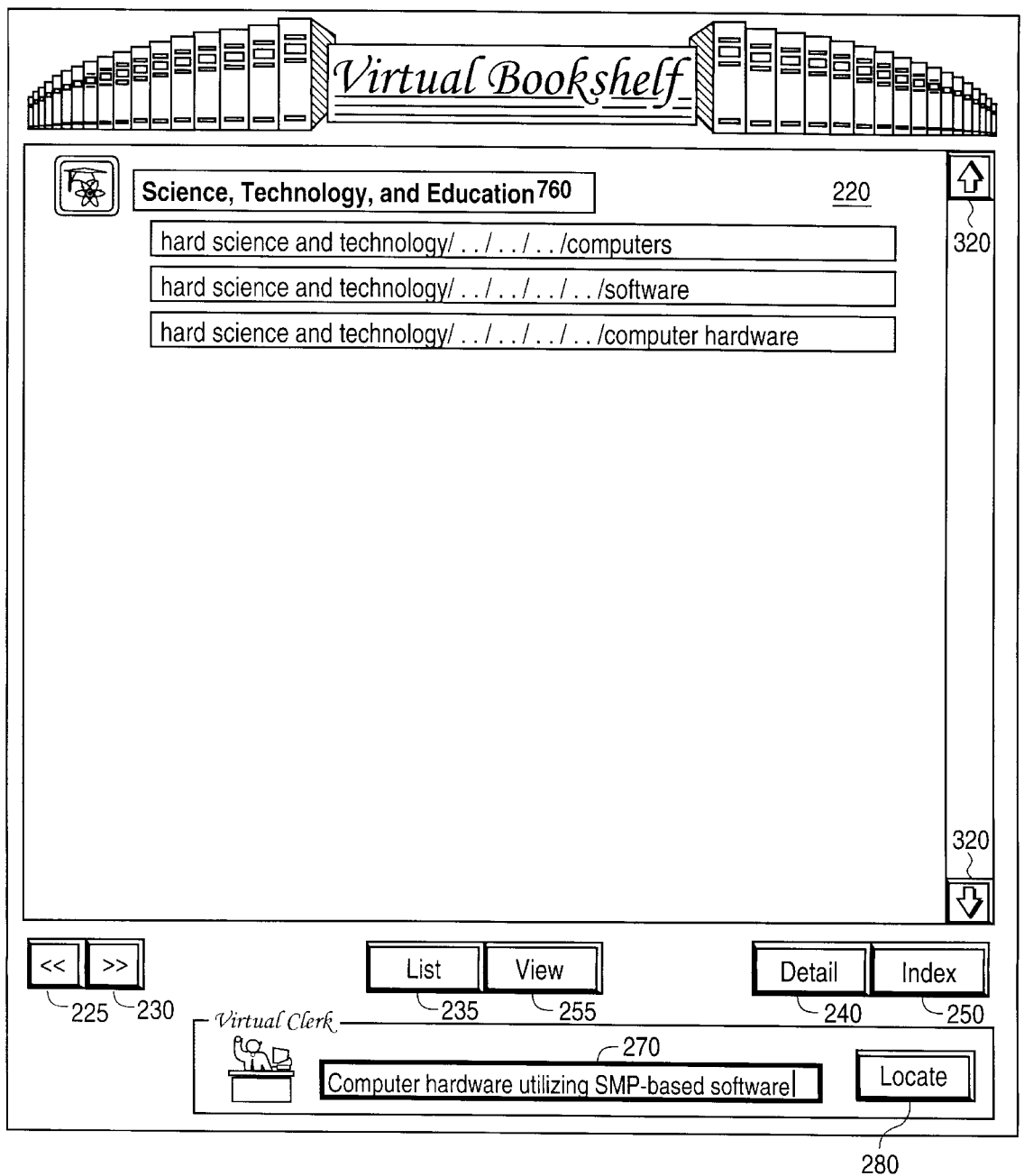
FIG. 9d illustrates an example display for querying the virtual bookshelf with a natural language query that is ambiguous.

The natural language query approach is used by entering a phrase that corresponds to the area of interest. For example, as shown in FIG. 9d, a user may enter a phrase "computer hardware utilizing SMP based software." For this query, the virtual bookshelf displays multiple classifications because there is no unique entry point into the virtual bookshelf hierarchy. Consequently, the virtual bookshelf does not display a history section 300, but it displays a list of abbreviated classifications of the expression entered in the navigation section 310. For this particular example, three classes under the "hard science and technology" emerge. Similar to the example shown in FIG. 9c, one of the selected categories is chosen by the user as an entry point into the hierarchy. Again, the user disambiguates the entry point into the hierarchy by specifying a specific sense to the natural language phrase.

Figure 9F:
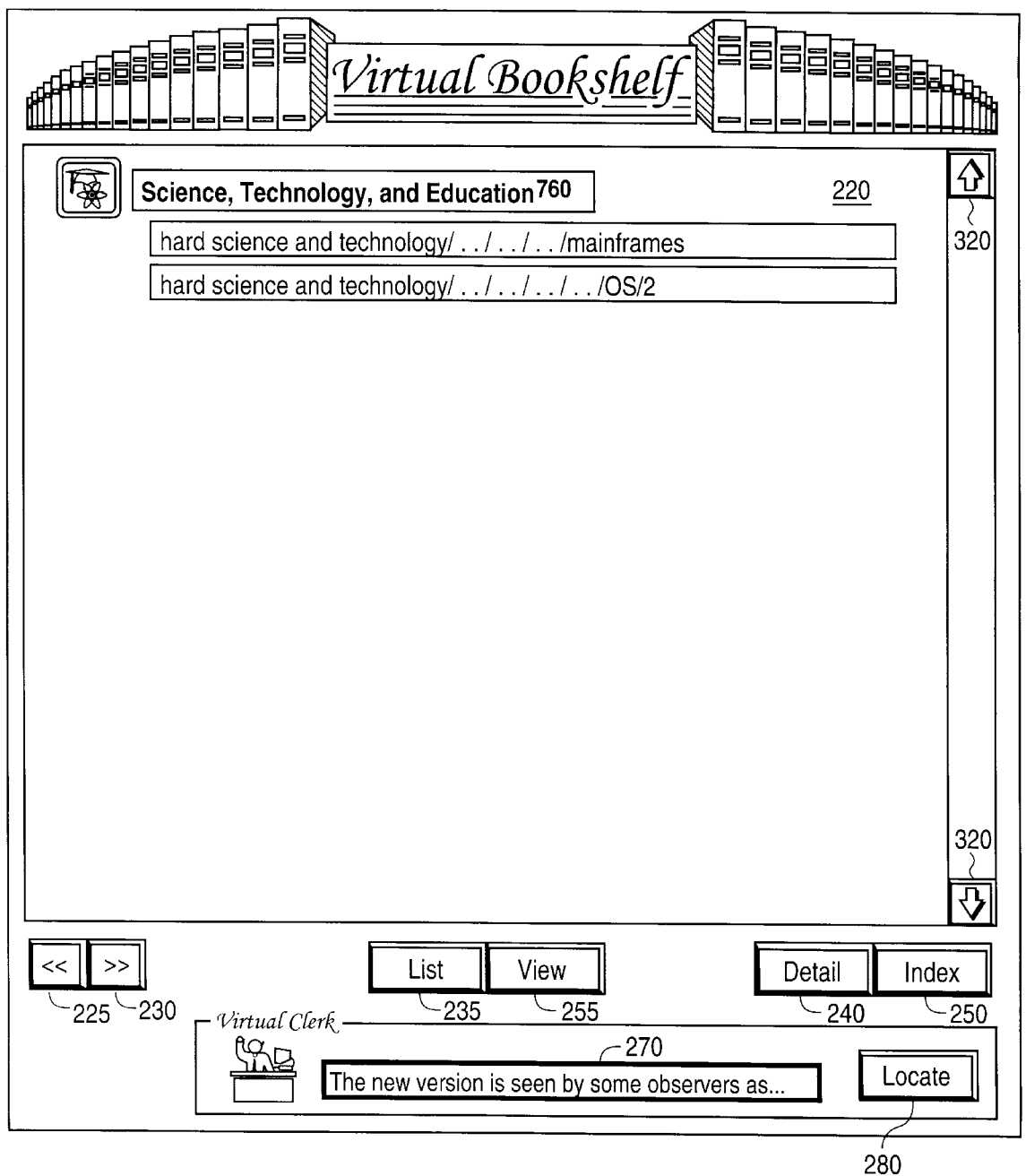
FIG. 9f illustrates the query by example approach that results in multiple classifications.

FIG. 9e illustrates the query by example approach for the virtual bookshelf. The starting point of this example is a display of text from which a query by example may be taken (FIG. 9e). In this case, two paragraphs of the text are highlighted, and they are input into the virtual clerk data entry field 270. In response, the virtual bookshelf displays one ore more relevant categories. For this case, the query by example results in multiple classifications as shown in FIG. 9f. Therefore, there is no unique entry point into the hierarchical structure. Consequently, the virtual bookshelf displays, in the navigational section 310, a list of abbreviated classifications of the expression entered. For this example, two categories under the "hard science and technology" parent category emerge. Again, the user selects one of the categories as an entry point into the hierarchy for the selected hierarchy.

Figure 10:
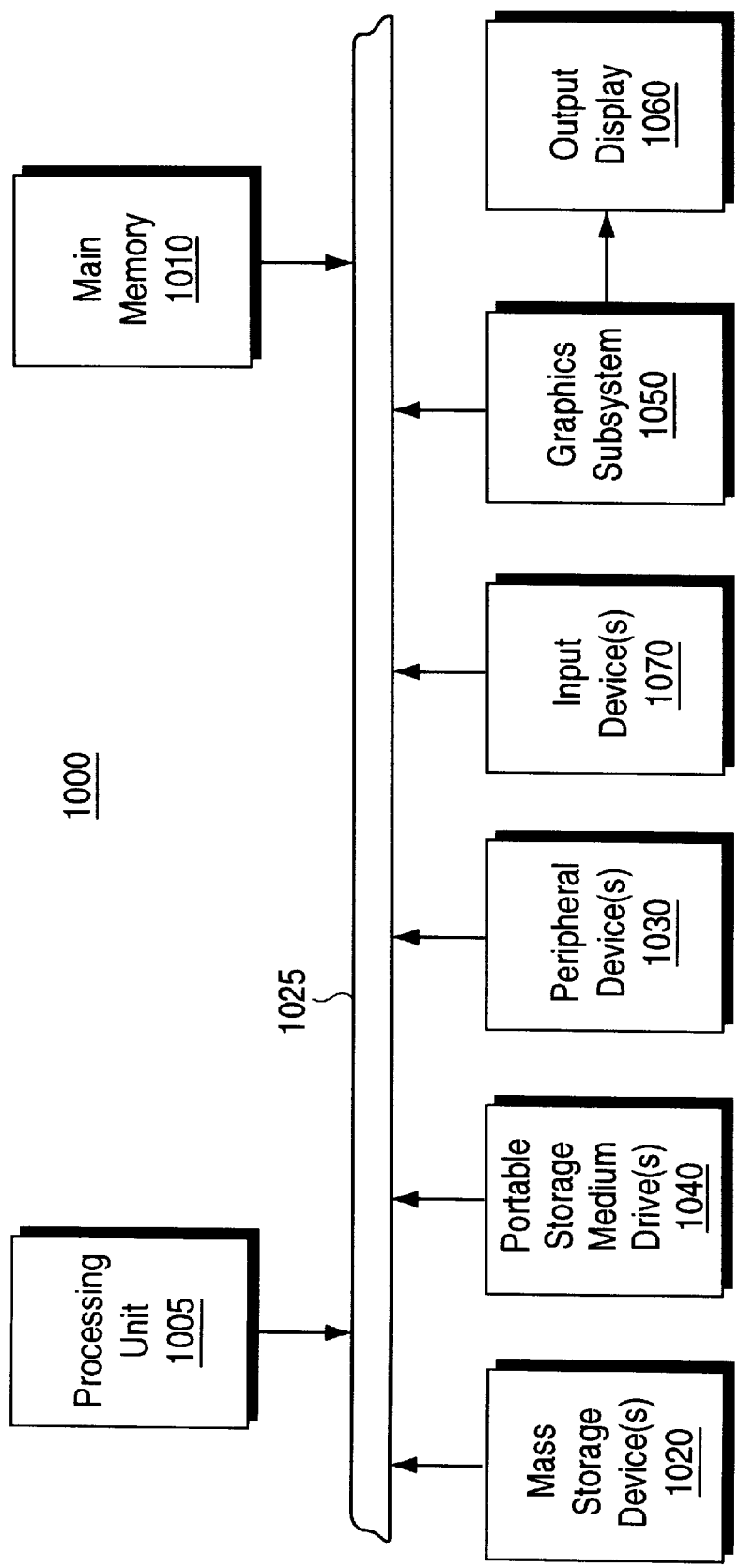
FIG. 10 illustrates a high level block diagram of a general purpose computer system in which the virtual bookshelf system of the present invention may be implemented.

Computer System:

FIG. 10 illustrates a high level block diagram of a general purpose computer system in which the virtual bookshelf system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the virtual bookshelf system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 10 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the virtual bookshelf system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the virtual bookshelf software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the virtual bookshelf system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The virtual bookshelf system may be implemented in either hardware or software. For the software implementation, the virtual bookshelf system is software that includes a plurality of computer executable instructions for implementation on a general purpose computer system. Prior to loading into a general purpose computer system, the virtual bookshelf system software may reside as encoded information on a computer readable medium, such as a magnetic floppy disk, magnetic tape, and compact disc read only memory (CD-ROM). In one hardware implementation, the virtual bookshelf system may comprise a dedicated processor including processor instructions for performing the functions described herein. Circuits may also be developed to perform the functions described herein. The reference tables 150 may be implemented as a database stored in memory for use by the virtual bookshelf system.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for visually representing information in a document browsing system associated with a plurality of documents, the method comprising the steps of:

storing classification information to classify a plurality of documents, wherein the classification information comprises a plurality of themes for each document, and the classification information associates each of the themes with a category so as to identify a plurality of subject matter areas for each document by the categories;

displaying on an output display at least a portion of the categories; and displaying on the output display, in response to user selection of a category, document information for documents that have themes classified in the category selected, wherein classification of documents by themes in a plurality of categories permits a user to identify all documents that include thematic content corresponding to the category.

2. The method as set forth in claim 1, wherein:

the step of storing classification information comprises the step of storing the categories in a hierarchical structure; and the step of displaying at least a portion of the categories comprises the step of displaying categories in the hierarchical structure.

3. The method as set forth in claim 2, further comprising the steps of:

displaying, in response to user input, selected portions of the hierarchical structure in an upward direction to permit viewing high level categories in the hierarchical structure;

displaying, in response to user input, selected portions of the hierarchical structure in a downward direction to permit viewing lower level categories in the hierarchical structure; and displaying, in response to user input, selected portions of the hierarchical structure in a lateral direction to permit viewing of additional portions of the hierarchical structure in the same hierarchical level.

4. The method as set forth in claim 2, wherein the step of displaying at least a portion of the hierarchical structure comprises the steps of:

displaying, in a history section, a plurality of categories that define a current path in the hierarchical structure; and displaying, in a navigational section, categories of the hierarchical structure in currently selected hierarchical levels.

5. The method as set forth in claim 1, wherein:

the step of storing a plurality of themes comprises the step of storing topic cross references that classify the documents among more than category; and the step of displaying at least a portion of the categories comprises the step of displaying topic cross references as categories.

6. The method as set forth in claim 1, wherein:

the step of storing classification information comprises the step of storing index heads that comprise content carrying words from the documents, and storing a plurality of context index entries corresponding to the index heads, wherein each context index entry comprises a subject to provide context for use of the corresponding index head in a document; and the step of displaying at least a portion of the categories comprises the step of displaying the index heads as the categories.

7. The method as set forth in claim 6, further comprising the step of displaying, in response to user input including selection of an index head, context index entries corresponding to the index head selected.

8. The method as set forth in claim 7, further comprising the step of displaying, in response to user input including selection of a context index entry, a list of at least one document that contains subject matter corresponding to the context index entry selected.

9. The method as set forth in claim 8, further comprising the step of displaying, in response to user input including selection of a document from the list of at least one document, at least one index reference that identifies a location in the document that comprises subject matter on the context index entry selected.

10. The method as set forth in claim 9, further comprising the step of displaying, in response to user input including selection of an index reference from the at least one index reference displayed, full text of the document selected including displaying text for the index reference selected.

11. The method as set forth in claim 1, wherein:

the step of storing classification information further comprises the step of storing a combined back-of-book index for each category, wherein the combined back-of-book index comprises a list of indexes for subjects covered in a set of documents classified under the corresponding category; and the step of displaying document information comprises the step of displaying, in response to user input including selection of a category, a combined back-of-book index for the set of documents classified under the corresponding category.

12. The method as set forth in claim 11, further comprising the step of displaying, in response to user input including selection of an index, a list of at least one document that contains subject matter corresponding to the index selected.

13. The method as set forth in claim 12, further comprising the step of displaying, in response to user input including selection of a document from the list of at least one document, at least one index reference that identifies a location in the document that comprises subject matter on the index selected.

14. The method as set forth in claim 13, further comprising the step of displaying, in response to user input including selection of an index reference from the at least one index reference displayed, full text of the document selected including displaying text for the index reference selected.

15. The method as set forth in claim 1, wherein:

the step of storing classification information comprises the step of storing a generic classification for the documents; and the step of displaying at least a portion of the categories comprises the step of displaying the generic classification.

16. The method as set forth in claim 1, wherein the step of displaying document information comprises the step of displaying, in response to user input including selection of a category, information identifying at least one document classified for the category selected.

17. The method as set forth in claim 16, wherein the step of displaying document information comprises the step of displaying, in response to user input including selection of a document, a brief synopsis of the selected document.

18. The method as set forth in claim 16, wherein the step of displaying document information comprises the step of displaying, in response to user input including selection of a document, full text of the selected document with major content bearing words highlighted.

19. The method as set forth in claim 16, wherein the step of displaying document information comprises the step of displaying, in response to user input including selection of a document, full text of the selected document.

20. The method as set forth in claim 16, wherein the step of displaying document information comprises the step of displaying, in response to user input including selection of a document, a summary of the document including main ideas of the document.

21. The method as set forth in claim 16, wherein the step of displaying document information comprises the step of displaying, in response to user input including selection of a document, theme data identifying major themes for the document.

22. The method as set forth in claim 16, wherein the step of displaying document information comprises the step of displaying, in response to user input including selection of a document, a list of at least one index reference that identifies a location in the document that comprises subject matter on the index selected.

23. The method as set forth in claim 22, further comprising the step of displaying, in response to user input including selection of an index reference from the at least one index reference displayed, full text of the document selected including displaying text for the index reference selected.

24. The method as set forth in claim 1, wherein the step of displaying document information comprises the step of displaying, in response to user input including selection of a category, a plurality of themes from a plurality of documents that are classified for the category selected.

25. A computer system for visually representing information in a document browsing system associated with a plurality of documents comprising:

memory for storing classification information for a plurality of documents such that a plurality of themes for the documents are classified in a plurality of categories to identify a plurality of subject matter areas for each document by the categories classified;

an output display for displaying information to a user; and processing unit coupled to said memory for displaying, on the output display, at least a portion of the categories, and for displaying, on the output display, in response to user selection of a category, document information for documents that have themes classified in the category selected, wherein classification of documents by themes in a plurality of categories permits a user to identify all documents that include thematic content corresponding to said category.

26. A method for providing peripheral information in a document browsing system, the method comprising the steps of:

storing classification information for a plurality of documents so as to classify each document in a category that depicts a general subject matter area for the corresponding document;

storing, for at least one category, thematic information that identifies a plurality of themes for each of the documents classified in the category, wherein the themes for a document identify a plurality of subject matter areas contained in a corresponding document in addition to subject matter of a category for which the document was classified;

displaying the at least one category on an output display;

receiving user selection of the category; and displaying representations that depict at least one theme corresponding to the category selected, wherein the display of the at least one theme presents to the user subject matter peripheral to subject matter identified by the category.

27. The method as set forth in claim 26, further comprising the step of displaying, in response to user input including selection of a theme, information concerning at least one document that comprises information on the theme selected.

28. The method as set forth in claim 26, wherein the step of displaying representations for at least one theme comprises the step of displaying a bookshelf icon comprising a plurality of books for each theme, wherein each book in the bookshelf represents a document classified for the theme.

29. The method as set forth in claim 28, wherein the step of displaying a bookshelf icon for each theme comprises the step of displaying a book such that a width of the book reflects the total amount of thematic content, relative to other books in the bookshelf, contained in the document.

30. The method as set forth in claim 28, wherein the step of displaying a bookshelf icon for each theme comprises the step of displaying, in a left to right direction, books according to thematic content and prominence.

31. A computer readable medium comprising a plurality of instructions, which when executed by a computer, causes the computer to visually represent information in a document browsing system associated with a plurality of documents, said instructions for:

storing classification information to classify a plurality of documents, wherein the classification information comprises a plurality of themes for each document, and the classification information associates each of the themes with a category so as to identify a plurality of subject matter areas for each document by the categories;

displaying on an output display at least a portion of the categories; and displaying on the output display, in response to user selection of a category, document information for documents that have themes classified in the category selected, wherein classification of documents by themes in a plurality of categories permits a user to identify all documents that include thematic content corresponding to the category.

32. A computer readable medium comprising a plurality of instructions, which when executed by a computer, causes the computer to perform the steps of:

storing classification information for a plurality of documents so as to classify each document in a category that depicts a general subject matter area for the corresponding document;

storing, for at least one category, thematic information that identifies a plurality of themes for each of the documents classified in the category, wherein the themes for a document identify a plurality of subject matter areas contained in a corresponding document in addition to subject matter of a category for which the document was classified;

displaying on an output display at least one of the categories for which at least one document has been classified;

receiving user selection of the category; and displaying representations that depict at least one theme corresponding to the category selected, wherein the display of the at least one theme presents to the user subject matter peripheral to subject matter identified by the category.

* * * * *